(12) United States Patent
Kataoka et al.

(10) Patent No.: US 9,720,976 B2
(45) Date of Patent: Aug. 1, 2017

(54) EXTRACTING METHOD, COMPUTER PRODUCT, EXTRACTING SYSTEM, INFORMATION GENERATING METHOD, AND INFORMATION CONTENTS

(71) Applicant: FUJITSU LIMITED, Kawasaki-shi, Kanagawa (JP)

(72) Inventors: Masahiro Kataoka, Kawasaki (JP); Takahiro Murata, Kawasaki (JP); Takafumi Ohta, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 487 days.

(21) Appl. No.: 14/243,173

(22) Filed: Apr. 2, 2014

(65) Prior Publication Data
US 2014/0214854 A1    Jul. 31, 2014

Related U.S. Application Data

(63) Continuation of application No. 13/423,319, filed on Mar. 19, 2012, now abandoned.

(30) Foreign Application Priority Data

Mar. 31, 2011 (JP) .................................. 2011-081105

(51) Int. Cl.
 *G06F 7/00* (2006.01)
 *G06F 17/30* (2006.01)
(52) U.S. Cl.
 CPC .... *G06F 17/3053* (2013.01); *G06F 17/30324* (2013.01); *G06F 17/30619* (2013.01)
(58) Field of Classification Search
 CPC . H03M 7/40; G06F 17/3053; G06F 17/30153
 (Continued)

(56) References Cited

U.S. PATENT DOCUMENTS

| 5,706,496 A | 1/1998 | Noguchi et al. |
| 7,644,076 B1 | 1/2010 | Ramesh et al. |

(Continued)

FOREIGN PATENT DOCUMENTS

| JP | 5-324722 | 12/1993 |
| JP | 6-068159 | 3/1994 |

(Continued)

OTHER PUBLICATIONS

Shyu et al., An OCR Based Translation System Between Simplified and Complex Chinese Characters, IEEE, 1994, pp. 368-370.*

(Continued)

*Primary Examiner* — Cheyne D Ly
(74) *Attorney, Agent, or Firm* — Fujitsu Patent Center

(57) ABSTRACT

An extracting method includes storing to a storage device: files that include character units; first index information indicating which file includes at least one character unit in a character unit group having a usage frequency less than a predetermined frequency and among character units having common information in a predetermined portion, the usage frequency indicating the extent of files having a given character unit; second index information indicating which file includes a first character unit having a usage frequency at least equal to the predetermined frequency and among the character units having common information in a predetermined portion; and referring to the first and second index information to extract a file having character units in the first and second index information, when a request is received for extraction of a file having the first character unit and a second character unit that is included in the character unit group.

12 Claims, 70 Drawing Sheets

(58) Field of Classification Search
USPC .......................................... 707/741; 704/251
See application file for complete search history.

(56) References Cited

U.S. PATENT DOCUMENTS

| | | | |
|---|---|---|---|
| 7,877,258 B1* | 1/2011 | Chelba | G06F 17/2715 704/240 |
| 8,160,402 B2 | 4/2012 | Wu et al. | |
| 8,412,796 B2 | 4/2013 | Smyth et al. | |
| 8,661,051 B1* | 2/2014 | Garg | G06F 17/30864 707/767 |
| 2003/0177116 A1 | 9/2003 | Ogawa | |
| 2004/0006455 A1* | 1/2004 | Fux | G06F 17/2715 704/4 |
| 2004/0096115 A1* | 5/2004 | Braica | G06T 9/005 382/244 |
| 2006/0062467 A1* | 3/2006 | Zou | G06K 9/222 382/186 |
| 2006/0206313 A1* | 9/2006 | Xu | G06F 17/2735 704/10 |
| 2008/0040298 A1* | 2/2008 | Kanungo | G06F 17/278 706/12 |
| 2010/0085222 A1* | 4/2010 | Kataoka | H03M 7/40 341/65 |
| 2010/0131475 A1* | 5/2010 | Kataoka | G06F 17/30911 707/693 |
| 2011/0161357 A1* | 6/2011 | Kataoka | H03M 7/40 707/769 |
| 2013/0042060 A1* | 2/2013 | Marukame | G06F 17/30982 711/108 |

FOREIGN PATENT DOCUMENTS

| | | |
|---|---|---|
| JP | 7-319920 | 12/1995 |
| JP | 8-190572 | 7/1996 |
| JP | 33335498 | 10/2002 |
| JP | 34972438 | 2/2004 |
| JP | 2011-138230 | 7/2011 |

OTHER PUBLICATIONS

USPTO, (Cheyne) Notice of Non-Compliant or Non-Responsive Action, Mar. 10, 2014, in parent application U.S. Appl. No. 13/423,319 [pending].

USPTO, (Cheyne) Non-Final Rejection, Jan. 2, 2014, in parent U.S. Appl. No. 13/423,319 [pending].

* cited by examiner

FIG.1A
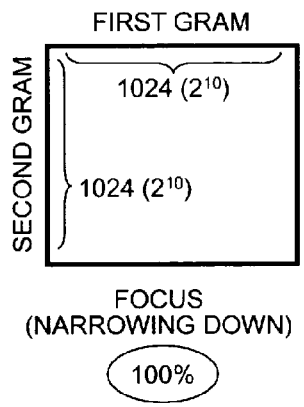
FIG.1B
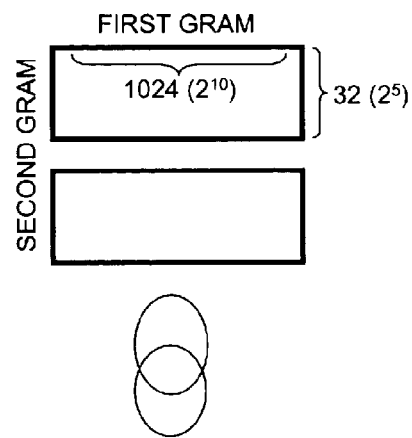
FIG.1C
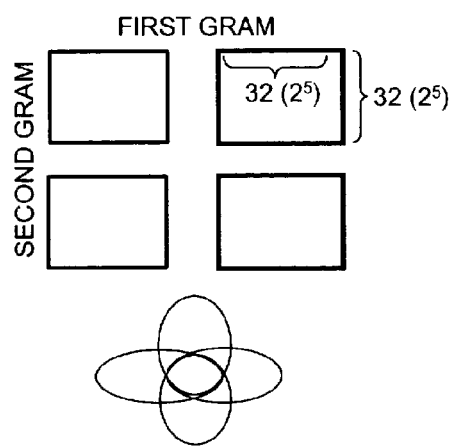
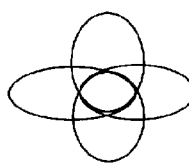

FIG.2

| BI-GRAM COMBINATION | (A) SIZE (NO DIVISION) | (B) SIZE (TWO-PART DIVISION) | (C) SIZE (FOUR-PART DIVISION) |
|---|---|---|---|
| HIGHER-ORDER CHARACTER CODES | 1024x1024=1M | 1024x32x2=64K | 32x32x4=4K |
| HIGHER-ORDER CHARACTER CODE × UPPER CHARACTER CODE COMPONENT | 1024x256=256K | 1024x16x2=32K | 32x16x4=2K |
| UPPER CHARACTER CODE COMPONENT × LOWER CHARACTER CODE COMPONENT | 256x256=64K | 256x16x2=8K | 16x16x4=1K |
| LOWER CHARACTER CODE COMPONENT × UPPER CHARACTER CODE COMPONENT | 256x256=64K | 256x16x2=8K | 16x16x4=1K |
| LOWER CHARACTER CODE COMPONENT × HIGHER-ORDER CHARACTER CODE | 1024x256=256K | 1024x16x2=32K | 32x16x4=2K |
| TOTAL | 1.64M | 144K | 10K |

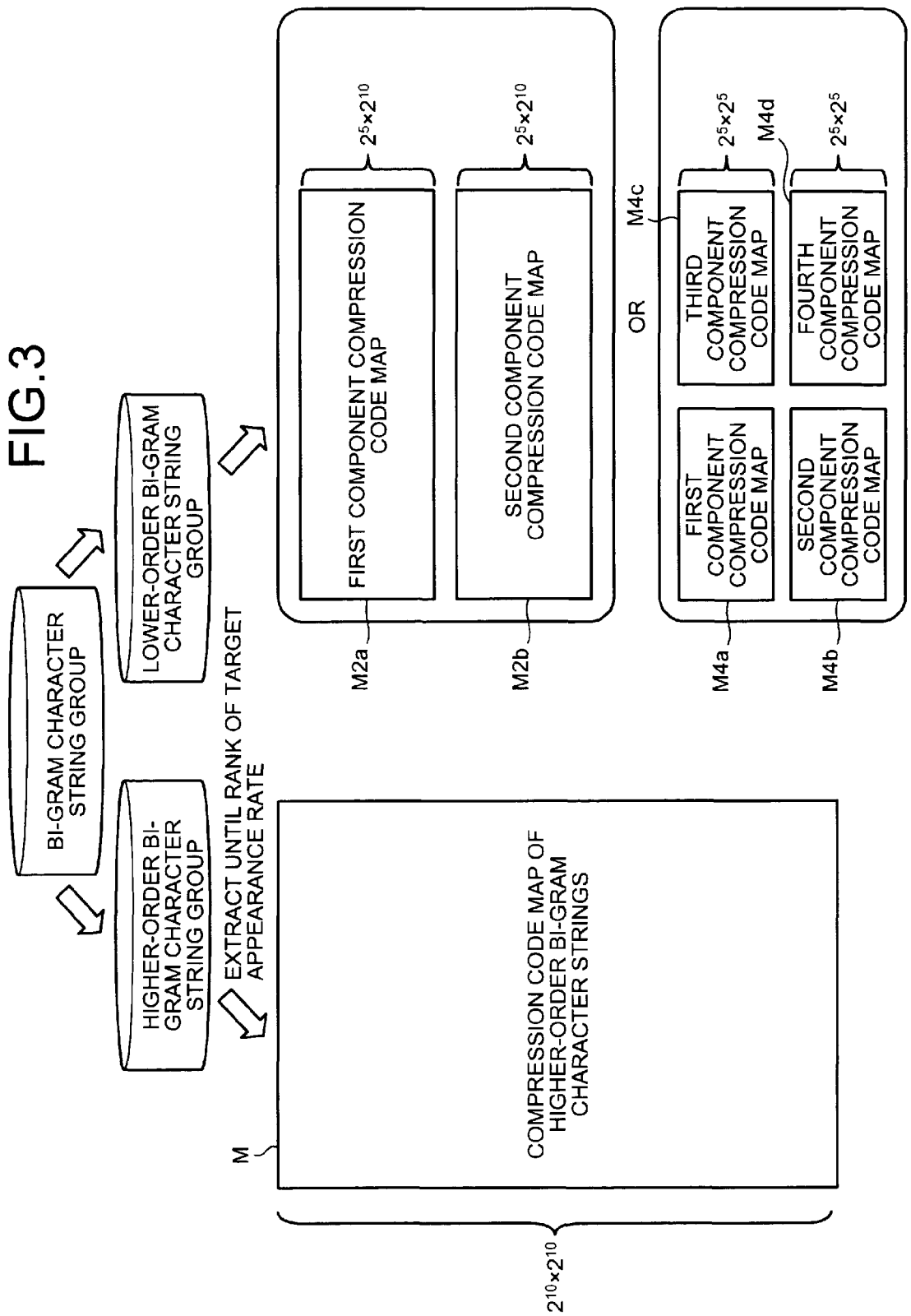

| COMPRESSION CODE STRING OF BIGRAM CHARACTER STRING | FILE NUMBER 123 ... i ... n-1 n |
|---|---|
| ⋮ | ⋮ |
| す る 5930 8B30 COMPRESSION CODE STRING (20-BIT) | 111 ... 1 ... 1 1 |
| ⋮ | ⋮ |
| る め 8B30 8130 COMPRESSION CODE STRING (20-BIT) | 001 ... 0 ... 0 0 |
| ⋮ | ⋮ |
| 例 え 8B4F 4830 COMPRESSION CODE STRING (20-BIT) | 111 ... 1 ... 1 1 |
| ⋮ | ⋮ |

$2^{10} \times 2^{10}$

FIG.11

| THIRD CONCATENATED CODE | FILE NUMBER |  |  |  |  |  |
|---|---|---|---|---|---|---|
|  | 1 | 2 | 3 | ... i ... | n-1 | n |
| ⋮ | ⋮ |  |  |  |  |  |
| 0x30 0x8B — THIRD CONCATENATED CODE (10-BIT) | 1 | 1 | 1 | ... 1 ... | 1 | 1 |
| ⋮ | ⋮ |  |  |  |  |  |
| 0x30 0x81 — THIRD CONCATENATED CODE (10-BIT) | 1 | 1 | 1 | ... 0 ... | 1 | 0 |
| ⋮ | ⋮ |  |  |  |  |  |
| 0x4F 0x48 — THIRD CONCATENATED CODE (10-BIT) | 1 | 1 | 1 | ... 1 ... | 1 | 1 |
| ⋮ | ⋮ |  |  |  |  |  |

$2^5 \times 2^5$

FIG.19

| RANK | CHARACTER UNIT | | | NUMBER OF APPEAR-ANCES | TOTAL APPEAR-ANCE COUNT | APPEAR-ANCE RATE | BEFORE CORRECTION | |
|---|---|---|---|---|---|---|---|---|
| | TYPE | CODE | CHAR-ACTER (STRING) | | | | OCCUR-RENCE PROBA-BILITY | COM-PRESSION CODE LENGTH |
| 1 | 16 | 3000 | 0 | 60451 | 1386951 | 0.043585534 | 0.03125 | 5 |
| 2 | 16 | 3E00 | > | 53183 | 1386951 | 0.038345262 | 0.03125 | 5 |
| ⋮ | ⋮ | ⋮ | ⋮ | ⋮ | ⋮ | ⋮ | ⋮ | ⋮ |
| 6 | FW | | \<br\> | 28999 | 1386951 | 0.020908453 | 0.015625 | 6 |
| ⋮ | ⋮ | ⋮ | ⋮ | ⋮ | ⋮ | ⋮ | ⋮ | ⋮ |
| 24 | 16 | 6E30 | の | 15577 | 1386951 | 0.011231111 | 0.0078125 | 7 |
| ⋮ | ⋮ | ⋮ | ⋮ | ⋮ | ⋮ | ⋮ | ⋮ | ⋮ |
| 34 | 16 | 7000 | p | 10737 | 1386951 | 0.007741441 | 0.00390625 | 8 |
| ⋮ | ⋮ | ⋮ | ⋮ | ⋮ | ⋮ | ⋮ | ⋮ | ⋮ |
| 79 | 16 | 6F30 | は | 3529 | 1386951 | 0.00254443 | 0.001953125 | 9 |
| ⋮ | ⋮ | ⋮ | ⋮ | ⋮ | ⋮ | ⋮ | ⋮ | ⋮ |
| 110 | 16 | 6972 | 物 | 1569 | 1386951 | 0.001131258 | 0.000976563 | 10 |
| ⋮ | ⋮ | ⋮ | ⋮ | ⋮ | ⋮ | ⋮ | ⋮ | ⋮ |
| 156 | 8 | 0x4E | | 879 | 1386951 | 0.000633764 | 0.000488281 | 11 |
| ⋮ | ⋮ | ⋮ | ⋮ | ⋮ | ⋮ | ⋮ | ⋮ | ⋮ |
| 167 | 8 | 0x51 | | 835 | 1386951 | 0.00060204 | 0.000488281 | 11 |
| ⋮ | ⋮ | ⋮ | ⋮ | ⋮ | ⋮ | ⋮ | ⋮ | ⋮ |
| 286 | 16 | D552 | 動 | 485 | 1386951 | 0.000349688 | 0.000244141 | 12 |
| ⋮ | ⋮ | ⋮ | ⋮ | ⋮ | ⋮ | ⋮ | ⋮ | ⋮ |
| 364 | 8 | 0x93 | | 337 | 1386951 | 0.000242979 | 0.00012207 | 13 |
| ⋮ | ⋮ | ⋮ | ⋮ | ⋮ | ⋮ | ⋮ | ⋮ | ⋮ |
| 691 | 16 | 216B | 次 | 145 | 1386951 | 0.000104546 | 6.10352E-05 | 14 |
| ⋮ | ⋮ | ⋮ | ⋮ | ⋮ | ⋮ | ⋮ | ⋮ | ⋮ |
| 1022 | 16 | EF83 | 華 | 84 | 1386951 | 6.05645E-05 | 3.05176E-05 | 15 |
| ⋮ | ⋮ | ⋮ | ⋮ | ⋮ | ⋮ | ⋮ | ⋮ | ⋮ |
| 1301 | 8 | 0xCE | | 42 | 1386951 | 3.02823E-05 | 1.52588E-05 | 16 |
| 1302 | 8 | 0xFD | | 35 | 1386951 | 2.52352E-05 | 1.52588E-05 | 16 |
| 1303 | 8 | 0xEA | | 33 | 1386951 | 2.37932E-05 | 1.52588E-05 | 16 |
| 1304 | 8 | 0x24 | | 23 | 1386951 | 1.65831E-05 | 1.52588E-05 | 16 |
| 1305 | 8 | 0x23 | | 17 | 1386951 | 1.22571E-05 | 7.62939E-06 | 17 |
| | | | | | | SUM OF OCCUR-RENCE PROBA-BILITIES | 0.711037 | |

FIG.20

| COMPRESSION CODE LENGTH | NUMBER OF LEAVES | NUMBER OF LEAVES IN CORRECTION A | NUMBER OF LEAVES IN CORRECTION B-1 | NUMBER OF LEAVES IN CORRECTION B-2 | NUMBER OF LEAVES IN CORRECTION B-3 | NUMBER OF BRANCHES OF HUFFMAN TREE | |
|---|---|---|---|---|---|---|---|
| | | | | | | PER LEAF | SUBTOTAL |
| 5 | 2 | 2 | 1 | 0 | 0 | 64 | 0 |
| 6 | 9 | 9 | 7 | 6 | 6 | 32 | 192 |
| 7 | 22 | 22 | 19 | 18 | 18 | 16 | 288 |
| 8 | 28 | 28 | 24 | 23 | 23 | 8 | 184 |
| 9 | 29 | 29 | 25 | 23 | 23 | 4 | 92 |
| 10 | 25 | 25 | 21 | 20 | 20 | 2 | 40 |
| 11 | 86 | 1190 | 1208 | 1215 | 1215 | 1 | 1215 |
| 12 | 162 | | | | | | |
| 13 | 251 | | | | | | |
| 14 | 407 | | | | | | |
| 15 | 279 | | | | | | |
| 16 | 4 | | | | | | |
| 17 | 1 | | | | | | |
| TOTAL LEAVES SUM OF OCCURRENCE PROBABILITIES | 1305 0.711 | 1305 1.146 | 1305 1.042 | 1305 0.982 | 1305 0.982 | | |
| TOTAL BRANCHES | | | | | | | 2011 |

FIG.21

| RANK | CHARACTER UNIT TYPE | CODE | CHARACTER (STRING) | NUMBER OF APPEARANCES | TOTAL APPEARANCE COUNT | APPEARANCE RATE | BEFORE CORRECTION OCCURRENCE PROBABILITY | BEFORE CORRECTION COMPRESSION CODE LENGTH | BEFORE CORRECTION AVERAGE LENGTH | CORRECTION A OCCURRENCE PROBABILITY | CORRECTION A COMPRESSION CODE LENGTH | CORRECTION A AVERAGE LENGTH | CORRECTION B-1 OCCURRENCE PROBABILITY | CORRECTION B-1 COMPRESSION CODE LENGTH | CORRECTION B-1 AVERAGE LENGTH | CORRECTION B-2 OCCURRENCE PROBABILITY | CORRECTION B-2 COMPRESSION CODE LENGTH | CORRECTION B-2 AVERAGE LENGTH |
|---|---|---|---|---|---|---|---|---|---|---|---|---|---|---|---|---|---|---|
| 1 | 16 | 3000 | 。 | 60451 | 1386951 | 0.043586 | 0.03125 | 5 | 0.217928 | 0.03125 | 5 | 0.217928 | 0.03125 | 5 | 0.217928 | 0.015625 | 6 | 0.261513 |
| 2 | 16 | 3E00 | 、 | 53183 | 1386951 | 0.038345 | 0.03125 | 5 | 0.191726 | 0.03125 | 5 | 0.191726 | 0.015625 | 6 | 0.230072 | 0.015625 | 6 | 0.230072 |
| 3 | 16 | 2200 | " | 33815 | 1386951 | 0.024381 | 0.015625 | 6 | 0.146285 | 0.015625 | 6 | 0.146285 | 0.015625 | 6 | 0.146285 | 0.015625 | 6 | 0.146285 |
| ... | ... | ... | ... | ... | ... | ... | ... | ... | ... | ... | ... | ... | ... | ... | ... | ... | ... | ... |
| 12 | 16 | 3400 | 4 | 21501 | 1386951 | 0.015502 | 0.007813 | 7 | 0.108516 | 0.007813 | 7 | 0.108516 | 0.007813 | 7 | 0.108516 | 0.007813 | 7 | 0.108516 |
| ... | ... | ... | ... | ... | ... | ... | ... | ... | ... | ... | ... | ... | ... | ... | ... | ... | ... | ... |
| 34 | 16 | 7000 | p | 10737 | 1386951 | 0.007741 | 0.003906 | 8 | 0.061932 | 0.003906 | 8 | 0.061932 | 0.003906 | 8 | 0.061932 | 0.003906 | 8 | 0.061932 |
| ... | ... | ... | ... | ... | ... | ... | ... | ... | ... | ... | ... | ... | ... | ... | ... | ... | ... | ... |
| 62 | 16 | 6A30 | 社 | 5107 | 1386951 | 0.003682 | 0.001953 | 9 | 0.03314 | 0.001953 | 9 | 0.03314 | 0.001953 | 9 | 0.03314 | 0.001953 | 9 | 0.03314 |
| ... | ... | ... | ... | ... | ... | ... | ... | ... | ... | ... | ... | ... | ... | ... | ... | ... | ... | ... |
| 91 | 16 | 6430 | ． | 2637 | 1386951 | 0.001901 | 0.000977 | 10 | 0.019013 | 0.000977 | 10 | 0.019013 | 0.000977 | 10 | 0.019013 | 0.000488 | 11 | 0.020914 |
| ... | ... | ... | ... | ... | ... | ... | ... | ... | ... | ... | ... | ... | ... | ... | ... | ... | ... | ... |
| 116 | 16 | 625F | 挨 | 1309 | 1386951 | 0.000944 | 0.000488 | 11 | 0.010382 | 0.000488 | 11 | 0.010382 | 0.000488 | 11 | 0.010382 | 0.000488 | 11 | 0.010382 |
| ... | ... | ... | ... | ... | ... | ... | ... | ... | ... | ... | ... | ... | ... | ... | ... | ... | ... | ... |
| 202 | 8 | 75 | | 673 | 1386951 | 0.000485 | 0.000244 | 12 | 0.005823 | 0.000488 | 11 | 0.005338 | 0.000488 | 11 | 0.005338 | 0.000488 | 11 | 0.005338 |
| ... | ... | ... | ... | ... | ... | ... | ... | ... | ... | ... | ... | ... | ... | ... | ... | ... | ... | ... |
| 364 | 8 | 93 | | 337 | 1386951 | 0.000243 | 0.000122 | 13 | 0.003159 | 0.000488 | 11 | 0.002673 | 0.000488 | 11 | 0.002673 | 0.000488 | 11 | 0.002673 |
| ... | ... | ... | ... | ... | ... | ... | ... | ... | ... | ... | ... | ... | ... | ... | ... | ... | ... | ... |
| 615 | 8 | 45 | | 169 | 1386951 | 0.000122 | 6.10352E-05 | 14 | 0.001706 | 0.000488 | 11 | 0.00134 | 0.000488 | 11 | 0.00134 | 0.000488 | 11 | 0.00134 |
| ... | ... | ... | ... | ... | ... | ... | ... | ... | ... | ... | ... | ... | ... | ... | ... | ... | ... | ... |
| 1022 | 16 | EF83 | ■ | 84 | 1386951 | 6.05645E-05 | 3.05176E-05 | 15 | 0.000908 | 0.000488 | 11 | 0.000666 | 0.000488 | 11 | 0.000666 | 0.000488 | 11 | 0.000666 |
| ... | ... | ... | ... | ... | ... | ... | ... | ... | ... | ... | ... | ... | ... | ... | ... | ... | ... | ... |
| 1301 | 8 | CE | | 42 | 1386951 | 3.02823E-05 | 1.52588E-05 | 16 | 0.000485 | 0.000488 | 11 | 0.000333 | 0.000488 | 11 | 0.000333 | 0.000488 | 11 | 0.000333 |
| ... | ... | ... | ... | ... | ... | ... | ... | ... | ... | ... | ... | ... | ... | ... | ... | ... | ... | ... |
| 1305 | 8 | 23 | | 17 | 1386951 | 1.22571E-05 | 7.62939E-06 | 17 | 0.000208 | 0.000488 | 11 | 0.000135 | 0.000488 | 11 | 0.000135 | 0.000488 | 11 | 0.000135 |
| TOTAL | | | | 1386951 | | 1 | 0.711037 | | 8.179405 | 1.146484 | | 7.878965 | 1.049316 | | 8.103753 | 0.98584 | | 8.277232 |

FIG.26

| CHARACTER CODE COMPONENT STRUCTURE ||
|---|---|
| CHARACTER CODE COMPONENT | POINTER TO LEAF |
| 0x00 | POINTER TO LEAF "0x00" |
| 0x01 | POINTER TO LEAF "0x01" |
| ⋮ | ⋮ |
| 0xFF | POINTER TO LEAF "0xFF" |

FIG.27

| FUNDAMENTAL WORD STRUCTURE ||
|---|---|
| TOTAL NUMBER OF FUNDAMENTAL WORDS | 1000 |
| MAXIMUM BIT LENGTH OF FUNDAMENTAL WORD | Lsmax |
| BIT LENGTH OF FUNDAMENTAL WORD s1 | Ls1 |
| FUNDAMENTAL WORD s1 ("相方") ||
| POINTER TO LEAF FUNDAMENTAL WORD s1 ||
| ⋮ ||
| BIT LENGTH OF FUNDAMENTAL WORD s1000 | Ls1000 |
| FUNDAMENTAL WORD s1000 ("ワン切り") ||
| POINTER TO LEAF FUNDAMENTAL WORD s1000 ||
| EOT(0xFFFF) ||

FIG.28

| | SPECIFIED SINGLE CHARACTER APPEARANCE MAP COMPONENT APPEARANCE MAP | | | BI-GRAM CHARACTER STRING APPEARANCE MAP | | |
|---|---|---|---|---|---|---|
| (A) 竜馬は脱藩した ↑ | COMPRES-SION CODE OF "竜" | FILE NUMBER 1 2 3 ... i | 0 0 0 ... 1 | | | |
| (B) 竜馬は脱藩した ↑ | COMPRES-SION CODE OF "馬" | FILE NUMBER 1 2 3 ... i | 0 0 1 ... 1 | COMPRES-SION CODE OF "竜馬" | FILE NUMBER 1 2 3 ... i | 0 0 0 ... 1 |
| (C) 竜馬は脱藩した ↑ | COMPRES-SION CODE OF "は" | FILE NUMBER 1 2 3 ... i | 1 1 1 ... 1 | COMPRES-SION CODE OF "馬は" | FILE NUMBER 1 2 3 ... i | 0 0 0 ... 1 |
| (D) 竜馬は脱藩した 0x81 0x31 ↑ | COMPRES-SION CODE OF "0x81" | FILE NUMBER 1 2 3 ... i | 1 0 0 ... 1 | COMPRES-SION CODE OF "は 0x81" | FILE NUMBER 1 2 3 ... i | 1 0 0 ... 1 |
| (E) 竜馬は脱藩した 0x81 0x31 ↑ | COMPRES-SION CODE OF "0x31" | FILE NUMBER 1 2 3 ... i | 0 1 1 ... 1 | COMPRES-SION CODE OF "0x81 0x31" | FILE NUMBER 1 2 3 ... i | 0 1 0 ... 1 |
| (F) 竜馬は脱藩した 0xE9 0x85 ↑ | COMPRES-SION CODE OF "0xE9" | FILE NUMBER 1 2 3 ... i | 0 1 1 ... 1 | COMPRES-SION CODE OF "0x31 0xE9" | FILE NUMBER 1 2 3 ... i | 0 0 0 ... 1 |
| (G) 竜馬は脱藩した 0xE9 0x85 ↑ | COMPRES-SION CODE OF "0x85" | FILE NUMBER 1 2 3 ... i | 1 0 0 ... 1 | COMPRES-SION CODE OF "0xE9 0x85" | FILE NUMBER 1 2 3 ... i | 0 0 0 ... 1 |
| (H) 竜馬は脱藩した ↑ | COMPRES-SION CODE OF "し" | FILE NUMBER 1 2 3 ... i | 1 1 1 ... 1 | COMPRES-SION CODE OF "0x85 し" | FILE NUMBER 1 2 3 ... i | 0 0 0 ... 1 |
| (I) 竜馬は脱藩した ↑ | COMPRES-SION CODE OF "た" | FILE NUMBER 1 2 3 ... i | 1 1 1 ... 1 | COMPRES-SION CODE OF "した" | FILE NUMBER 1 2 3 ... i | 1 1 1 ... 1 |

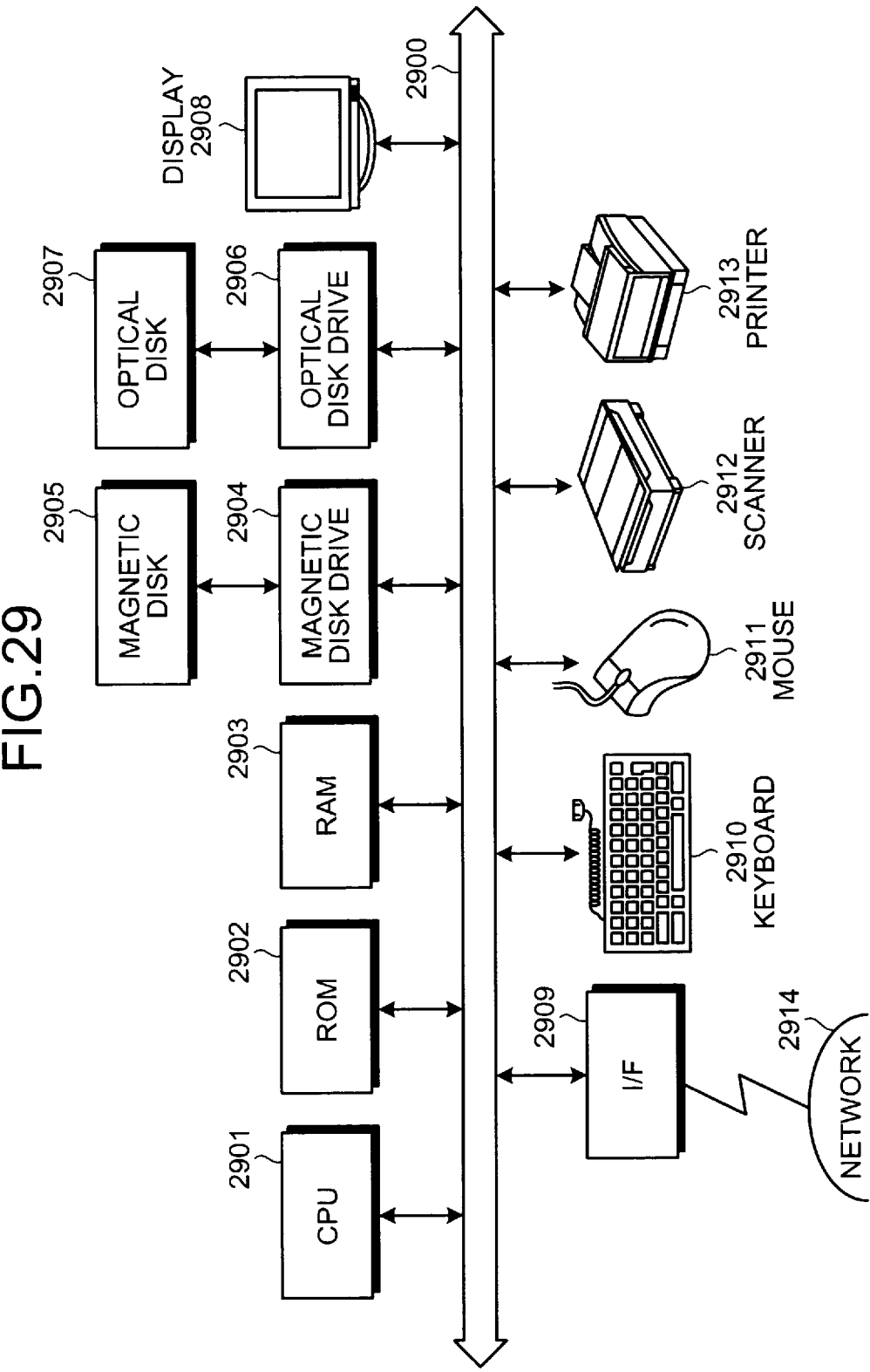

| CHARACTER APPEARANCE FREQUENCY COUNT TABLE ||
|---|---|
| CHARACTER | NUMBER OF APPEARANCES |
| 0 | ... |
| ⋮ | ⋮ |
| 9 | ... |
| A | ... |
| ⋮ | ⋮ |
| Z | ... |
| A | ... |
| ⋮ | ⋮ |
| Z | ... |
| あ | ... |
| ⋮ | ⋮ |
| ん | ... |
| ア | ... |
| ⋮ | ⋮ |
| ン | ... |
| 足 | ... |
| ⋮ | ⋮ |
| 我 | ... |

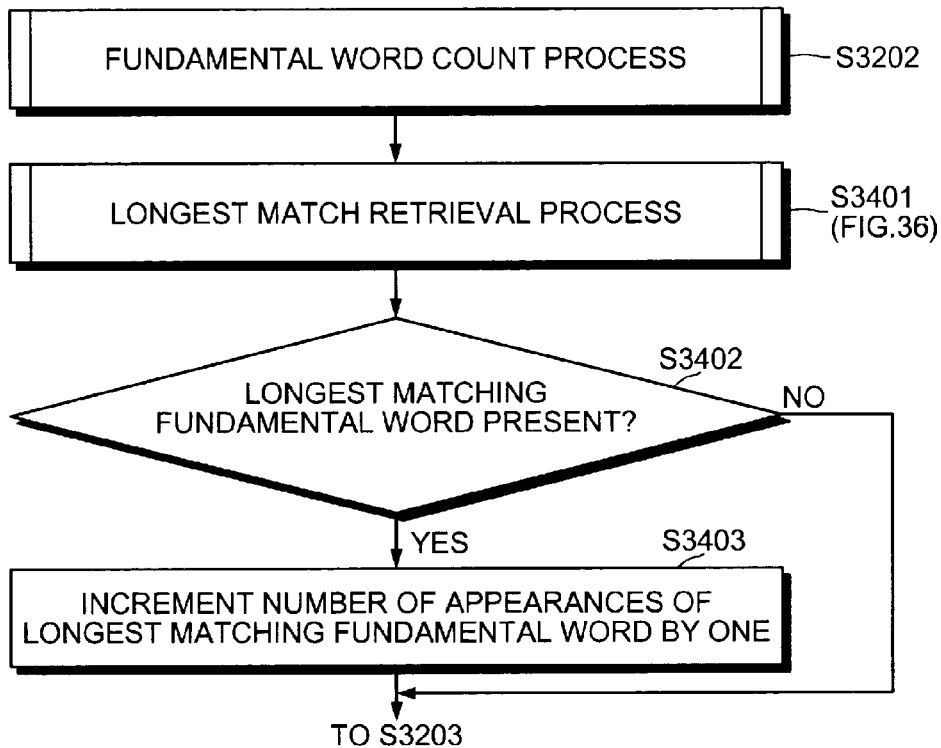

| UPPER CHARACTER CODE COMPONENT APPEARANCE FREQUENCY COUNT TABLE ||
|---|---|
| UPPER CHARACTER CODE COMPONENT | NUMBER OF APPEARANCES |
| 00 | ... |
| 01 | ... |
| 02 | ... |
| ⋮ | ⋮ |
| FF | ... |

| LOWER CHARACTER CODE COMPONENT APPEARANCE FREQUENCY COUNT TABLE ||
|---|---|
| LOWER CHARACTER CODE COMPONENT | NUMBER OF APPEARANCES |
| 00 | ... |
| 01 | ... |
| 02 | ... |
| ⋮ | ⋮ |
| FF | ... |

BI-GRAM CHARACTER STRING APPEARANCE FREQUENCY COUNT TABLE — 4300

| BI-GRAM CHARACTER STRING | NUMBER OF APPEARANCES |
|---|---|
| ああ | ... |
| あい | ... |
| あう | ... |
| ⋮ | ⋮ |

- HUFFMAN TREE GENERATION PROCESS — S3004
- DETERMINE UPPER LIMIT LENGTH N — S4401
- CORRECTION PROCESS — S4402
- GENERATE LEAF STRUCTURE — S4403
- BRANCH NUMBER SPECIFICATION PROCESS — S4404 (FIG.45)
- CONSTRUCTION PROCESS — S4405 (FIG.46)

TO S3005

FIG.65
(A) RETRIEVAL CHARACTER STRING "するめ"
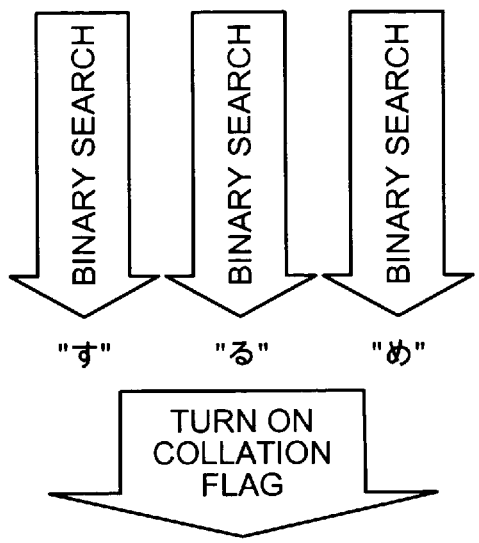
TURN ON COLLATION FLAG
$2^N$-BRANCH NODELESS HUFFMAN TREE
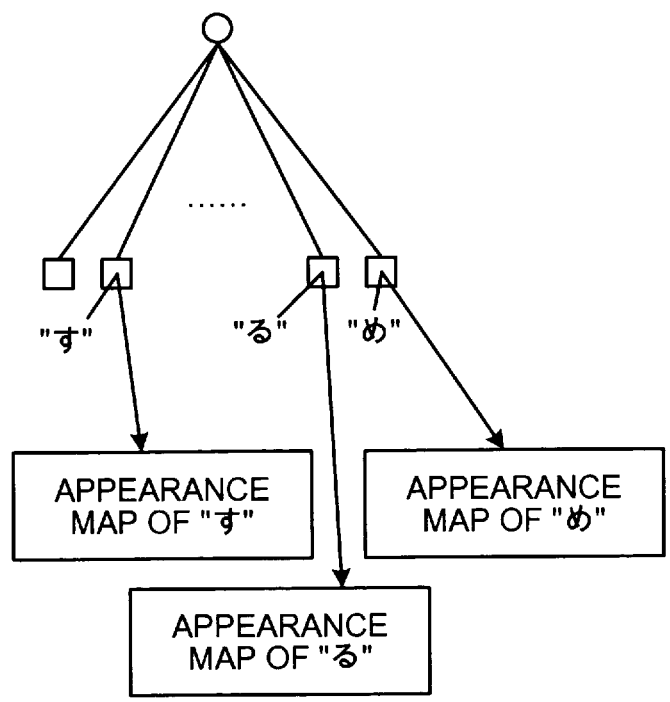

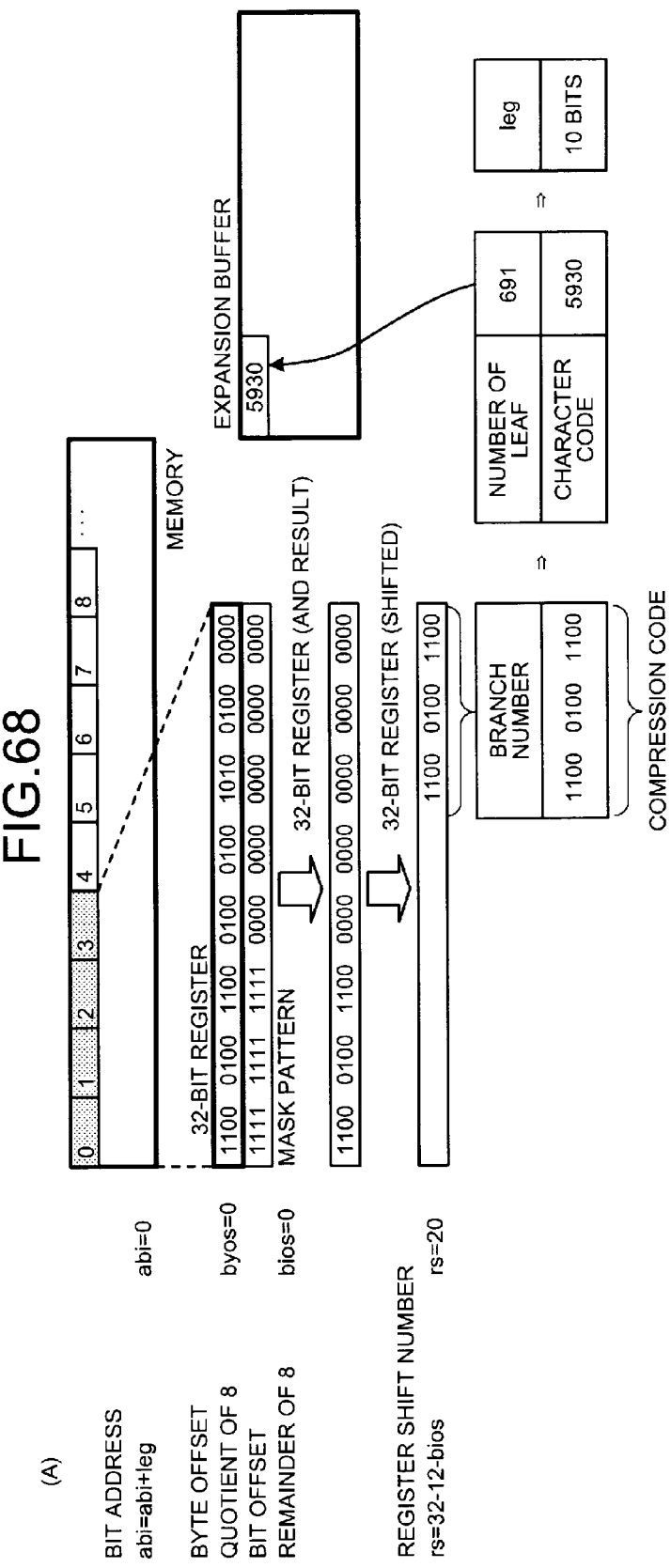

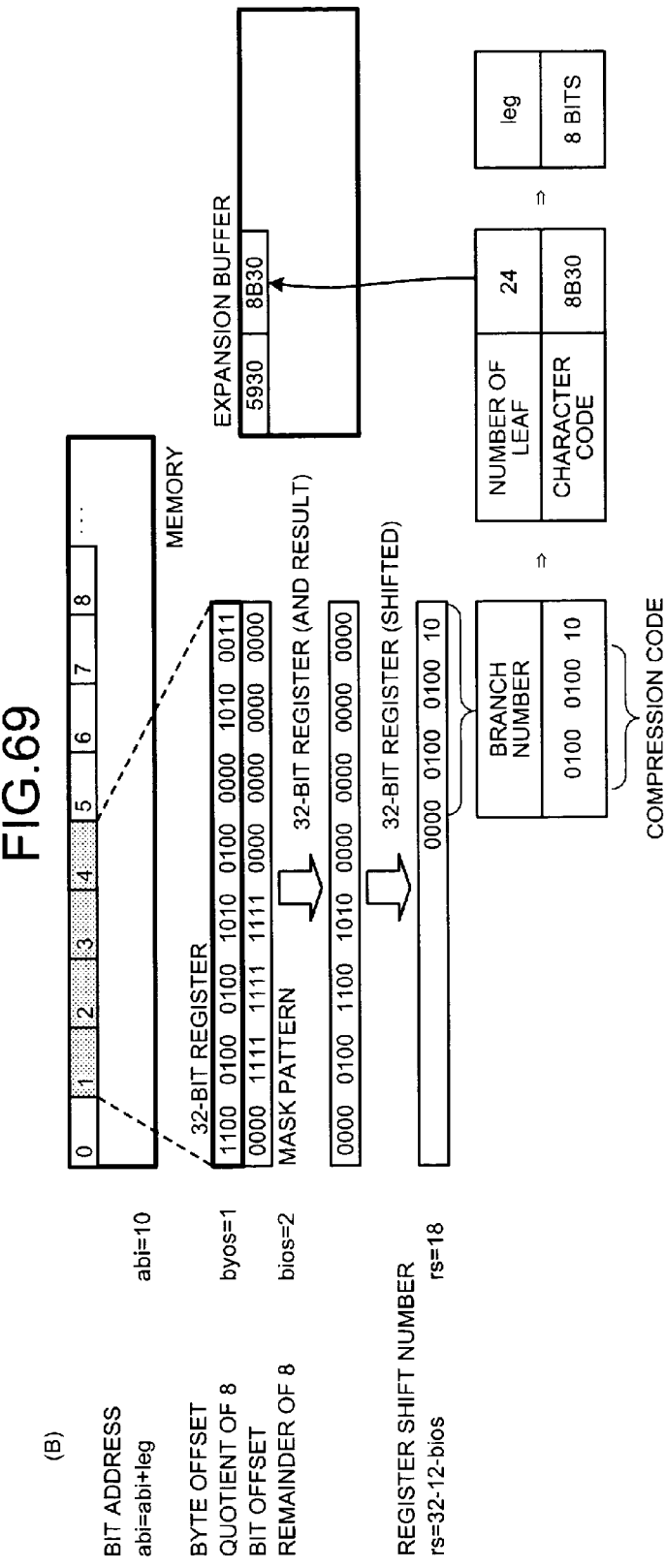

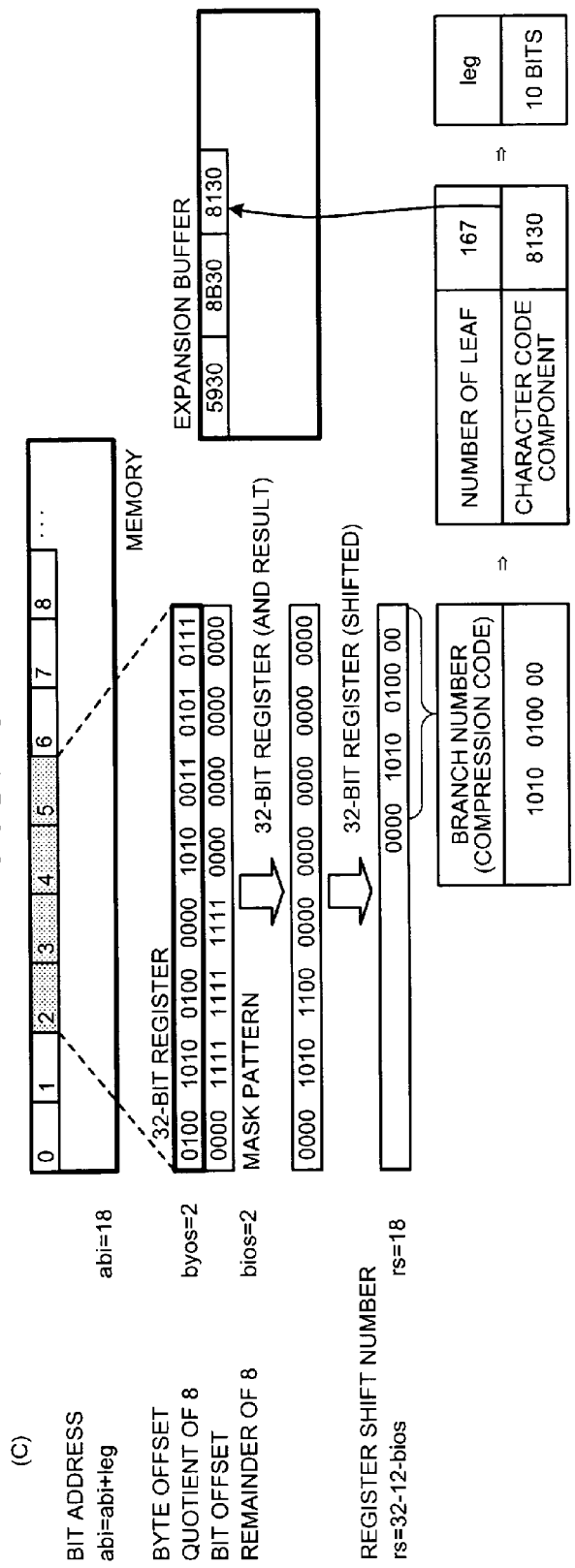

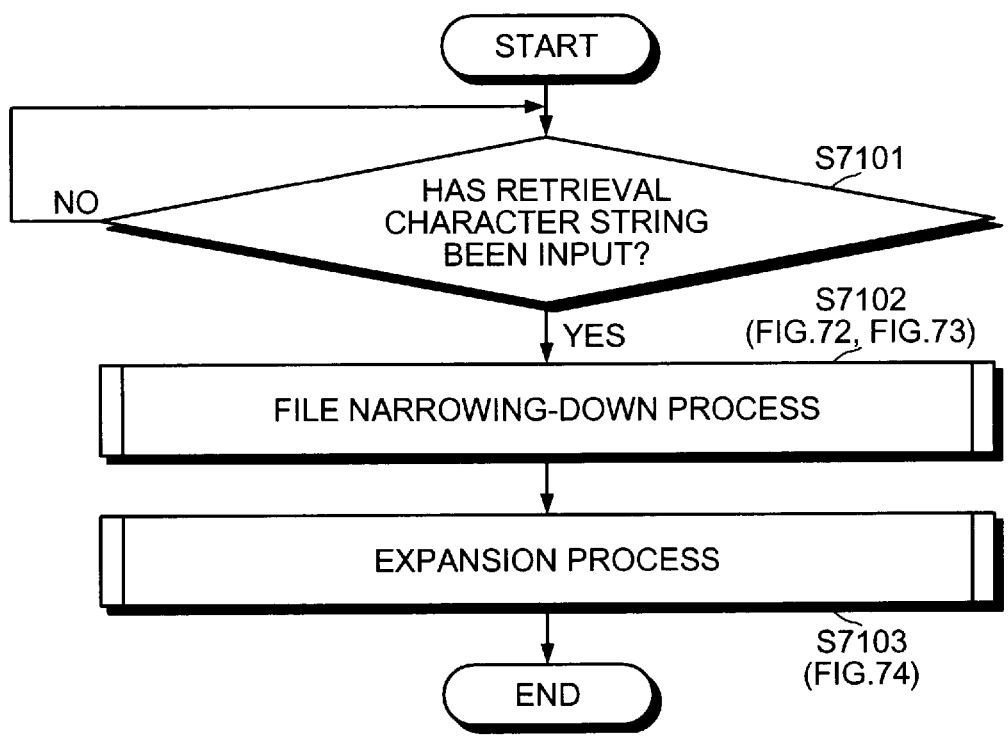

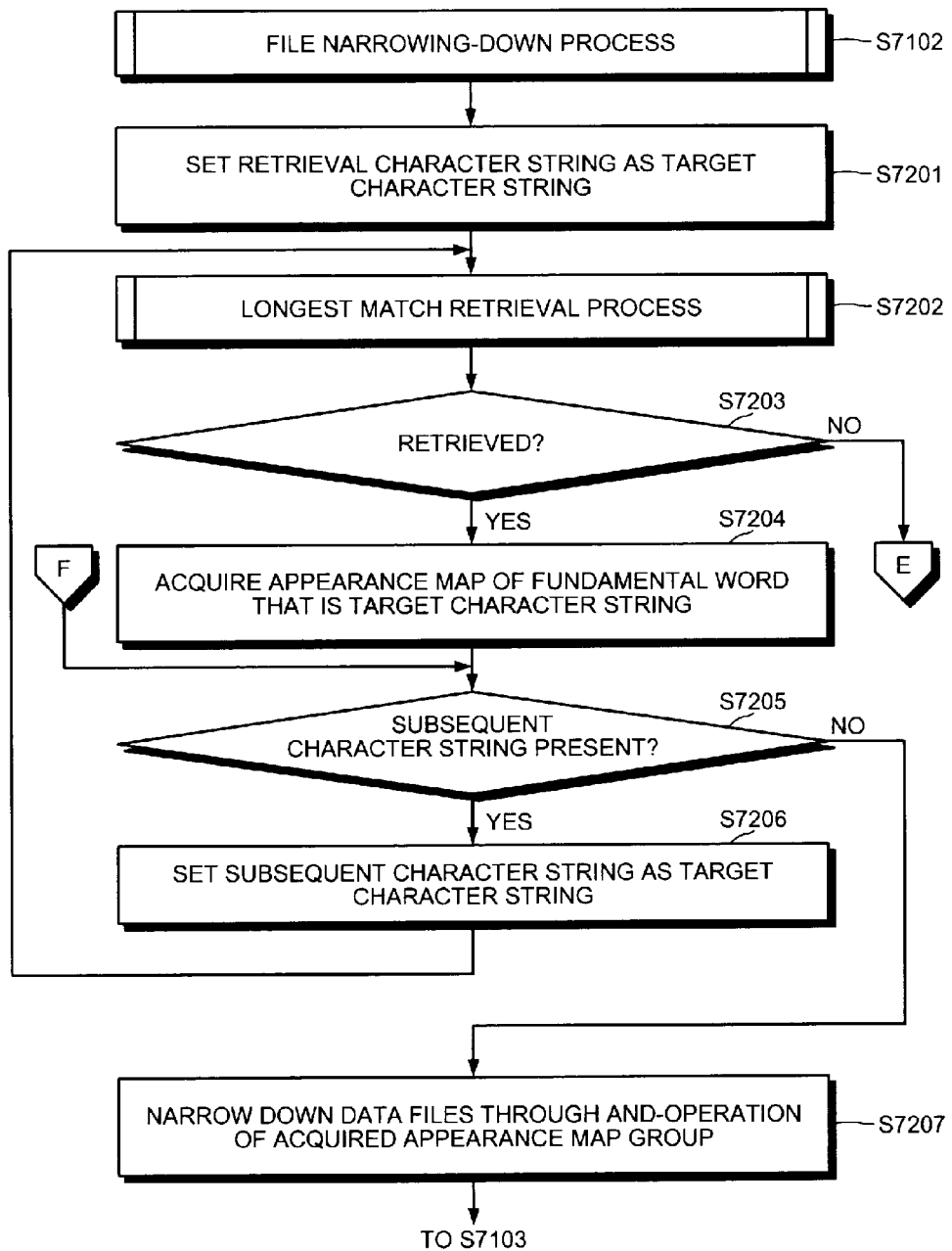

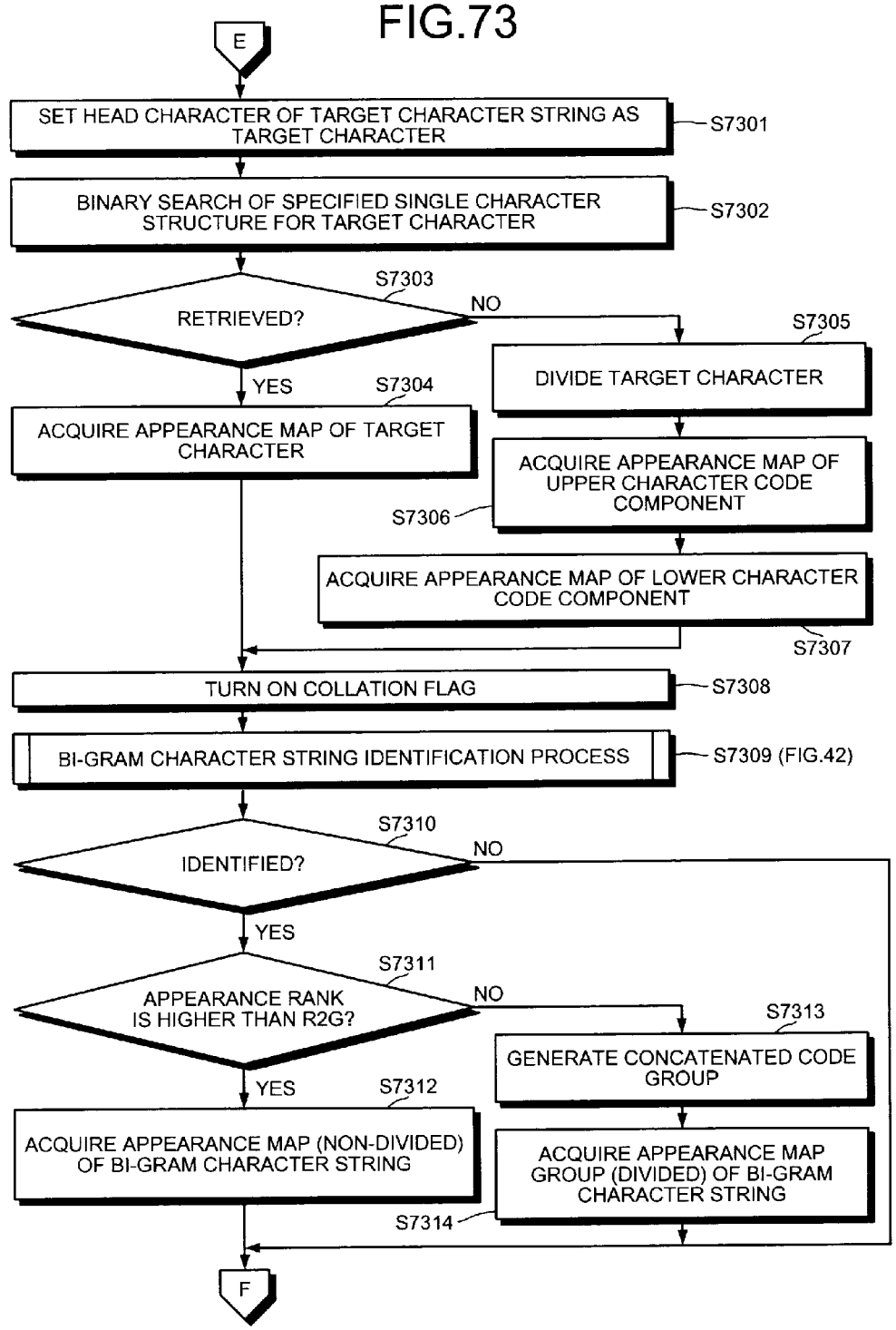

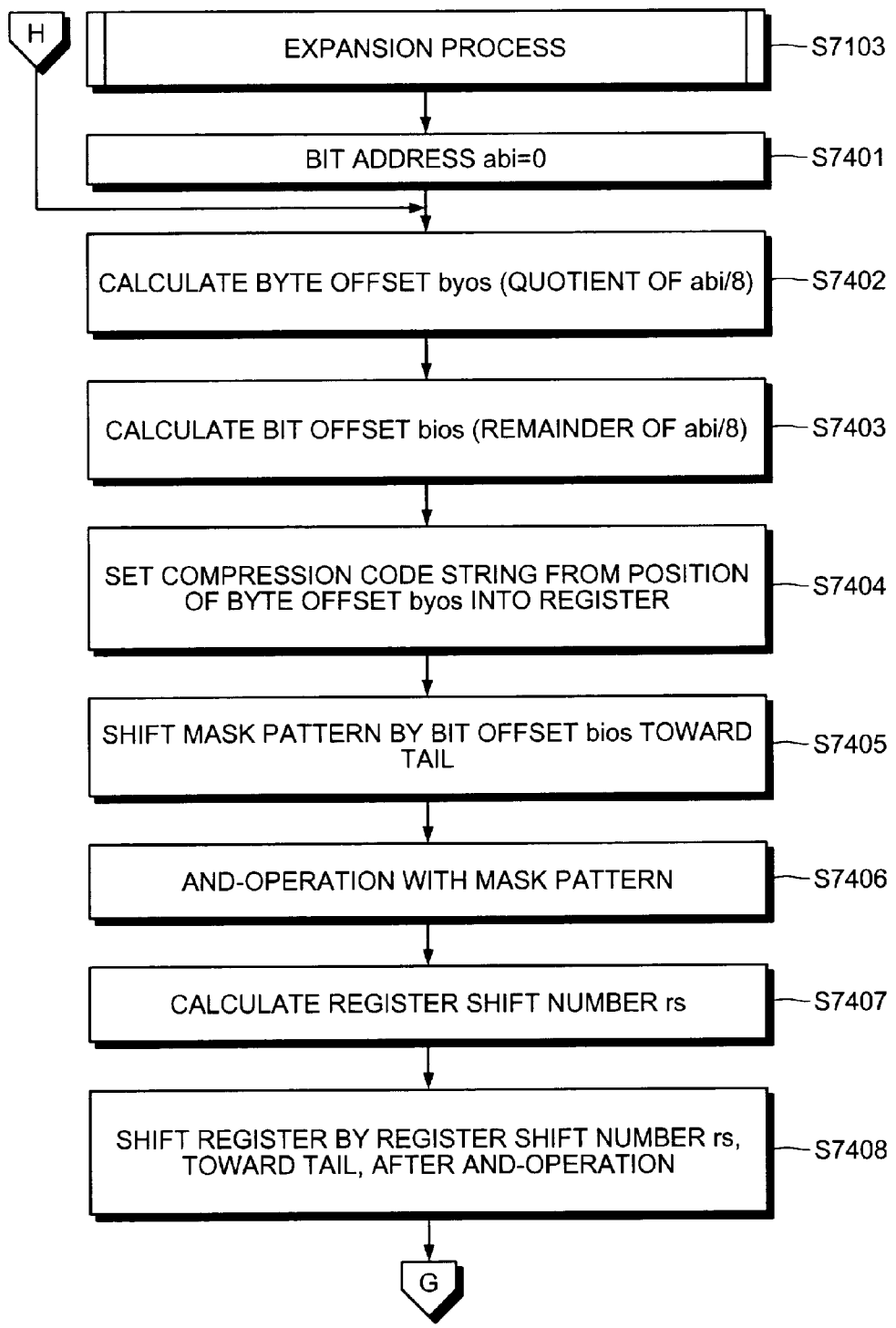

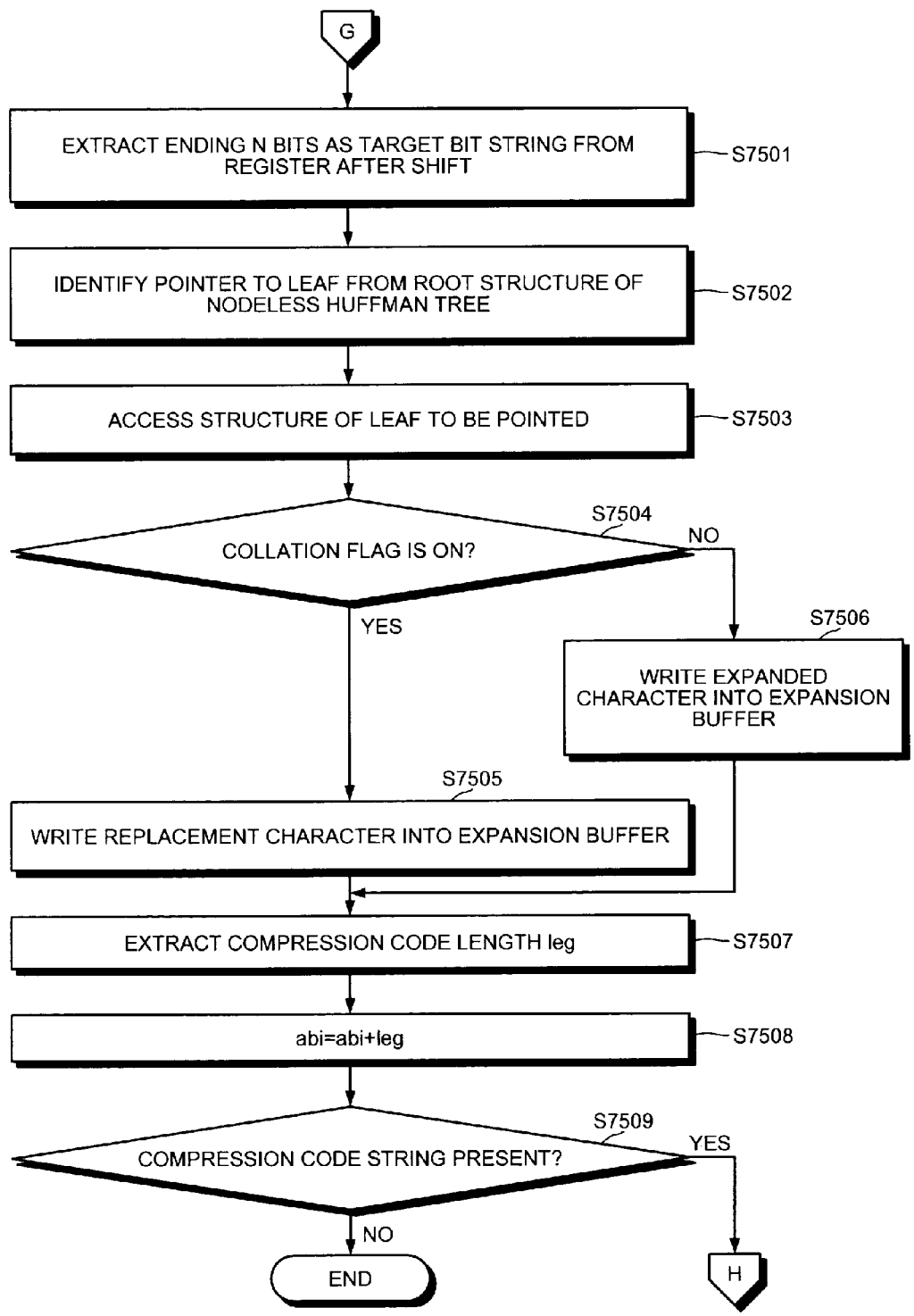

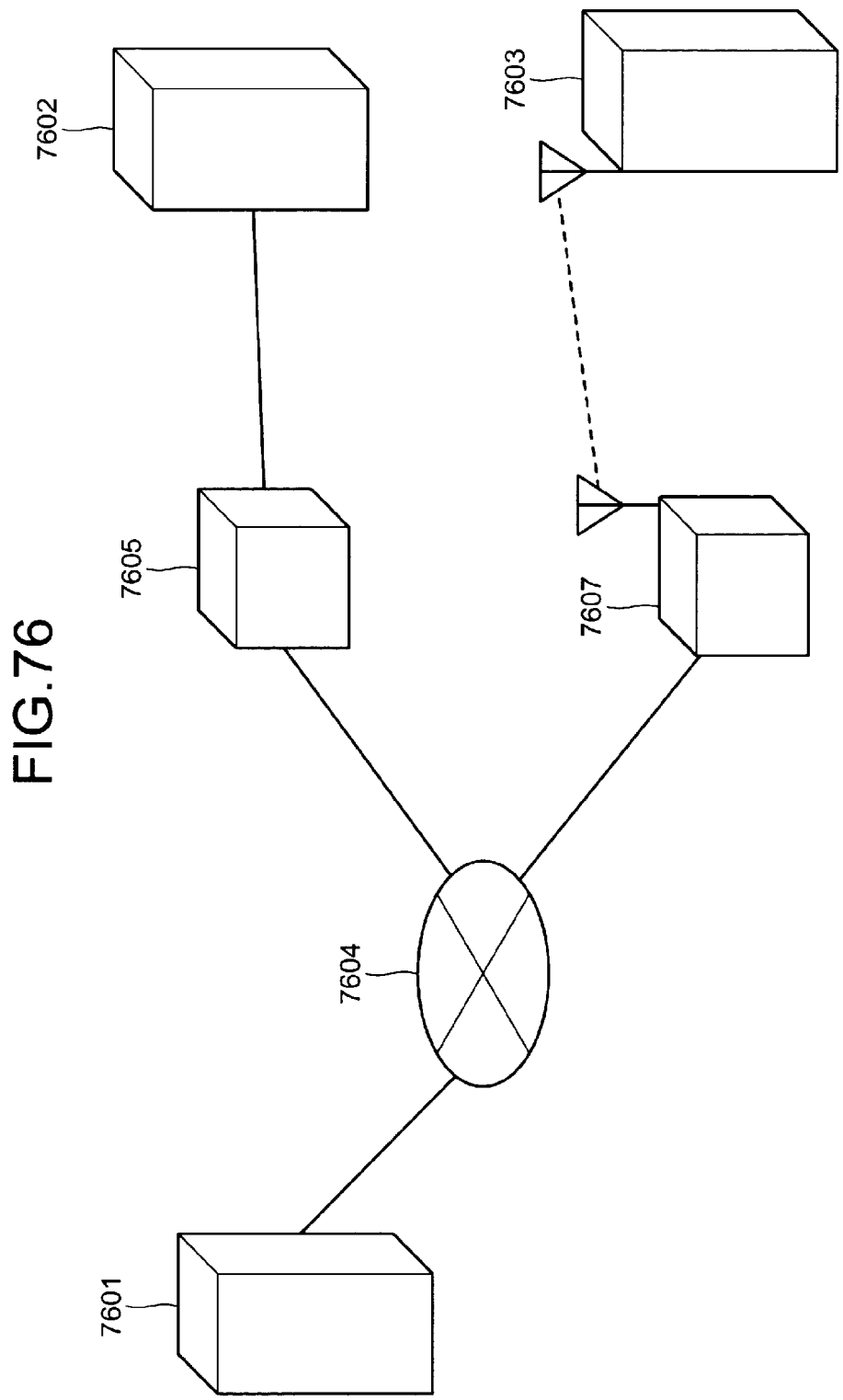

EXTRACTING METHOD, COMPUTER PRODUCT, EXTRACTING SYSTEM, INFORMATION GENERATING METHOD, AND INFORMATION CONTENTS

CROSS REFERENCE TO RELATED APPLICATIONS

This application is a divisional of application Ser. No. 13/423,319, filed Mar. 19, 2012, which is based upon and claims the benefit of priority of the prior Japanese Patent Application No. 2011-081105, filed on Mar. 31, 2011, the entire contents of which are incorporated herein by reference.

FIELD

The embodiments discussed herein are related to a retrieval technique.

BACKGROUND

Conventionally, a technique related to size reduction through compression and narrowing-down through expansion of a character component table has been disclosed (see, e.g., Japanese Patent No. 3333549). A technique related to size reduction of a bi-gram character component table has been disclosed (see, e.g., Japanese Laid-Open Patent Publication No. H6-68159).

A technique has been also disclosed that equivalently realizes a high speed full text search by a concatenated character component table searching unit capable of executing sufficient narrowing-down from a given retrieval term in the case of a document consisting of phonograms of a small number of character types such as English (see, e.g., Japanese Patent No. 3497243).

Retrieval performed based on a map created by using a portion of character codes leads to extraction of a file not including target characters and including non-target characters having the portion of character codes same as those used for creating the map.

SUMMARY

According to an aspect of an embodiment, an extracting method is executed by a computer. The extracting method includes storing to a storage device, a plurality of files respectively including character units; storing to the storage device, first index information indicative of which file includes at least any one of the character units included in a character unit group having a usage frequency that is less than a predetermined frequency and among a plurality of character units that include common information in a predetermined portion, the usage frequency being indicative of, among the plurality of the files, the extent of files that include a given character unit; storing to the storage device, second index information indicative of which file among the plurality of the files, includes a first character unit that has a usage frequency at least equal to the predetermined frequency and is among the character units that include common information in a predetermined portion, the usage frequency being indicative of, among the plurality of the files, the extent of files that include a given character unit; and referring to the first index information and the second index information to extract from the plurality of the files, a file indicated to include character units in the first index information and the second index information, when a request is received for extraction of a file that is among the plurality of the files and includes the first character unit and a second character unit that is included in the character unit group.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1A, 1B, and 1C are explanatory diagrams of size reduction of a compression code map of bi-gram character strings.

FIG. 2 is a chart of sizes related to a division of the compression code map of bi-gram character strings.

FIG. 3 is an explanatory diagram of an example of division of a compression code map of bi-gram character strings.

FIG. 9 is an explanatory diagram of an example of a first component compression code map M4a.

FIG. 11 is an explanatory diagram of an example of a third component compression code map M4c.

FIG. 19 is an explanatory diagram of details of (2) Calculation of Compression Code Length (N=11) of FIG. 17.

FIG. 20 is an explanatory diagram detailing (3) Specification of the Number of Leaves to (5) Generation of Leaf Structure (N=11) depicted in FIG. 17.

FIG. 21 is an explanatory diagram of a correction result for each of character unit.

FIG. 26 is an explanatory diagram of a character code component structure.

FIG. 27 is an explanatory diagram of a fundamental word structure.

FIG. 28 is an explanatory diagram of a generation example of the compression code maps.

FIG. 29 is a block diagram of a hardware configuration of a computer according to an embodiment.

FIG. 33 is an explanatory diagram of a character appearance frequency count table.

FIG. 34 is a flowchart of a detailed process procedure example of a fundamental word count process (step S3202) depicted in FIG. 32.

FIG. 35 is an explanatory diagram of a fundamental word appearance frequency count table.

FIG. 40 is an explanatory diagram of an upper character code component appearance frequency count table.

FIG. 41 is an explanatory diagram of a lower character code component appearance frequency count table.

FIG. 65 is an explanatory diagram of a flow (A) of a retrieval process using the compression code maps.

FIG. 68 is an explanatory diagram (part 1) of collation/expansion according to (D) depicted in FIG. 67.

FIG. 69 is an explanatory diagram (part 2) of collation/expansion according to (D) depicted in FIG. 67.

FIG. 70 is an explanatory diagram (part 3) of collation/expansion according to (D) depicted in FIG. 67.

FIG. 71 is a flowchart of a retrieval process procedure of an embodiment.

FIG. 72 is a flowchart (part 1) of a detailed process procedure of a file narrowing-down process (step S7102) depicted in FIG. 71.

FIG. 73 is a flowchart (part 2) of a detailed process procedure of a file narrowing-down process (step S7102) depicted in FIG. 71.

FIG. 74 is a flowchart (part 1) of a detailed example of an expansion process (step S7103) using a $2^N$-branch nodeless Huffman tree depicted in FIG. 71.

FIG. 75 is a flowchart (part 2) of the detailed example of the expansion process (step S7103) using the $2^N$-branch nodeless Huffman tree depicted in FIG. 71.

FIG. 76 is an explanatory diagram of a configuration example of an extracting system.

DESCRIPTION OF EMBODIMENTS

Figures 4, 5:
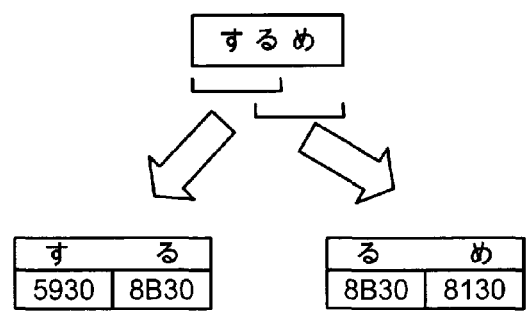
FIG. 4 is an explanatory diagram of a compression code map of bi-gram character strings.
FIG. 5 is an explanatory diagram of an example of a character string present in a data file group.

Preferred embodiments of the present invention are described in detail below with reference to the accompanying drawings. In this description, "character unit" means a single character, a fundamental word, a character code component, etc., making up text data. A data file group is electronic data such as document files, web pages, and e-mails, for example, and is electric data in text format, HTML (HyperText Markup Language) format, and XML (Extensible Markup Language) format, for example.

A "single character" means a character represented by one character code. The length of a character code for a single character differs according to character code type.

For example, the character code is 16-bit code in the case of Unicode Transformation Format (UTF) 16, 8-bit code in the case of American Standard Code for Information Interchange (ASCII) code, and 8-bit code in the case of shift Japanese Industrial Standard (JIS) code. If a Japanese character is represented by the shift JIS code, two 8-bit codes are combined.

"Fundamental words" mean fundamental words taught, for example, in elementary school or junior high school, and reserved words that are represented by particular character strings. Taking an English sentence "This is a . . . " as an example, the fundamental words are words such as "This", "is", and "a" and are classified into a 1000-word level, a 2000-word level, and a several-thousand-word level, to which marks "*", "", and "*" are respectively added in English-Japanese dictionaries. The reserved words are predetermined character strings and include, for example, HTML tags (e.g., <br>).

A "character code component" means each code obtained by dividing a single character into an upper code and a lower code. In this embodiment, as described later, a single character may be divided into an upper code and a lower code. For example, the character code of a single character " 爨 " is represented as "9D82" in the case of UTF16 and is divided into an upper character code component "0x9D" and a lower character code component "0x82".

A "gram" is a character unit. For example, in the case of a single character, one character is a uni-gram. In the case of the character code components, each character code component individually makes up a uni-gram. Therefore, a single character formed by an upper character code component and a lower character code component, such as " 爨 ", is a bi-gram. This embodiment will be described by taking UTF16 as an example of a character code.

In this description, if a "bit is on", the value of the bit is "1" and if a "bit is off", the value of the bit is "0". Nonetheless, configuration may be such that if a "bit is on", the value of the bit is "0" and if a "bit is off", the value of the bit is "1".

First, division of a compression code map will be described with reference to FIGS. 1 to 23. A "compression code map" is a bit map that integrates appearance maps of respective character units. An "appearance map" is a bit string obtained by combining a pointer that specifies a character unit and a bit string indicative of the presence of the character unit in each data file. At the time of a retrieval process, this bit string can be used as an index that indicates whether the target character unit is included, depending on the ON/OFF state of bits. For example, a character unit compression code is employed as a pointer that specifies the character unit. A compression code map of a string of bi-gram characters is a compression code string obtained by combining the compression code of the first gram and the compression code of the second gram.

A "bi-gram character string" is a string of uni-gram characters whose character codes are concatenated. For example, a character string " 人形爨爨 " includes double concatenated characters " 人形 ", " 形爨 ", and " 爨爨 ". Each of " 人 " and " 形 " of the double concatenated characters " 人形 " is a single character that is not divided and therefore, the double concatenated characters " 人形 " is a bi-gram character string by itself.

Since " 爨 " is divided as described above, a combination of a single character " 形 " and the upper character code component "0x9D" of the " 爨 " forms a bi-gram character string. A combination of the upper character code component "0x9D" and the lower character code component "0x82" forms a bi-gram character string. A combination of the lower character code component "0x82" and an undivided single character " 爨 " forms a bi-gram character string.

If a data file group is compressed, fundamental words enable single pass access at the time of generation and retrieval of a compression code map. If the data file group is not compressed, character codes of the character unit may be employed directly as the pointer specifying the character unit.

FIGS. 1A, 1B, and 1C are explanatory diagrams of size reduction of a compression code map of bi-gram character strings. FIG. 1A depicts the size of the compression code map of bi-gram character strings before division. FIG. 1A depicts an example when 10 bits are used as a pointer to a compression code map of a first gram (head gram) and 10 bits are used as a pointer to a compression code map of a second gram (tail gram). In this case, memory of a capacity to store bit strings corresponding to respective character strings of $2^{10} \times 2^{10}$ $(=2^{20})$) patterns is required, resulting in an explosion of the size of memory required.

In FIG. 1B, the pointer to the compression code map of the second gram is divided by 5 bits. In this case, the required memory capacity is $2^{10} \times 2^5 \times 2^2$ $(=2^{16})$ and significant size reduction can be achieved. In the case of FIG. 1B, an AND operation of two appearance maps respectively identified from two divided compression code maps enables narrowing-down of the data files in which a bi-gram character string is present.

In FIG. 1C, the pointer to the compression code map of the first gram is further divided by 5 bits. Therefore, the required memory capacity is $2^5 \times 2^5 \times 4$ $(=2^{12})$ and significant size reduction can be achieved. In the case of FIG. 1C, an AND operation of four appearance maps respectively identified from four divided compression code maps enables narrowing-down of data files where a bi-gram character string is present.

When the map is divided, the division method that is to be used among the division methods depicted in FIG. 1B and FIG. 1C is determined in advance. In the case of two-part division as depicted in FIG. 1B, whether the first gram or the second gram is divided is also determined in advance.

FIG. 2 is a chart of sizes related to the division of the compression code map of bi-gram character strings. When the map is not divided as depicted in FIG. 1A, the total size of combinations of a bi-gram character string is 1.64 M. When the map is divided into two parts as depicted in FIG. 1B, the total memory size of combinations of bi-gram character strings is 144 K. When the map is divided into four parts as depicted in FIG. 1C, the total memory size of combinations of bi-gram character strings is 10 K. As described above, size reduction of appearance maps can be achieved and memory can be saved by performing the division.

FIG. 3 is an explanatory diagram of an example of division of a compression code map of bi-gram character strings. In FIG. 3, a "bi-gram character string group" is a set of bi-gram character strings identified from a data file group. In this embodiment, a compression code map M of bi-gram character strings is divided according to the appearance frequency of bi-gram character strings. For example, for a bi-gram character string group having a higher appearance frequency (hereinafter, a "higher-order bi-gram character string group"), the two-part or four-part division as depicted in FIG. 1B or 1C is not performed. On the other hand, for a bi-gram character string group having a lower appearance frequency (hereinafter, a "lower-order bi-gram character string group"), the two-part or four-part division is performed.

For example, in the case of two-part division, a first component compression code map M2a and a second component compression code map M2b are generated for the lower-order bi-gram character string group. If the first gram is divided, the first component compression code map M2a is a set of first component appearance maps specified by a concatenated code of an upper code of the compression code of the first gram (hereinafter, a "first-gram upper code") and the compression code of the second gram. The second component compression code map M2b is a set of second component appearance maps specified by a concatenated code of a lower code of the compression code of the first gram (hereinafter, a "first-gram lower code") and the compression code of the second gram.

If the second gram is divided, the first component compression code map M2a is a set of the first component appearance maps specified by a concatenated code of the compression code of the first gram and an upper code of the compression code of the second gram (hereinafter, a "second-gram upper code"). The second component compression code map M2b is a set of the second component appearance maps specified by a concatenated code of the compression code of the first gram and a lower code of the compression code of the second gram (hereinafter, a "second-gram lower code").

For example, in the case of the four-part division, for the lower-order bi-gram character string group, a first component compression code map M4a to a fourth divided compression code map M4d are generated. The first component compression code map M4a is a set of first component appearance maps specified by a concatenated code of the first-gram upper code and the second-gram upper code.

The second component compression code map M2b is a set of second component appearance maps specified by a concatenated code of the first-gram upper code and the second-gram lower code.

The third component compression code map M4c is a set of third component appearance maps specified by a concatenated code of the first-gram lower code and the second-gram upper code.

The fourth component compression code map M4d is a set of fourth component appearance maps specified by a concatenated code of the first-gram lower code and the second-gram lower code.

As described above, by not dividing the higher-order bi-gram character strings, a reduction in the size of the compression code map can be achieved and retrieval noise superimposed on the compression code map of the lower-order bi-gram character strings can be removed. The retrieval noise superimposed on the compression code map of the lower-order bi-gram character strings and a method of removing the retrieval noise will hereinafter be described with reference to FIGS. 4 to 16 by taking as an example, the four-part division depicted in FIG. 1C. The two-part division depicted in FIG. 1B may be implemented by a portion of the four-part division and therefore will not be described.

FIG. 4 is an explanatory diagram of a compression code map of bi-gram character strings. In FIG. 4, a compression code string (e.g., 20 bits) of a bi-gram character string is employed as a point specifying a bi-gram character string. In FIG. 4, it is assumed that "すぁ" and "翻え" are higher-order bi-gram character strings and that "ぁめ" is a lower-order bi-gram character string. Since the division according to appearance frequency is not performed in FIG. 4, higher-order bi-gram character strings and lower-order bi-gram character strings are mixed in the compression code map of bi-gram character strings.

FIG. 5 is an explanatory diagram of an example of a character string present in a data file group. A character string "すぁめ" includes a higher-order bi-gram character string "すぁ" and a lower-order bi-gram character string "ぁめ".

Figure 6:
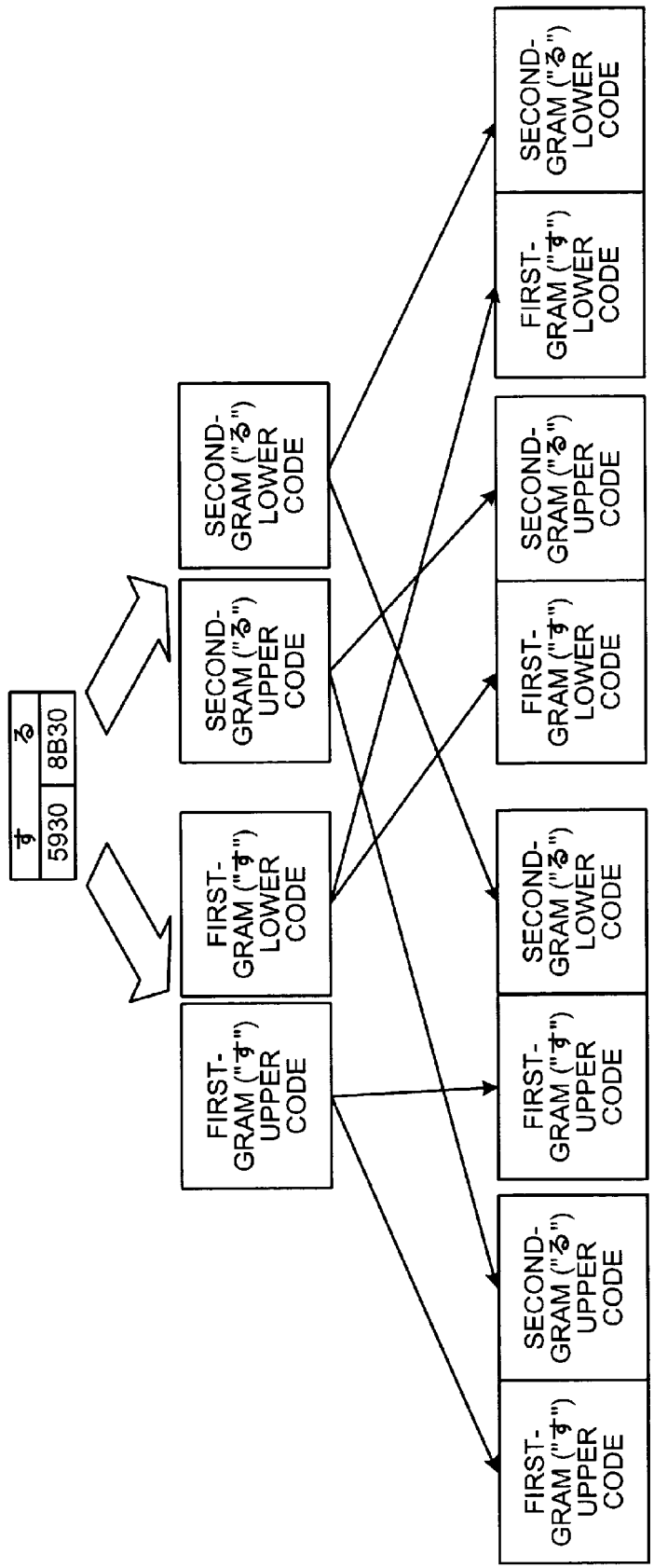
FIG. 6 is an explanatory diagram of an example of four-part division of the bi-gram character string "す＆" depicted in FIG. 5.

FIG. 6 is an explanatory diagram of an example of four-part division of the bi-gram character string "すぁ" depicted in FIG. 5. For the bi-gram character string, the compression code of the first gram "す" and the compression code of the second gram "ぁ" are respectively divided into upper and lower parts and four concatenated codes are generated in a cross-coupled manner.

Figure 7:
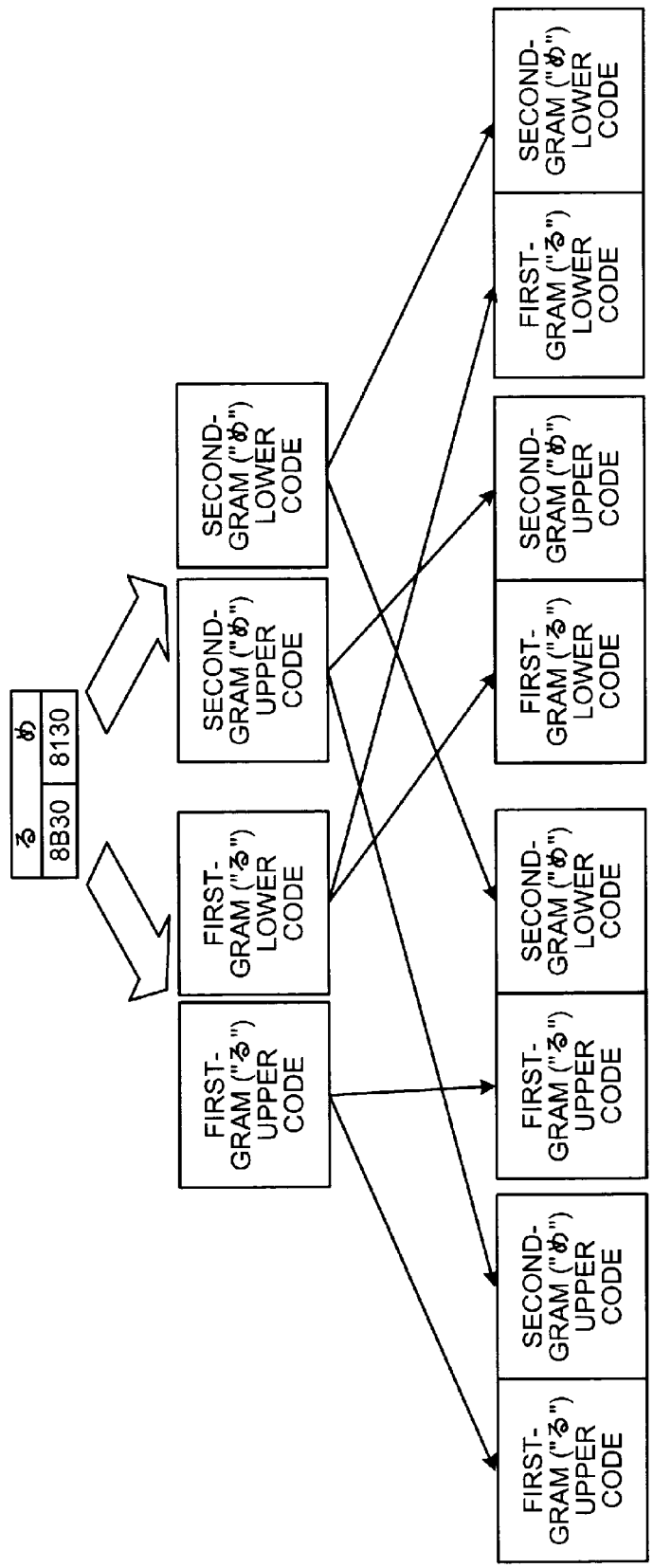
FIG. 7 is an explanatory diagram of an example of four-part division of the bi-gram character string "＆め" depicted in FIG. 5.

FIG. 7 is an explanatory diagram of an example of four-part division of the bi-gram character string "ぁめ" depicted in FIG. 5. In FIG. 7, as is the case in FIG. 6, the compression code of the first gram "ぁ" and the compression code of the second gram "め" are respectively divided into two upper and lower parts and four concatenated codes are generated in a cross-coupled manner.

Figure 8:
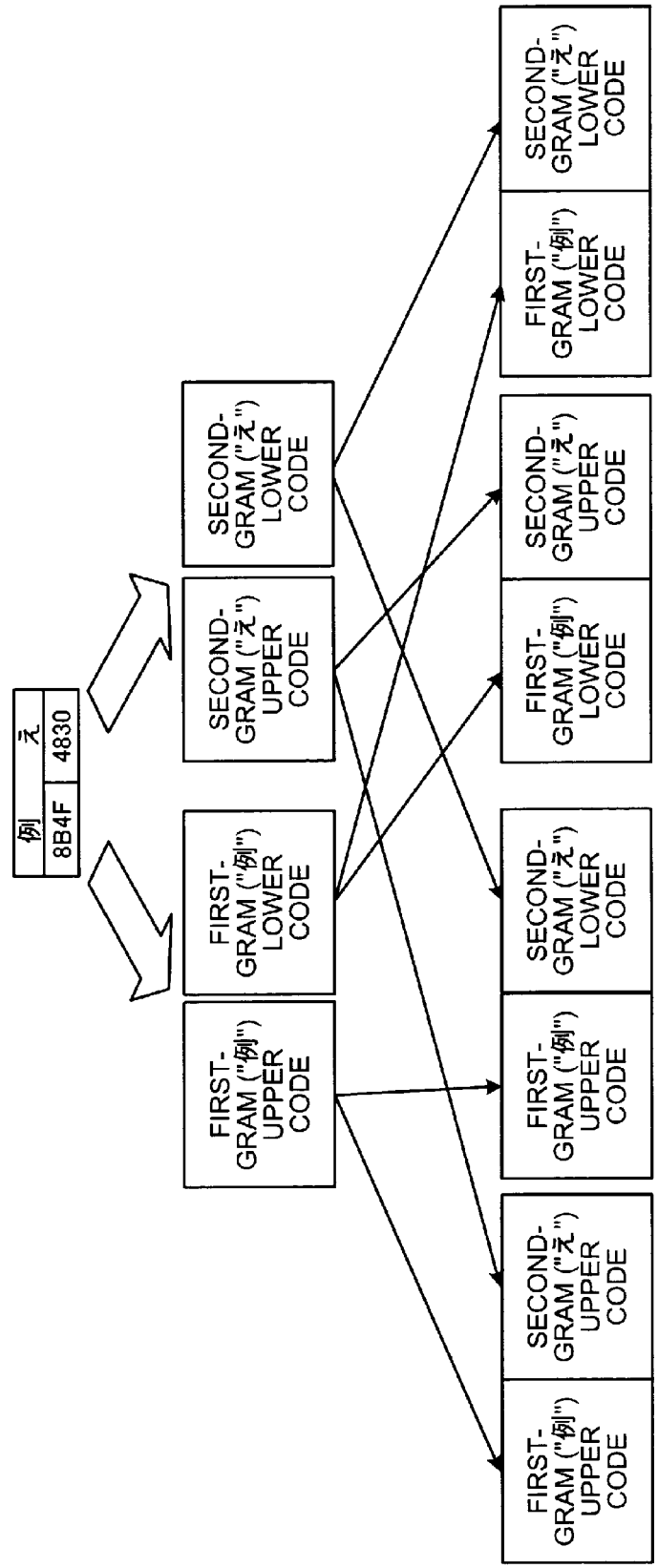
FIG. 8 is an explanatory diagram of an example of four-part division of the bi-gram character string "煉え" depicted in FIG. 4.

FIG. 8 is an explanatory diagram of an example of four-part division of the bi-gram character string "翻え" depicted in FIG. 4. "翻え" is a bi-gram character string making up a portion of "翻えば", and is a higher-order bi-gram character string having a higher appearance frequency. In FIG. 8, as is the case in FIGS. 6 and 7, the compression code of the first gram "翻" and the compression code of a second gram "え" are respectively divided into two upper and lower parts and four concatenated codes are generated in a cross-coupled manner.

Figure 9:
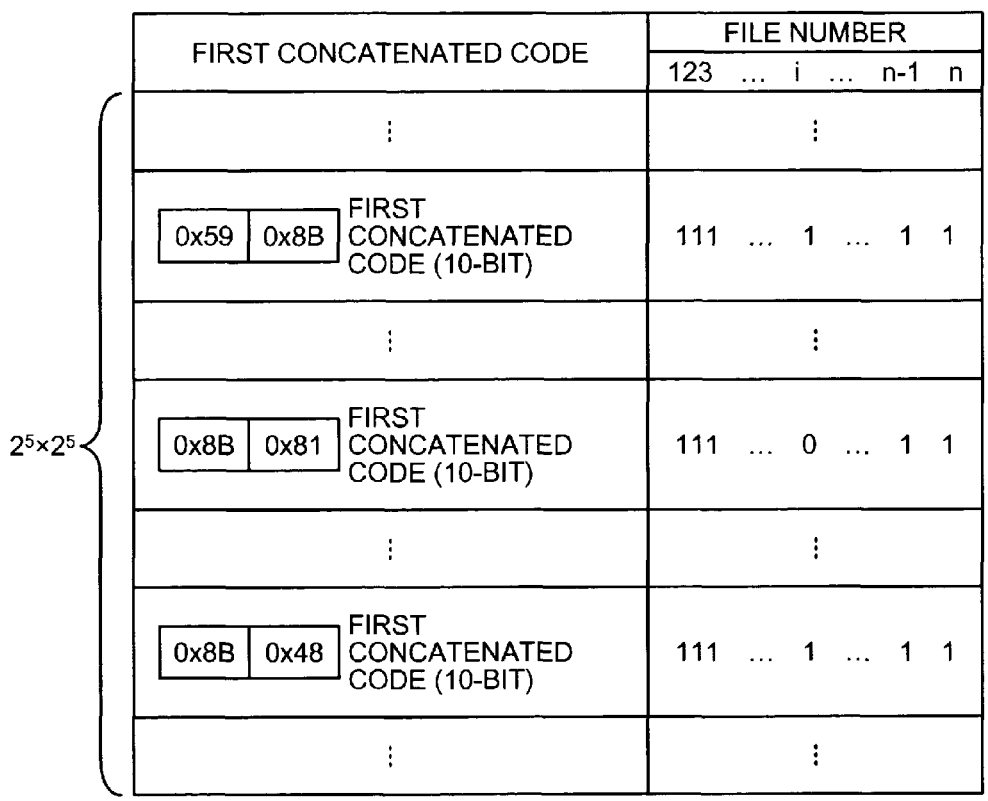

FIG. 9 is an explanatory diagram of an example of the first component compression code map M4a. The first component compression code map M4a is a compression code map using a concatenated code obtained by concatenating the first-gram upper code and the second-gram upper code (hereinafter, "first concatenated code") as a pointer.

Figure 10:
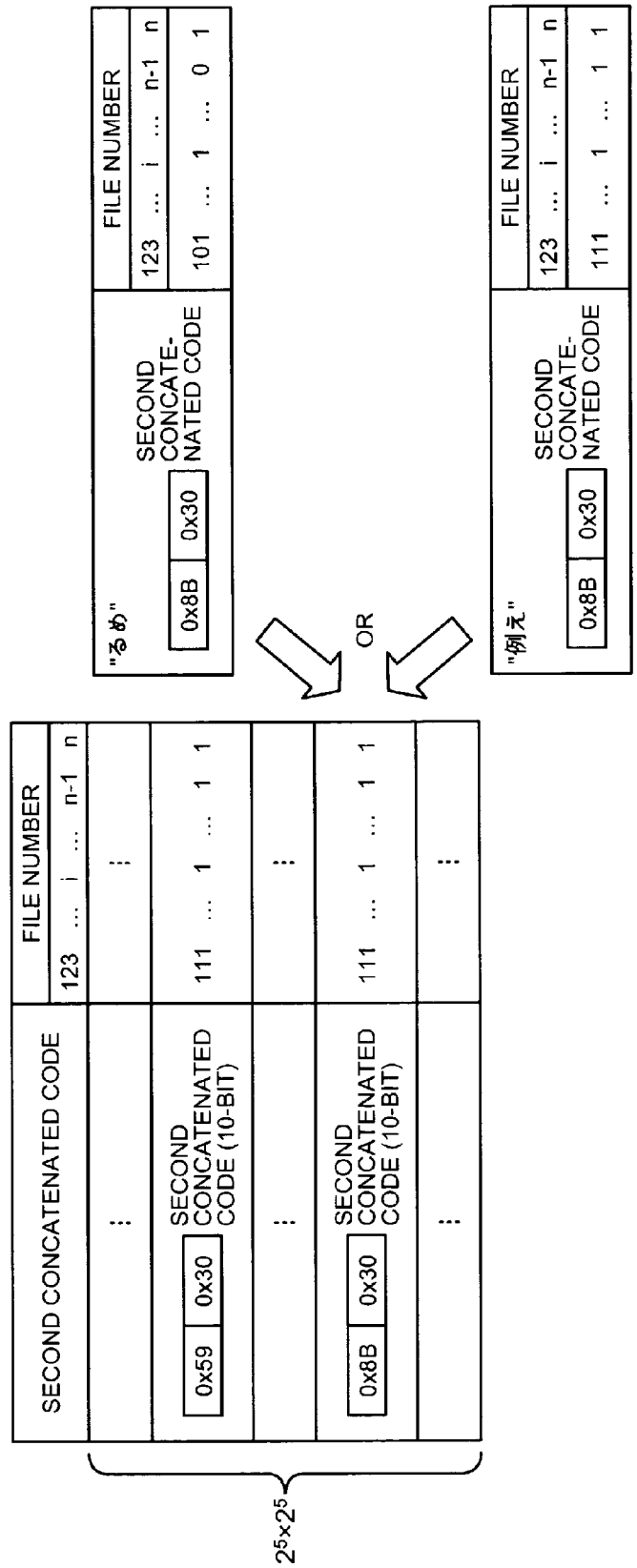
FIG. 10 is an explanatory diagram of an example of a second component compression code map M4b.

FIG. 10 is an explanatory diagram of an example of the second component compression code map M4b. The second component compression code map M4b is a compression code map using a concatenated code obtained by concatenating the first-gram upper code and the second-gram lower code (hereinafter, "second concatenated code") as a pointer. In FIG. 10, a second concatenated code (concatenated code from "0x8B" and "0x30") used as a pointer is the second concatenated code of the lower-order bi-gram character string "るめ" and the second concatenated code of the higher-order bi-gram character string "働え" and therefore, the codes are the same.

Therefore, even when the lower-order bi-gram character string "るめ" does not occur in a data file, the bit of the data file is set to ON ("1") if the higher-order bi-gram character string "働え" appears in the data file. In the case of FIG. 10, a combination of the upper code of "る" and the lower code of "め" in the lower-order bi-gram character string "るめ" is present only in data files F1, F3, and Fn, a combination of the upper code of "働" and the lower code of "え" in the higher-order bi-gram character string "働え" is present in data files F1 to Fn.

Therefore, the appearance map of the second concatenated code (concatenated code from "0x8B" and "0x30") in the second component compression code map M4b is a bit string obtained by an OR operation of the appearance map of the second concatenated code of the lower-order bi-gram character string "るめ" and the appearance map of the second concatenated code of the higher-order bi-gram character string "働え". As a result, a data file without the lower-order bi-gram character string "るめ" may be retrieved.

FIG. 11 is an explanatory diagram of an example of the third component compression code map M4c. The third component compression code map M4c is a compression code map using a concatenated code obtained by concatenating the first-gram lower code and the second-gram upper code (hereinafter, "third concatenated code") as a pointer.

Figure 12:
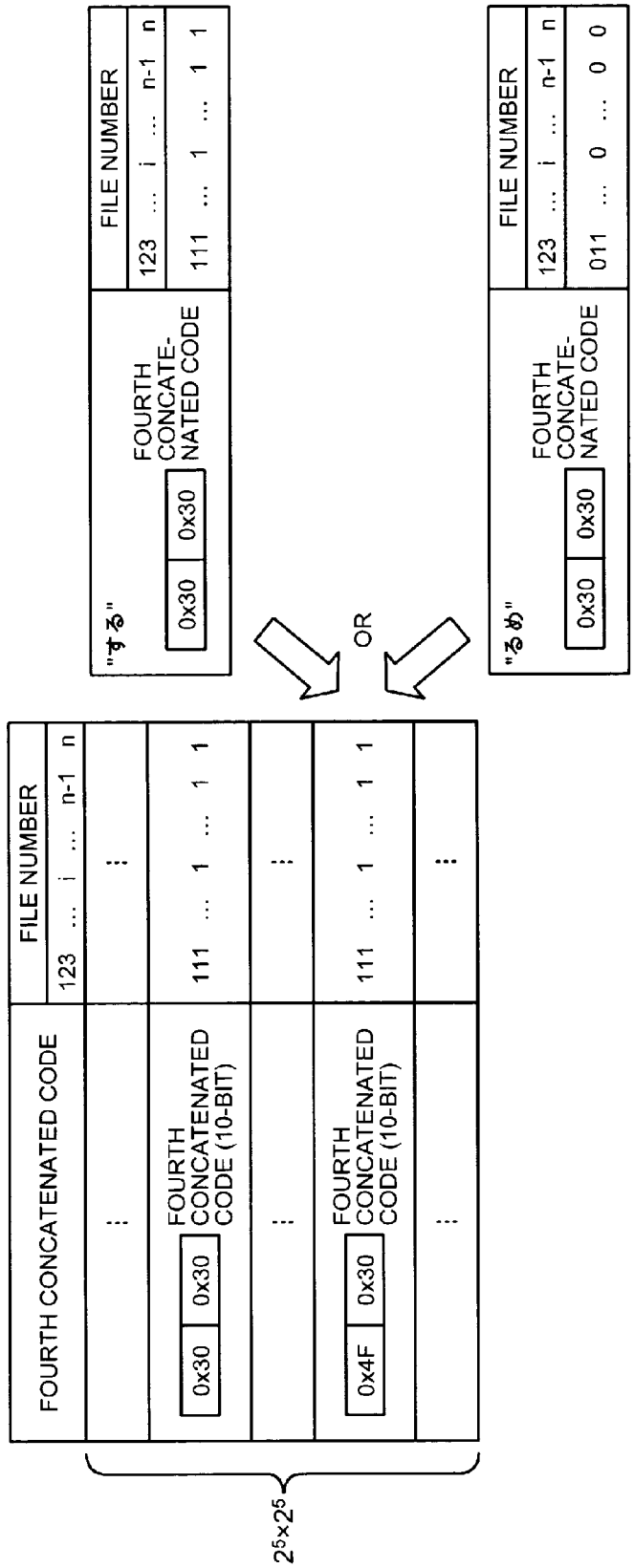
FIG. 12 is an explanatory diagram of an example of a fourth component compression code map M4d.

FIG. 12 is an explanatory diagram of an example of the fourth component compression code map M4d. The fourth component compression code map M4d is a compression code map using a compression code string of a concatenated code obtained by concatenating the first-gram lower code and the second-gram lower code (hereinafter, "fourth concatenated code") as a pointer. In the fourth component compression code map M4d, similar to the second component compression code map M4b depicted in FIG. 10, a fourth concatenated code (concatenated code from "0x30" and "0x30") used as a pointer is the fourth concatenated code of the lower-order bi-gram character string "るめ" and the fourth concatenated code of the higher-order bi-gram character string "すう" and therefore, the codes are the same.

Therefore, even when the lower-order bi-gram character string "るめ" does not occur in a data file, the bit of the data file is set to ON ("1") if the higher-order bi-gram character string "すう" appears in the data file. In the case of FIG. 12, a combination of the lower code of "る" and the lower code of "め" in the lower-order bi-gram character string "るめ" is present only in data files F2 and F3, a combination of the lower code of "す" and the lower code of "う" in the higher-order bi-gram character string "すう" is present in data files F1 to Fn.

Therefore, the appearance map of the fourth concatenated code (concatenated code from "0x30" and "0x30") in the fourth component compression code map M4d is a bit string obtained by an OR operation of the appearance map of the fourth concatenated code of the lower-order bi-gram character string "るめ" and the appearance map of the fourth concatenated code of the higher-order bi-gram character string "すう". As a result, a data file without the lower-order bi-gram character string "るめ" may be retrieved.

Figure 13:
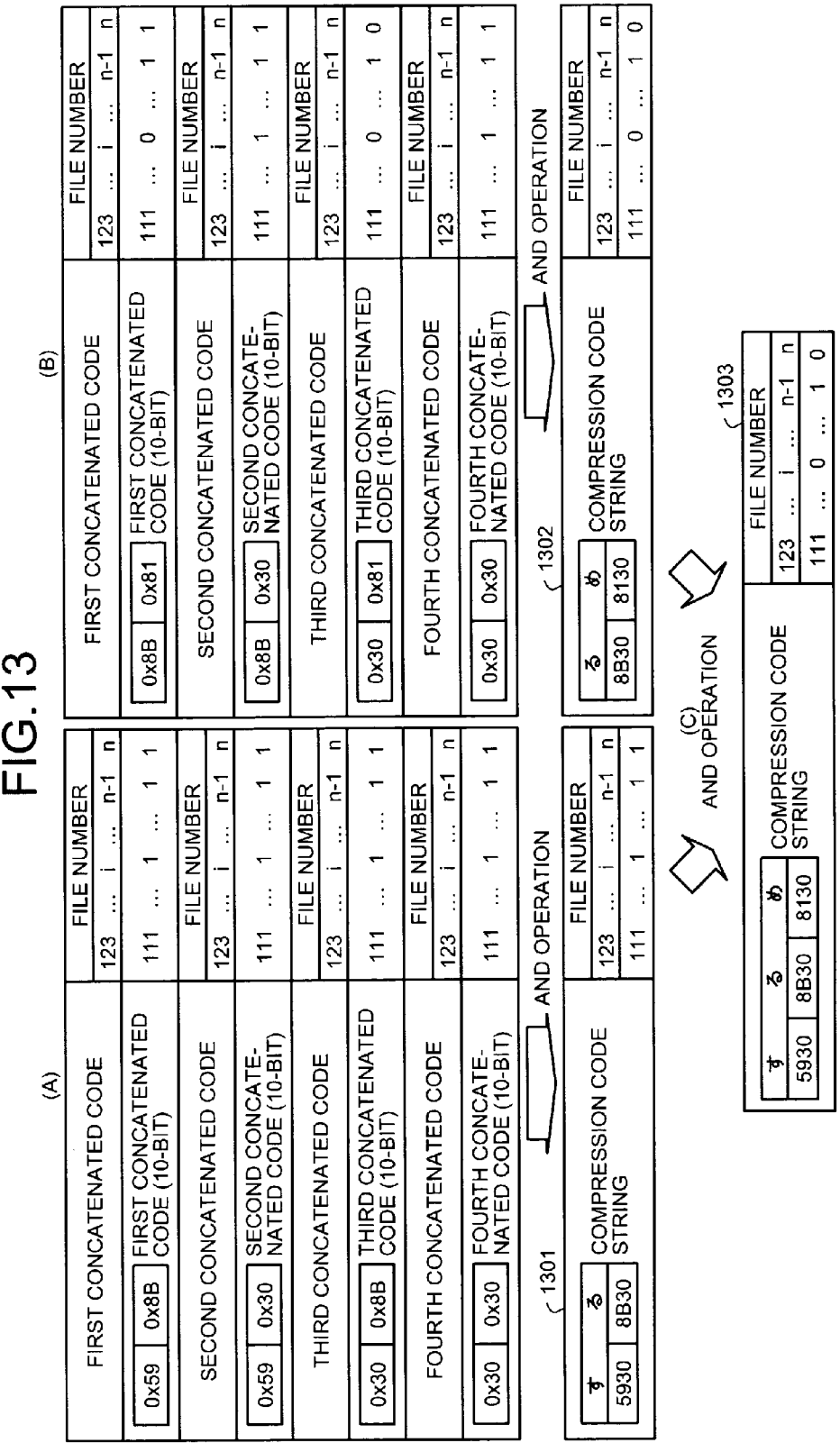
FIG. 13 is an explanatory diagram of an AND result of "する&".

FIG. 13 is an explanatory diagram of an AND result of "すうめ". In FIG. 13, (A) depicts an AND result 1301 of four appearance maps of "すう" and (B) depicts an AND result 1302 of four appearance maps of "るめ". Further, (C) depicts an AND result 1303 from an AND operation of both of the AND results 1301 and 1302 of (A) and (B). The AND result of (C) reveals that "すうめ" is possibly present in the data files F1 to F3 and F(n−1) and is not present in other data files.

Figure 14:
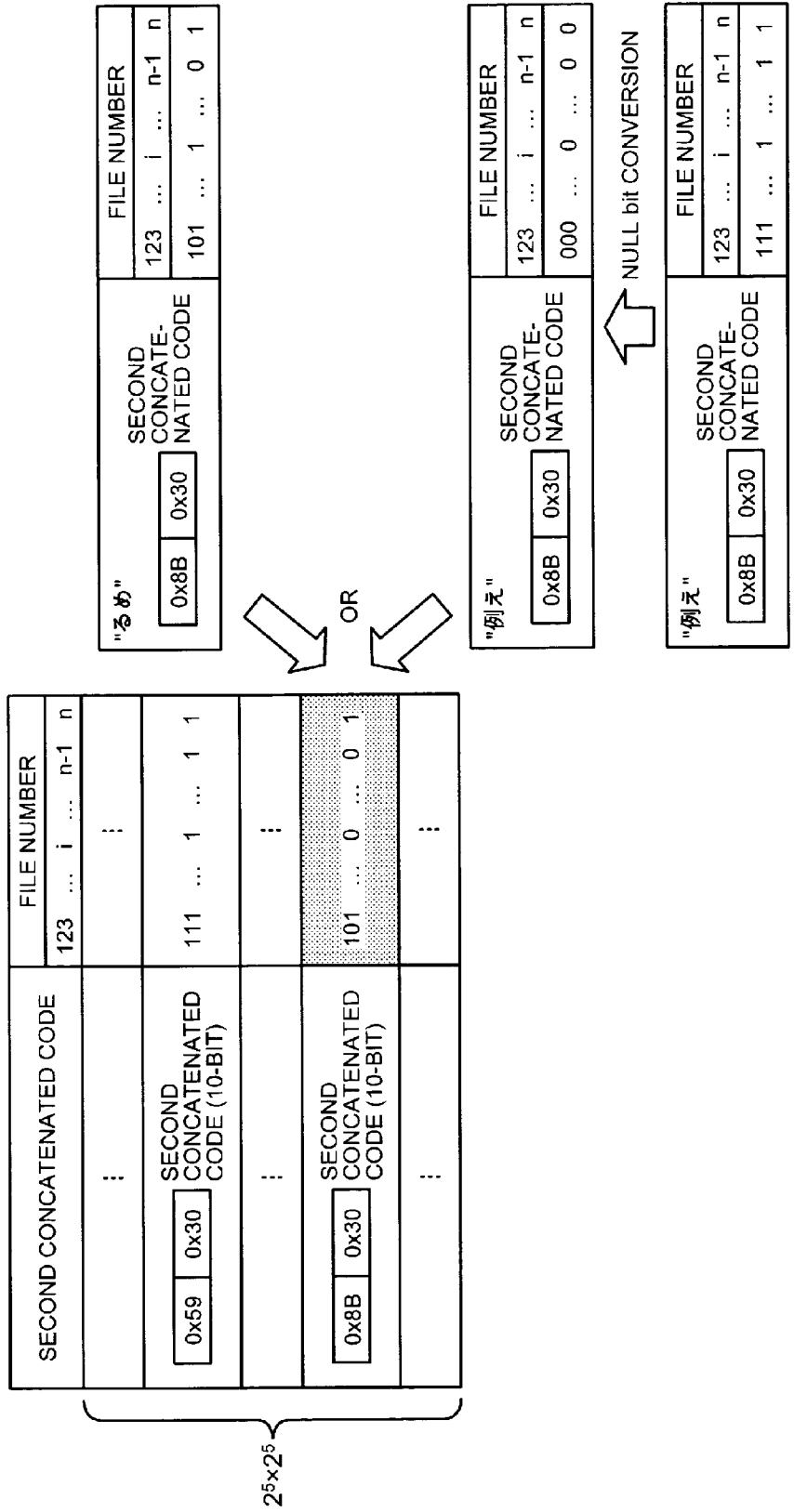
FIG. 14 is an explanatory diagram of a modification example of the second component compression code map.

FIG. 14 is an explanatory diagram of a modification example of the second component compression code map. In FIG. 14, the appearance map of the upper and lower code string of the higher-order bi-gram character string "働え" is subjected to NULL bit (all zero) conversion. As a result, even if an OR operation is performed with the appearance map of the second concatenated code of the lower-order bi-gram character string "るめ", values of bits can be removed in the appearance map of the second concatenated code of the higher-order bi-gram character string "働え".

Figure 15:
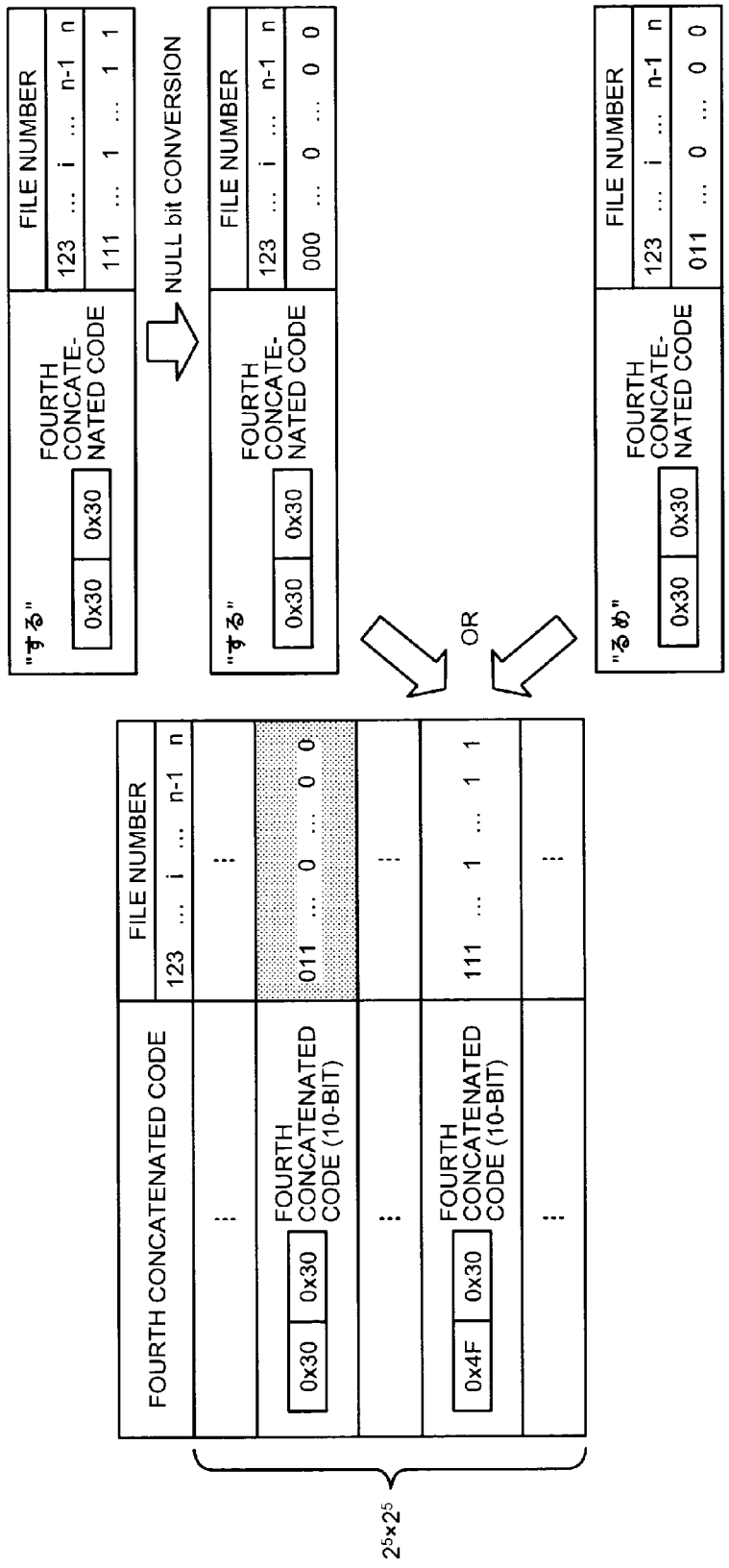
FIG. 15 is an explanatory diagram of a modification example of the fourth component compression code map.

FIG. 15 is an explanatory diagram of a modification example of the fourth component compression code map. In FIG. 15, the appearance map of the fourth concatenated code of the higher-order bi-gram character string "るめ" is subjected to NULL bit (all zero) conversion. As a result, even if an OR operation is performed with the appearance map of the second concatenated code of the lower-order bi-gram character string "るめ", values of bits can be removed in the appearance map of the fourth concatenated code of the higher-order bi-gram character string "すう".

Figure 16:
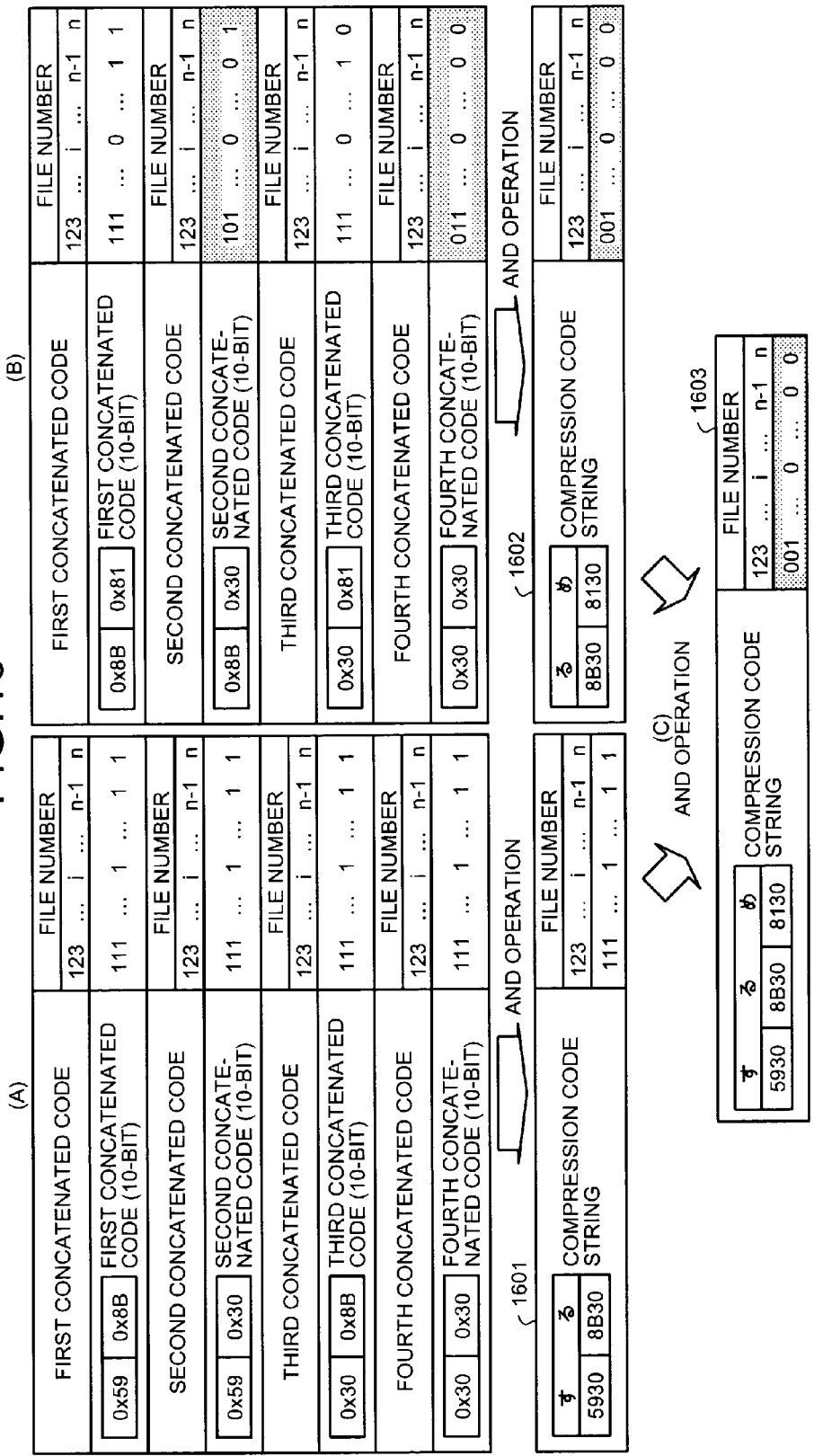
FIG. 16 is an explanatory diagrams of an AND result when the modified appearance maps of FIGS. 14 and 15 are used for "する&".

FIG. 16 is an explanatory diagrams of an AND result when the modified appearance maps of FIGS. 14 and 15 are used for "すうめ". In FIG. 16, (A) depicts the same contents as the AND operation of (A) in FIG. 13 and therefore, the AND results 1301 and 1601 are the same. In (B) of FIG. 16, among four appearance maps, the appearance maps of FIGS. 14 and 15 are employed as the appearance map in the second component compression code map M4b and the appearance map in the fourth divided compression code map M4d.

Therefore, an AND result 1602 of (B) in FIG. 16 is different from the AND result 1302 of (B) in FIG. 13. In FIG. 16, (C) depicts an AND result 1603 from an AND operation of both of the AND results 1601 and 1602 in (A) and (B) of FIG. 16. The AND result 1603 of (C) in FIG. 16 reveals that "すうめ" is present in the data file F3 and is not present in the other data files. As compared to the AND result 1303 in (C) of FIG. 13C it is known that accuracy of narrowing-down of data files is improved.

Preprocessing of compression code map generation will next be described. When a compression code map is generated, the number of appearances of character units must be counted from a data file group to generate a $2^N$-branch nodeless Huffman tree before generating the map. The $2^N$-branch nodeless Huffman tree is a Huffman tree having $2^N$ branches branching from a root to directly point a leaf with one or multiple branches. No node (inner node) exists. Since no node exists and a leaf is directly hit, and the expansion rate can be accelerated as compared to a normal Huffman tree having nodes. A leaf is a structure that includes the corresponding character unit and the compression code thereof. A leaf is also referred to as a leaf structure. The number of branches assigned to a leaf depends on the compression code length of the compression code present in the leaf to which the branches are assigned. A preprocessing example will hereinafter be described.

Figure 17:
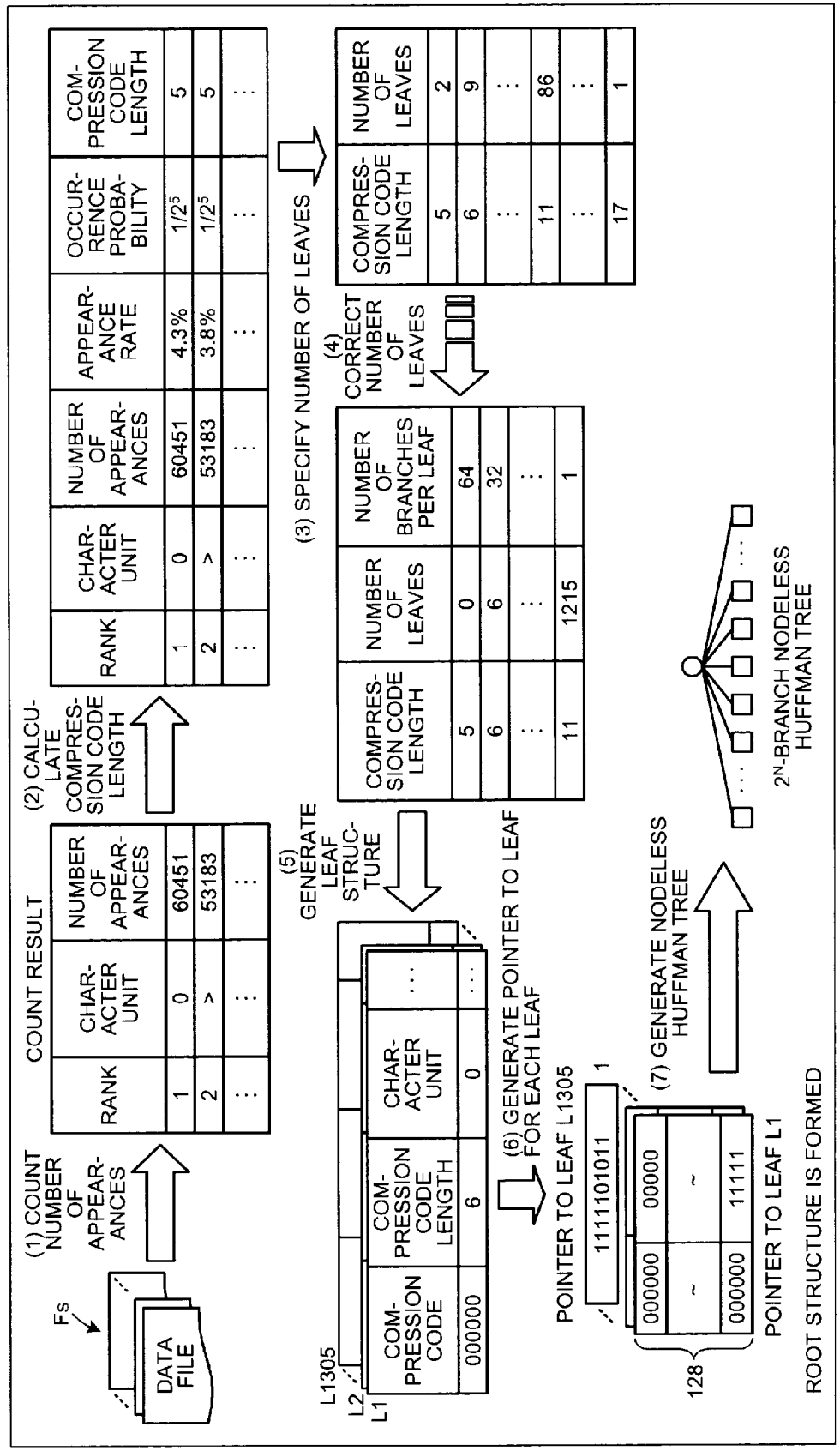
FIG. 17 is an explanatory diagram of a preprocessing example of a compression code map generation.

FIG. 17 is an explanatory diagram of the preprocessing example of the compression code map generation.

(1) Count of the Number of Appearances: a computer counts the number of appearances of character units present in a data file group Fs. The count result is sorted in descending order of the number of appearances and ranks in ascending order are given starting from the highest number of appearances. In this description, it is assumed that, for example, the total number of types of character units is 1305 (<2048 (=$2^{11}$)). Details of (1) Count of the Number of Appearances will be described with reference to FIG. 18.

(2) Calculation of Compression Code Length: the computer calculates a compression code length for each of the character units, based on the count result acquired at (1). For example, the computer calculates an appearance rate for each of the character units. The appearance rate can be obtained by dividing the number of appearances of a character unit by the total number of appearances of all the character units. The computer obtains an occurrence probability corresponding to the appearance rate and derives a compression code length from the occurrence probability.

The occurrence probability is expressed by $½^x$. X is an exponent. A compression code length is the exponent X of the occurrence probability. For example, the compression code length is determined according to which of the following ranges the occurrence probability falls within. AR denotes an appearance rate.

$½^0$>AR≥$½^1$, compression code length is 1 bit.
$½^1$>AR≥$½^2$, compression code length is 2 bits.
$½^2$>AR≥$½^3$, compression code length is 3 bits.
$½^3$>AR≥$½^4$, compression code length is 4 bits.

•
•
•

$½^{N-1}$>AR≥$½^N$, compression code length is N bits.

Details of (2) Calculation of Compression Code Length will be described with reference to FIG. 19.

(3) Specification of the Number of Leaves: the computer counts the number of leaves for each compression code length to specify the number of leaves for each compression code length. In FIG. 17, it is assumed that the maximum compression code length is 17 bits. The number of leaves is the number of types of character units. Therefore, if the number of leaves at the compression code length of 5 bits is two, this indicates that two character units assigned with a five-bit compression code are present.

(4) Correction of the Number of Leaves: the computer corrects the number of leaves. For example, the computer makes corrections such that an exponent N of the upper limit $2^N$ of the number of branches is the maximum compression code length. For example, in the case of the exponent N=11, the sum of the number of leaves at the compression code lengths from 11 to 17 bits is defined as the corrected number of leaves at the compression code length of 11 bits. The computer assigns the number of branches per leaf for each compression code length. For example, the number of branches per leaf is determined as $2^0$, $2^1$, $2^2$, $2^3$, $2^4$, $2^5$, $2^6$, and $2^7$ for the compression code lengths after the correction in descending order.

For example, in FIG. 17, while the total number of the character units (the number of leaves) assigned with a compression code having the compression code length of 11 bits is 1215, the number of branches per leaf is 1. To each of the character units assigned with a compression code having the compression code length of 11 bits, only one branch is assigned. On the other hand, while the total number of the character units (the number of leaves) assigned with a compression code having the compression code length of 6 bits is 6, the number of branches per leaf is 32. To each of the character units assigned with a compression code having the compression code length of 6 bits, 32 branches are assigned. The correction of the number of leaves of (4) may be performed as needed and may be omitted.

(5) Generation of Leaf Structure: the computer then generates a leaf structure. The leaf structure is a data structure formed by correlating a character unit, a compression code length thereof, and a compression code of the compression code length. For example, a compression code length of a character "0" ranked in the first place of the appearance ranking is 6 bits and the compression code is "000000". In the example depicted in FIG. 17, the number of types of the character units (the number of leaves) is 1305 and therefore, structures of a leaf L1 to a leaf L1305 are generated. Details of (3) Specification of the Number of Leaves to (5) Generation of Leaf Structure (N=11) will be described with reference to FIG. 20.

(6) Generation of Pointer to Leaf: the computer then generates for each leaf structure, a pointer to the leaf. The pointer to a given leaf is a bit string obtained by concatenating the compression code in the given leaf structure and a bit string that corresponds to one number among numbers equivalent in quantity to the number of branches per leaf. For example, since the compression code length of the compression code "000000" assigned to the character "0" of the leaf L1 is 6 bits, the number of branches of the leaf L1 is 32.

Therefore, the leading six bits of the pointers to the leaf L1 is the compression code "000000". The subsequent bit strings of the points includes 32 (=$2^5$) types of bit strings represented by the number of branches of the leaf L1. As a result, 32 types of 5-bit bit strings are subsequent bit strings of the compression code "000000". Therefore, the pointers to the leaf L1 are 32 types of 11-bit bit strings having a leading six bits fixed to "000000". If the number of branches per leaf is one, one pointer to leaf exists, and the compression code and the pointer to leaf are the same bit strings. Details of (6) Generation of Pointer to Leaf will be described with reference to FIG. 22.

(7) Construction of $2^N$-Branch Nodeless Huffman Tree: lastly, the computer constructs a $2^N$-branch nodeless Huffman tree. For example, pointers to leaf are used as a root to construct a $2^N$-branch nodeless Huffman tree that directly specifies leaf structures. If the compression code string is an 11-bit bit string having "000000" as the leading six bits, the structure of the leaf L1 of the character "0" can be pointed to through the $2^N$-branch nodeless Huffman tree regardless of which one of 32 types of bit strings corresponds to the subsequent five bits. Details of (7) Construction of $2^N$-Branch Nodeless Huffman Tree will be described with reference to FIG. 23.

Figure 18:
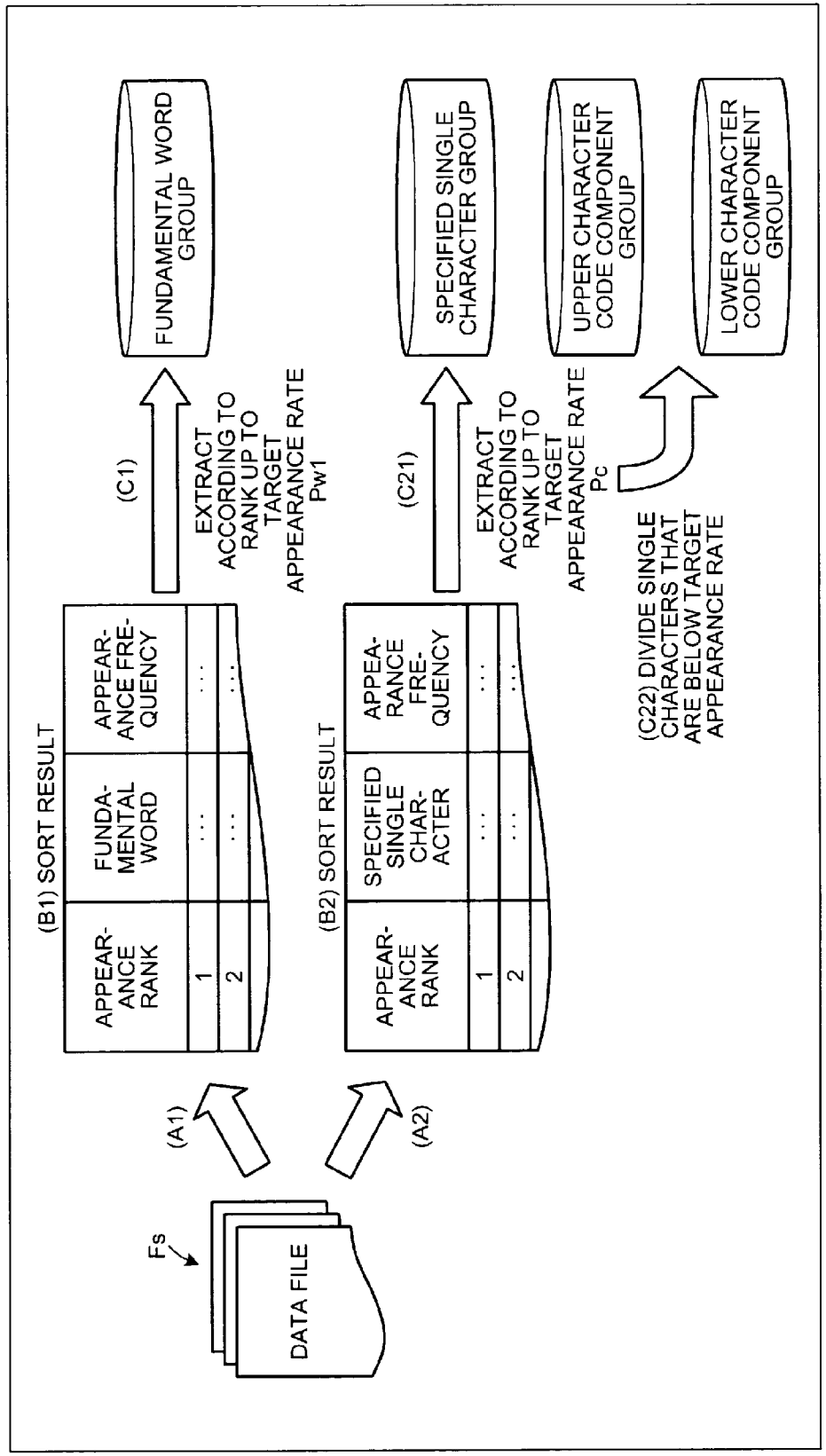
FIG. 18 is an explanatory diagram of details of (1) Count of the Number of Appearances.

FIG. 18 is an explanatory diagram of details of (1) Count of the Number of Appearances. In FIG. 18, the computer executes three phases, i.e., (A) count from the data file group Fs, (B) sort in descending order of appearance frequency, and (C) extract up to the rank of the target appearance rate. The three phases will hereinafter be described separately for fundamental words and single characters.

(A1) First, the computer reads the data file group Fs to count the appearance frequency (number of appearances) of fundamental words. The computer refers to a fundamental word structure and, if a character string identical to a fundamental word in the fundamental word structure is present in the data files, the computer adds one to the appearance frequency of the fundamental word (default value is zero). The fundamental word structure is a data structure having descriptions of fundamental words.

(B1) Once the count of fundamental words in the data file group Fs is completed, the computer sorts a fundamental word appearance frequency count table in descending order of the appearance frequency. In other words, the table is sorted in the order from the highest appearance frequency and the fundamental words are ranked in the order from the highest appearance frequency.

(A2) The computer reads the data file group Fs to count the appearance frequency of single characters. For example, the computer adds one to the appearance frequency of the single characters (default value is zero).

(B2) Once the count of single characters in the data file group Fs is completed, the computer sorts a single-character appearance frequency count table in descending order of the appearance frequency. In other words, the table is sorted in the order form the highest appearance frequency and the single characters are ranked in the order from the highest appearance frequency.

(C1) The computer then refers to the fundamental word appearance frequency count table after the sorting at (B1) to extract the fundamental words ranked within a target appearance rate Pw. For example, the computer calculates the appearance rate Pw to each rank by using the sum of appearance frequencies (the total appearance frequency) of all the fundamental words as a denominator and successively summing the appearance frequencies in descending order from the fundamental word ranked in the first place to obtain a numerator.

For example, assuming that the total appearance frequency is 40000 and that the cumulative appearance frequency of fundamental words from the first place to the yth place is 30000, the appearance frequency until the yth place is (40000/30000)×100=75[%]. If the target appearance rate Pw is 75[%], the fundamental words ranked in the top y are extracted.

(C21) The computer then refers to the single-character appearance frequency count table after the sorting at (B2) to extract the single characters ranked within a target appearance rate Pc. For example, the computer calculates an appearance rate to each rank by using the sum of appearance frequencies (the total appearance frequency) of all the single characters as a denominator and successively summing the appearance frequencies in descending order from the single character ranked in the first place to obtain a numerator.

For example, assuming that the total appearance frequency is 50000 and that the cumulative appearance frequency of single characters from the first place to the yth place is 40000, the appearance frequency until the yth place is (50000/40000)×100=80[%]. If the target appearance rate Pc is 80[%], the single characters ranked in the top y are extracted. A single character extracted at (C21) is referred to as a "specified single character" so as to distinguish the character from original single characters.

(C22) Among the single characters, a single character excluded from among the specified single characters (hereinafter, a "nonspecified single character") has an appearance frequency that is lower than each of the specified single characters and therefore, the character code thereof is divided. For example, a character code of a nonspecified single character is divided into a character code of upper bits and a character code of lower bits.

For example, if the single character is represented by a UTF 16-bit character code, the character code is divided into a character code of an upper 8 bits and a character code of a lower 8 bits. Each of the character code components is represented by a code from 0x00 to 0xFF. The character code of the upper bits is an upper character code component and the character code of the lower bits is a lower character code component.

FIG. 19 is an explanatory diagram of details of (2) Calculation of Compression Code Length (N=11) of FIG. 17. A character unit table of FIG. 19 is a table reflecting the count result at (1) of FIG. 17 and includes a rank column, an expansion type column, a code column, a character column, an appearance count column, a total appearance count column, an appearance rate column, an uncorrected occurrence probability column, and a compression code length column set for each character unit. Among these columns, the rank column to the total appearance count column store information obtained as a result of re-sorting.

In the rank column, the rank (in ascending order) is written in descending order of the number of appearances of character unit. In the expansion type column in character unit column, the type of character unit is written. A single character of a 16-bit code is denoted by "16". An 8-bit character code component is denoted by "8". "FW" indicates a fundamental word.

In the code column in the character unit column, the code of the specified single character or the character code component is written. In the case of a fundamental word, this column is left blank. In the character column in the character unit column, the character or the fundamental word is written. For the appearance count column, the number of appearances of character unit in the data file group Fs is written. In the total appearance count column, the total number of appearances of all the character units is written.

In the appearance rate column, the value obtained by dividing the number of appearances by the total number is written as an appearance rate. In the before correction column, the occurrence probability corresponding to the appearance rate is written. In the compression code length column, the compression code length corresponding to the occurrence probability, i.e., an exponent y of the occurrence probability $\frac{1}{2}Y$ is written as the compression code length.

FIG. 20 is an explanatory diagram detailing (3) Specification of the Number of Leaves to (5) Generation of Leaf Structure (N=11) depicted in FIG. 17. The number of leaves (the total number of types of character units) counted according the compression code lengths in the character unit table depicted in FIG. 19 is the uncorrected number of leaves in FIG. 20. Correction A is correction that consolidates the number of leaves assigned to compression code lengths equal to or greater than the upper limit length N of the compression code length (i.e., the exponent N of the maximum branch number $2^N$ of the $2^N$-branch nodeless Huffman tree) to the upper limit length N of the compression code length. In this case, although the maximum compression code length before the correction is 17 bits, the total number of types of the character units is 1305 and therefore, the upper limit length N of the compression code length is N=11. Therefore, as a result of the correction A, the number of leaves at the compression code length of 11 bits is the sum of the numbers of leaves at the compression code lengths from 11 to 17 bits (1190).

The computer obtains the sum of the occurrence probabilities. Since the occurrence probability of each compression code length is determined ($\frac{1}{2}^5$ in the case of 5 bits), a multiplication result of each compression code length is obtained by multiplying the occurrence probability of each compression code length by the number of leaves. For example, the number of leaves at the compression code length of 5 bits in the correction A is two. The occurrence probability of the compression code length of 5 bits is $½^5$. Therefore, the occurrence probability of the compression code length of 5 bits in the correction A is $2\times(½^5)=½^4$. The compression code length occurrence probability in the correction A is also obtained for the compression code length equal to or greater than 5 bits. By summing the occurrence probabilities of the compression code lengths after the correction A, the sum of occurrence probabilities in the correction A is acquired.

The computer determines whether the sum of occurrence probabilities is not greater than one. A threshold value t is $0<t\leq1$. If it is not desired to provide the threshold value t, t=1 may be used. If the sum is less than the threshold value t, transition to correction B is made. If the sum is equal to or greater than the threshold value t and equal to or less than 1, the number of leaves at each compression code length at this point is fixed without transition to the correction B.

The correction B is correction to update the number of leaves without changing the compression code lengths (5 bits to 12 bits) in the correction A. For example, this is correction performed if the sum of occurrence probabilities in the correction A is not equal to or greater than the threshold value t, or not equal to or less than 1. For example, two types of the correction B exist.

In one type of correction B, if the sum of occurrence probabilities is less than the threshold value t, the sum of occurrence probabilities is increased until the maximum value of the sum of occurrence probabilities equal to or less than 1 is acquired, e.g., until the sum of occurrence probabilities converges to a maximum asymptotic value (hereinafter, correction $B^+$). In the other type of correction B, if the sum of occurrence probabilities is greater than 1, the sum of occurrence probabilities is reduced until the maximum value equal to or less than 1 is acquired after the sum of occurrence probabilities turns to be less than 1, for example, until the sum of occurrence probabilities converges to a maximum asymptotic value (hereinafter, correction $B^-$).

In the example depicted in FIG. 20, since the sum of occurrence probabilities in the correction A is "1.146", the correction B is performed. The same correction is performed by dividing the number of leaves by the sum of occurrence probabilities in the correction B regardless of whether the correction $B^+$ or correction $B^-$.

At the first execution of the correction $B^-$ (correction $B^-1$), the number of leaves at each compression code length in the correction A is divided by the sum of occurrence probabilities (1.146) for the previous correction (the correction A in this case) to update the number of leaves. Digits after the decimal point may be omitted or rounded off. For the upper limit N of the compression code length in the correction A (N=11 bits), the number of leaves at the upper limit N of the compression code length is obtained by subtracting the total number of leaves at the compression code lengths in the correction $B^-1$ (excluding the number of leaves at the upper limit length N of the compression code length) from the total number of leaves (1305), rather than dividing by the sum of occurrence probabilities (1.146) for the previous correction (the correction A in this case). In this case, the number of leaves is 1208.

The computer subsequently obtains the sum of occurrence probabilities in the correction $B^-1$ from a computing process identical to the case of the correction A. The computer then determines whether the sum of occurrence probabilities in the correction $B^-1$ converges to the maximum asymptotic value less than or equal to 1. If the sum of occurrence probabilities in the correction $B^-1$ does not converge to the maximum asymptotic value less than or equal to 1, transition to a second execution of the correction $B^-$ (correction $B^-2$) is made. In the case of convergence to the maximum asymptotic value, the number of leaves at each compression code length at this point is fixed without transitioning to the correction $B^-2$. Since the sum of occurrence probabilities "1.042" updated in the correction $B^-1$ is greater than 1 and does not converge to the maximum asymptotic value, transition to the correction $B^-2$ is made.

At the correction $B^-2$, the number of leaves at each compression code length in the correction $B^-1$ is divided by the sum of occurrence probabilities (1.042) for the previous correction (the correction $B^-1$ in this case) to update the number of leaves. Digits after the decimal point may be omitted or rounded off. For the upper limit N of the compression code length in the correction $B^-1$ (N=11 bits), the number of leaves at the upper limit N of the compression code length is obtained by subtracting the total number of leaves at the compression code lengths in the correction $B^-2$ (excluding the number of leaves at the upper limit length N of the compression code length) from the total number of leaves (1305), rather than dividing by the sum of occurrence probabilities (1.042) for the previous correction (the correction $B^-1$ in this case). In this case, the number of leaves is 1215.

The computer subsequently obtains the sum of occurrence probabilities in the correction $B^-2$ from a computing process identical to the case of the correction $B^-1$. The computer then determines whether the sum of occurrence probabilities in the correction $B^-2$ converges to the maximum asymptotic value less than or equal to 1. If the sum of occurrence probabilities in the correction $B^-2$ does not converge to the maximum asymptotic value less than or equal to 1, transition to a third execution of the correction $B^-$ (correction $B^-3$) is made. In the case of convergence to the maximum asymptotic value, the number of leaves at each compression code length at this point is fixed without transitioning to the correction $B^-3$. Since the sum of occurrence probabilities "0.982" updated in the correction $B^-2$ is smaller than 1 but it is not clear whether the sum converges to the maximum asymptotic value, transition to the correction $B^-3$ is made.

At the correction $B^-3$, the number of leaves at each compression code length in the correction $B^-2$ is divided by the sum of occurrence probabilities (0.982) for the previous correction (the correction $B^-2$ in this case) to update the number of leaves. Digits after the decimal point may be omitted or rounded off. For the upper limit N of the compression code length in the correction $B^-2$ (N=11 bits), the number of leaves at the upper limit N of the compression code length is obtained by subtracting the total number of leaves at the compression code lengths in the correction $B^-3$ (excluding the number of leaves at the upper limit length N of the compression code length) from the total number of leaves (1305), rather than dividing by the sum of occurrence probabilities (0.982) for the previous correction (the correction $B^-2$ in this case). In this case, the number of leaves is 1215.

The computer subsequently obtains the sum of occurrence probabilities in the correction $B^-3$ from a computing process identical to the case of the correction $B^-2$. The computer then determines whether the sum of occurrence probabilities in the correction $B^-3$ converges to the maximum asymptotic value less than or equal to 1. If the sum of occurrence probabilities in the correction $B^-3$ does not converge to the maximum asymptotic value less than or equal to 1, transition to a fourth execution of the correction B⁻ (correction B⁻4) is made. In the case of convergence to the maximum asymptotic value, the number of leaves at each compression code length at this point is fixed without transitioning to the correction B⁻4.

The sum of occurrence probabilities "0.982" updated in the correction B⁻3 is the same value as the sum of occurrence probabilities "0.982" updated in the correction B⁻2. In other words, the number of leaves at the compression code lengths in the correction B⁻3 is the same as the number of leaves at the compression code lengths in the correction B⁻2. In this case, the computer determines that the sum of occurrence probabilities converges to the maximum asymptotic value and the number of leaves is fixed.

As described above, the correction B⁻ is continued until the number of leaves is fixed. In the example of FIG. 20, the number of leaves at each compression code length is fixed in the correction B⁻3. Subsequently, the computer calculates the number of branches per leaf for each compression code length. In the calculation of the number of branches per leaf, as described above, the number of branches per leaf is assigned in descending order from the upper limit length N of the compression code length (N=11 bits in this case) as $2^0$, $2^1$, $2^2$, $2^3$, $2^4$, $2^5$, and $2^6$. A subtotal of the number of branches is the product of multiplying the number of branches per leaf by the fixed number of leaves for each compression code length.

FIG. 21 is an explanatory diagram of a correction result for each of character unit. In FIG. 21, the correction results for the correction A and the corrections B⁻1 to B⁻2 are added to the character unit table. As depicted in FIG. 21, since the number of leaves at each compression code length is updated by the correction, shorter compression code lengths are assigned sequentially from the character unit ranked in the first place of the rank column.

For example, if fixed at the correction B⁻2, the number of leaves is 6 when the compression code length is 6 bits; the number of leaves is 18 when the compression code length is 7 bits; . . . ; and the number of leaves is 1215 when the compression code length is 11 bits. Therefore, the compression code length of 6 bits is assigned to the character units ranked in the first to sixth places (corresponding to 6 leaves); the compression code length of 7 bits is assigned to the character units ranked in the 7th to 24th places (corresponding to 18 leaves); . . . ; and the compression code length of 11 bits is assigned to the character units ranked in the 91st to 1305th places (corresponding to 1215 leaves).

The computer assigns a compression code to each of the character units to generate the leaf structures, based on the character unit, the compression code length assigned to the character unit, and the number of leaves at each compression code length. For example, since the compression code length of 5 bits is assigned to the single character "0" ranked in the first place for the appearance rate, the compression code is "000000". Therefore, a structure of a leaf L1 is generated that includes the compression code "000000", the compression code length "6", and the character unit "0".

Although the compression code length is 5 bits to 11 bits in the correction process described above, a compression code map of bi-gram character strings may be divided in some cases and therefore, the compression code length may be corrected to be an even number of bits. For example, for example, the character unit of the compression code length of 5 bits and 7 bits is corrected to be 6 bits; the character unit of 9 bits is corrected to be 8 bits; and the character unit of 11 bits is corrected to be 10 bits.

Figure 22:
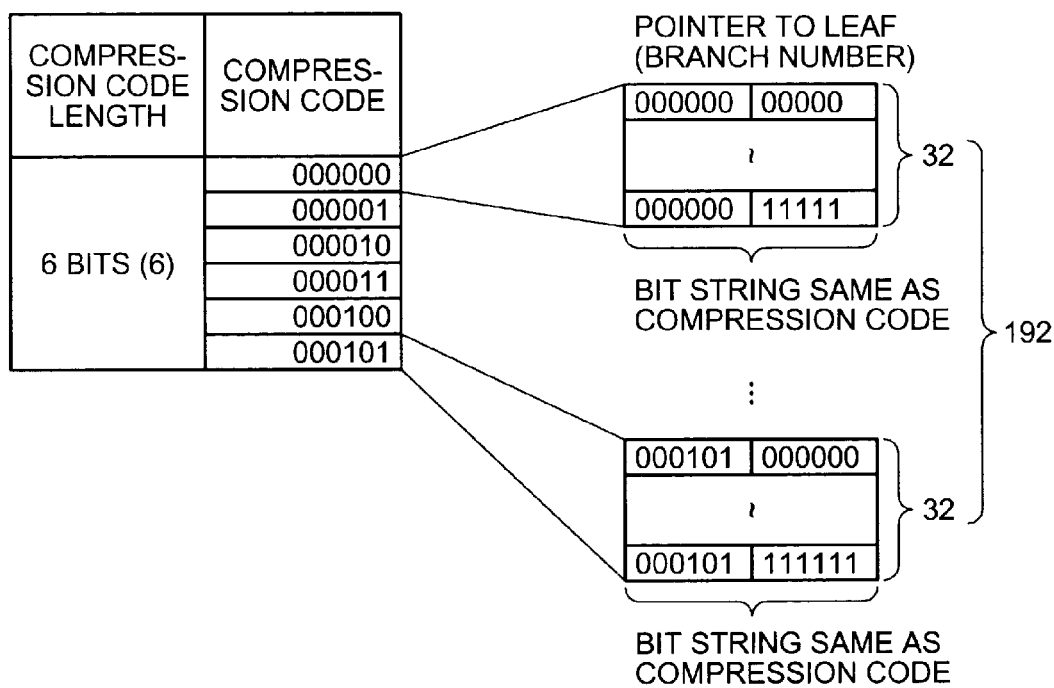
FIG. 22 is an explanatory diagram of details of (6) Generation of Pointer to Leaf (N=11) of FIG. 17.

FIG. 22 is an explanatory diagram of details of (6) Generation of Pointer to Leaf (N=11) of FIG. 17. FIG. 22 depicts a pointer to a leaf when the upper limit N of the compression code length is 11 bits. In FIG. 22, since the number of leaves is 6 when the compression code length is 6 bits, compression codes "000000" to "000101" are assigned. The number of branches per leaf is 32 when the compression code length is 6 bits. Therefore, 32 (=$2^5$) pointers to the leaf are generated for the compression codes having the compression code length of 6 bits. For example, the leading 6 bits of the pointers to the leaf are identical to the compression codes and the subsequent 5 bits are 32 types of bit strings. Therefore, 32 types of the pointers to the leaf are generated for each of the compression codes having the compression code length of 6 bits.

Although not depicted, since the number of leaves is 18 when the compression code length is 7 bits, compression codes "0001100" to "0011111" are assigned. The number of branches per leaf is 16 when the compression code length is 7 bits. Therefore, 16 (=$2^4$) pointers to the leaf are generated for the compression codes having the compression code length of 7 bits. For example, the leading 7 bits of the pointers to the leaf are identical to the compression codes and the subsequent 4 bits are 16 types of bit strings. Therefore, 16 types of the pointers to leaf are generated for each of the compression codes having the compression code length of 7 bits.

Similarly, since the number of leaves is 23 when the compression code length is 8 bits, compression codes "01000000" to "01010110" are assigned. The number of branches per leaf is 8 when the compression code length is 8 bits. Therefore, 8 (=$2^3$) pointers to the leaf are generated for the compression codes having the compression code length of 8 bits. For example, the leading 8 bits of the pointers to the leaf are identical to the compression codes and the subsequent 3 bits are 8 types of bit strings. Therefore, 8 types of the pointers to leaf are generated for each of the compression codes having the compression code length of 8 bits.

Similarly, since the number of leaves is 23 when the compression code length is 9 bits, compression codes "010101110" to "011000100" are assigned. The number of branches per leaf is 4 when the compression code length is 9 bits. Therefore, 4 (=$2^2$) pointers to the leaf are generated for the compression codes having the compression code length of 9 bits. For example, the leading 9 bits of the pointers to the leaf are identical to the compression codes and the subsequent 2 bits are 4 types of bit strings. Therefore, 4 types of the pointers to leaf are generated for each of the compression codes having the compression code length of 9 bits.

Similarly, since the number of leaves is 20 when the compression code length is 10 bits, compression codes "0110000110" to "0110011101" are assigned. The number of branches per leaf is 2 when the compression code length is 10 bits. Therefore, 2 (=$2^1$) pointers to the leaf are generated for the compression codes having the compression code length of 10 bits. For example, the leading 10 bits of the pointers to the leaf are identical to the compression codes and the subsequent 1 bit is 2 types of bit strings. Therefore, 2 types of the pointers to leaf are generated for each of the compression codes having the compression code length of 10 bits.

Similarly, since the number of leaves is 1215 when the compression code length is 11 bits, compression codes "01100111100" to "11111111010" are assigned. The number of branches per leaf is 1 when the compression code length is 11 bits. Therefore, 1 (=2⁰) pointer to the leaf is generated for the compression codes having the compression code length of 11 bits. For example, the compression codes become the pointers to the leaf as they are. Therefore, 1 type of the pointer to leaf is generated for each of the compression codes having the compression code length of 11 bits.

Figure 23:
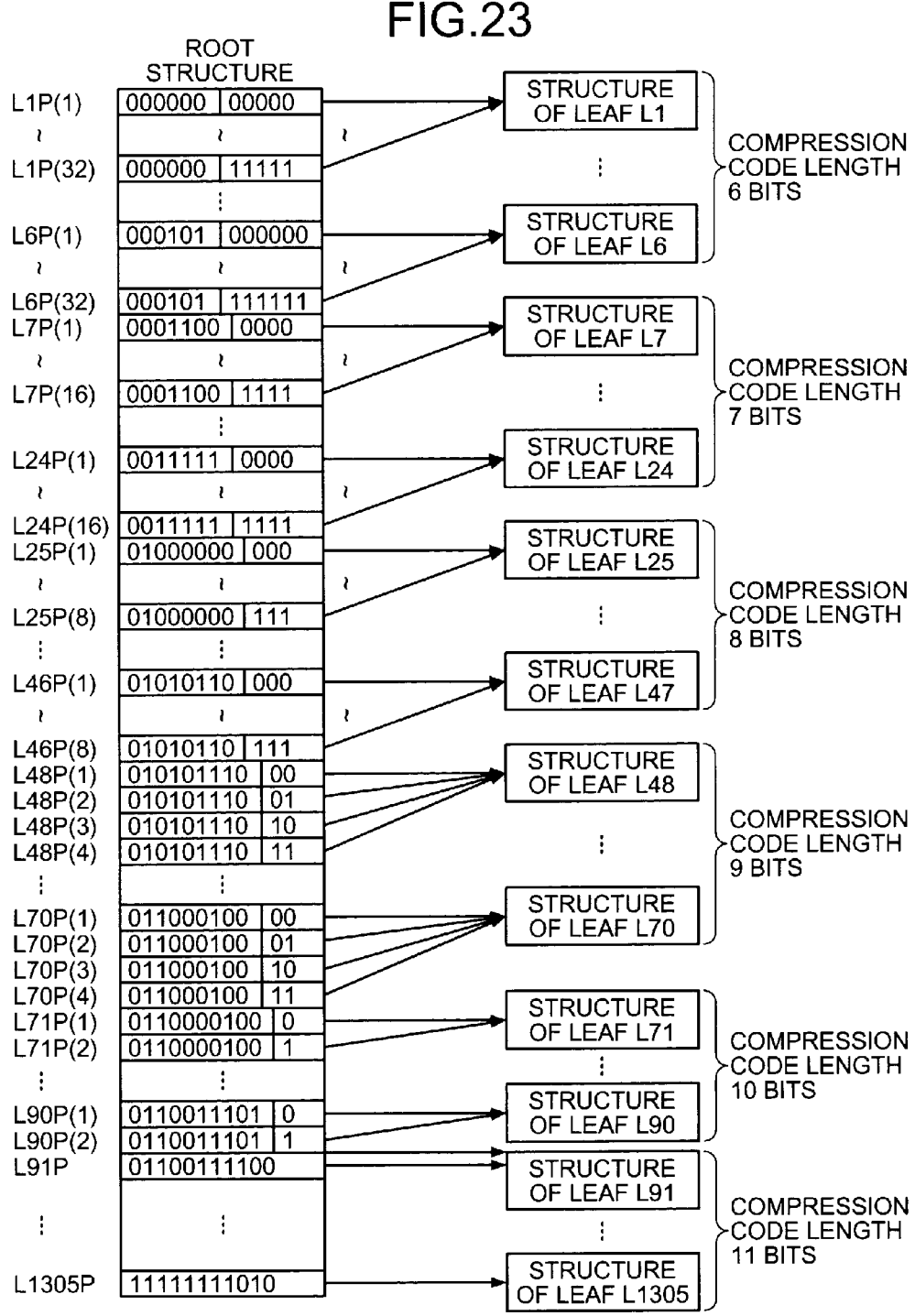
FIG. 23 is an explanatory diagram of details of (7) Construction of $2^N$-Branch Nodeless Huffman Tree (N=11) depicted in FIG. 17.

FIG. 23 is an explanatory diagram of details of (7) Construction of $2^N$-Branch Nodeless Huffman Tree (N=11) depicted in FIG. 17. FIG. 23 depicts a 2048 (=$2^{11}$)-branch nodeless Huffman tree in the case of N=11. A root structure stores the pointers to leaf. The pointers to leaf can specify the leaf structures to be pointed to.

For example, 32 pointers to the leaf are generated for a leaf structure that stores a compression code having the compression code length of 6 bits as depicted in FIG. 22. Therefore, for the structure of the leaf L1, 32 pointers L1P(1) to L1P(32) to the leaf L1 are stored in the root structure. The same applies to the structure of a leaf L2 to the structure of a leaf L6. The structures of a leaf L7 and thereafter are as depicted in FIG. 23.

Figures 24, 25:
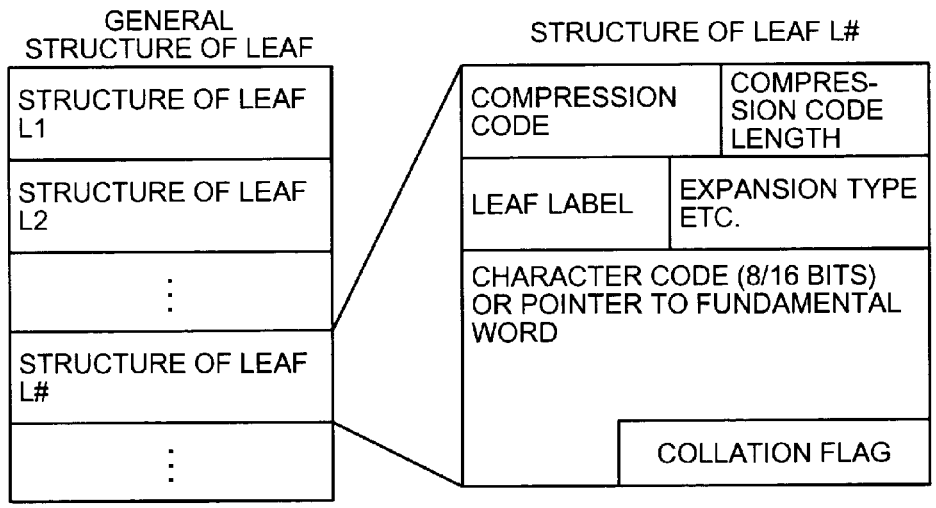
FIG. 24 is an explanatory diagram of a leaf structure.
FIG. 25 is an explanatory diagram of a specified single character structure.

FIG. 24 is an explanatory diagram of the leaf structure. The leaf structure is a data structure having first to fourth areas. In the leaf structure, the first area stores a compression code and a compression code length thereof. The second area stores the leaf label and expansion type (see FIG. 19). The third area stores a 16-bit character code that is a specified single character, an 8-bit character code component obtained by dividing a character code of a nonspecified single character, or a pointer to fundamental word depending on the expansion type. The pointer to fundamental word specifies a fundamental word within the fundamental word structure. A collation flag is also stored. The collation flag is "0" by default. In the case of "0", a character to be expanded is directly written in an expansion buffer and, in the case of "1", the character is interposed between a <color> tag and a </color> tag and written in the expansion buffer.

The fourth area stores a code type and a code category. The code type is information that identifies which among a numeric character, an alphabetic character, a special symbol, katakana, hiragana, or kanji a character code corresponds to, or whether a character code is a pointer to a reserved word. The code category is information that identifies whether the character code is 16-bit or 8-bit. In the case of 16-bit character code or in the case of a reserved word, "1" is assigned as the code category and, in the case of 8-bit character code component, "0" is assigned as the code category.

FIG. 25 is an explanatory diagram of a specified single character structure. A specified single character structure 2500 is a data structure that stores specified single character codes e# and pointers to leaves L# thereof. For example, for example, when the computer acquires the count result from the data file group Fs, the computer stores the specified single character codes e# to the specified single character structure 2500. When the $2^N$-branch nodeless Huffman tree is constructed, the computer stores pointers to the specific character codes e# into the specified single character structure 2500, which correspond to compression codes stored in the structures of leaves in the $2^N$-branch nodeless Huffman tree.

When the pointers to the specified single character codes e# are stored in the structures of the corresponding leaves, the computer stores pointers to the leaves corresponding to the specified single character codes e# in the $2^N$-branch nodeless Huffman tree in a manner correlated with the corresponding specified single character codes e# in the specified single character structure 2500. As a result, the specified single character structure 2500 is generated.

FIG. 26 is an explanatory diagram of a character code component structure. A character code component structure 2600 stores character code components and pointers to leaves L# thereof. For example, for example, when the computer acquires the count result from the data file group Fs, the computer stores the character code components into the character code component structure 2600. When the $2^N$-branch nodeless Huffman tree is constructed, the computer stores pointers to the character code components in the character code component structure 2600, which correspond to compression codes stored in the structures of leaves in the $2^N$-branch nodeless Huffman tree.

When the pointers to the character code components are stored in the structures of the corresponding leaves, the computer stores pointers to the leaves corresponding to the character code components in the $2^N$-branch nodeless Huffman tree in a manner correlated with the corresponding character code components in the character code component structure 2600. As a result, the character code component structure 2600 is generated.

FIG. 27 is an explanatory diagram of a fundamental word structure. A fundamental word structure 2700 is a data structure that stores fundamental words and pointers to leaves L# thereof. The fundamental word structure 2700 stores the fundamental words in advance. When the $2^N$-branch nodeless Huffman tree is constructed, the computer stores pointers to the fundamental words in the fundamental word structure 2700, which correspond to compression codes stored in the structures of leaves in the $2^N$-branch nodeless Huffman tree.

When the pointers to the fundamental words are stored in the structures of the corresponding leaves, the computer stores pointers to the leaves corresponding to the fundamental words in the $2^N$-branch nodeless Huffman tree in a manner correlated with the corresponding fundamental words in the fundamental word structure 2700.

Once the $2^N$-branch nodeless Huffman tree is generated, a compression code map of single characters, a compression code map of upper character code components, a compression code map of lower character code components, a compression code map of fundamental words, and a compression code map of bi-gram character strings can be generated. A detailed generation example of the compression code map of single characters, the compression code map of upper character code components, the compression code map of lower character code components, and the compression code map of bi-gram character strings will hereinafter be described. The compression code map of fundamental words is generated in the same way as the compression code map of single characters and will not be described.

FIG. 28 is an explanatory diagram of a generation example of the compression code maps. In FIG. 28, it is assumed that a character string "電馬は脱藩した" is described in a data file Fi.

(A) First, the head character "電" is the target character. Since the target character "電" is a specified single character, the compression code of the specified single character "電" is obtained by accessing the $2^N$-branch nodeless Huffman tree, to identify the appearance map of the specified single character "電". If not generated, an appearance map for the specified single character "電" is generated that has the compression code of the specified single character "

" as a pointer and a bit string indicative of the presence in data files, each bit being set to zero. In the appearance map of the specified single character " ", the bit of the data file Fi is turned on ("0"→"1").

(B) The target character is shifted by one gram to define " " as the target character. Since the target character " " is a specified single character, the compression code of the specified single character " " is obtained by accessing the $2^N$-branch nodeless Huffman tree, to identify the appearance map of the specified single character " ". If not generated, an appearance map for the specified single character " " is generated that has the compression code of the specified single character " " as a pointer and a bit string indicative of the presence in data files, each bit being set to zero. In the appearance map of the specified single character " ", the bit of the data file Fi is turned on ("0"→"1").

When the target character is shifted to " ", a bi-gram character string " " is acquired and therefore, the appearance map of the bi-gram character string " " is identified by the compression code string of " " obtained by connecting the compression code of " " and the compression code of " ". If not generated, an appearance map for the bi-gram character string " " is generated that has the compression code of " " as a pointer and a bit string indicative of the presence in data files, each bit being set to zero. In the appearance map of the bi-gram character string " ", the bit of the data file Fi is turned on ("0"→"1").

(C) The target character is shifted by one gram to define " " as the target character. The target character " " is processed in the same way as (B) and, in the appearance map of the specified single character " ", the bit of the data file Fi is turned on ("0"→"1"). Similarly, in the appearance map of the bi-gram character string " ", the bit of the data file Fi is turned on ("0"→"1").

(D) The target character is shifted by one gram to define " " as the target character. Since the target character " " is not a specified single character, the character code "0x8131" of the target character " " is divided into the upper character code component "0x81" and the lower character code component "0x31". The target character is then defined as the upper character code component "0x81". The upper character code component "0x81" is processed in the same way as a specified single character and, in the appearance map of the upper character code component "0x81", the bit of the data file Fi is turned on ("0"→"1"). Similarly, in the appearance map of the bi-gram character string " 0x81", the bit of the data file Fi is turned on ("0"→"1").

(E) The target character is shifted by one gram to define the lower character code component "0x31" of the character " " as the target character. The lower character code component "0x31" is processed in the same way and in the appearance map of the lower character code component "0x31", the bit of the data file Fi is turned on ("0"→"1"). Similarly, in the appearance map of the bi-gram character string "0x81 0x31", the bit of the data file Fi is turned on ("0"→"1").

The same process is executed at (F) to (I) and the completion of the process of the last data file Fn leads to the generation of the compression code map of single characters, the compression code map of upper character code components, the compression code map of lower character code components, and the compression code map of bi-gram character strings.

However, as depicted in FIG. 3, if the appearance frequency of a bi-gram character string is lower (when a division rank described later is R2g or lower), a first concatenated code to a fourth concatenated code are generated for the bi-gram character string (in the case of four-part division). An appearance map group having the first concatenated code to the fourth concatenated code as pointers is generated and the bit of the data file Fi is turned on ("0"→"1"). As a result, the reduction in map size and the reduction of retrieval noise can be achieved.

FIG. 29 is a block diagram of a hardware configuration of the computer according to the embodiment. As depicted in FIG. 29, the computer includes a central processing unit (CPU) 2901, a read-only memory (ROM) 2902, a random access memory (RAM) 2903, a magnetic disk drive 2904, a magnetic disk 2905, an optical disk drive 2906, an optical disk 2907, a display 2908, an interface (I/F) 2909, a keyboard 2910, a mouse 2911, a scanner 2912, and a printer 2913, respectively connected by a bus 2900.

The CPU 2901 governs overall control of the computer. The ROM 2902 stores therein programs such as a boot program. The ROM 2902 also stores therein a generation program of the compression code map and a search program using the compression code map or the code map. The RAM 2903 is used as a work area of the CPU 2901. The CPU 2901 can read out the programs stored in the ROM 2902 into the RAM 2903 for execution. The magnetic disk drive 2904, under the control of the CPU 2901, controls the reading and writing of data with respect to the magnetic disk 2905. The magnetic disk 2905 stores therein data written under control of the magnetic disk drive 2904.

The optical disk drive 2906, under the control of the CPU 2901, controls the reading and writing of data with respect to the optical disk 2907. The optical disk 2907 stores therein data written under control of the optical disk drive 2906, the data being read by a computer.

The display 2908 displays data such as text, images, functional information, etc., in addition to a cursor, icons, and/or tool boxes. A cathode ray tube (CRT), a thin-film-transistor (TFT) liquid crystal display, a plasma display, etc., may be employed as the display 2908.

The I/F 2909 is connected to a network 2914 such as the local area network (LAN), the wide area network (WAN), and the Internet via a communication line, and to other apparatuses through the network 2914. The I/F 2909 administers an internal interface with the network 2914 and controls the input/output of data from/to external apparatuses. For example, a modem or a LAN adaptor may be employed as the I/F 2909.

The keyboard 2910 includes keys for inputting letters, numerals, and various instructions and performs the input of data. Alternatively, a touch-panel-type input pad or numeric keypad, etc. may be adopted. The mouse 2911 is used to move the cursor, select a region, or move and change the size of windows. A track ball or a joy stick may be adopted provided each respectively has a function similar to a pointing device.

The scanner 2912 optically reads an image and takes in the image data into the computer. The scanner 2912 may have an optical character reader (OCR) function as well. The printer 2913 prints image data and text data. The printer 2913 may be, for example, a laser printer or an ink jet printer.

The computer may be a server or a desktop personal computer as well as a portable terminal such as a portable telephone, a smartphone, an e-book device, and a notebook personal computer.

As depicted in FIG. 76, this embodiment may be implemented for multiple computers. A system depicted in FIG.

76 includes computers 7601 to 7603 that may include the hardware depicted in FIG. 29, a network 7604, a switch 7605, and a radio base station 7607. I/F included in the computer 7603 has a radio communication function.

For example, a process of generating compression code maps or code maps for contents including files may be executed by the computer 7601 for distribution to the computer 7602 and the computer 7603, and the computer 7602 and the computer 7603 may each execute a retrieval process for the distributed contents.

Alternatively, a process of generating compression code maps or code maps for contents including files may be executed by the computer 7601, and the computer 7601 may accept a retrieval request for the contents from the computer 7602 or the computer 7603 and may execute a retrieval process to return a result of the executed retrieval process to each of the computer 7602 and the computer 7603.

As is the case with the computer in FIG. 29, each of the computers 7601 to 7603 may be a server or a desktop personal computer as well as a portable terminal such as a portable telephone, a smartphone, an e-book device, and a notebook personal computer.

Description will be made of an example of a compression code map generation process procedure executed by the computer using a generation program.

Figure 30:
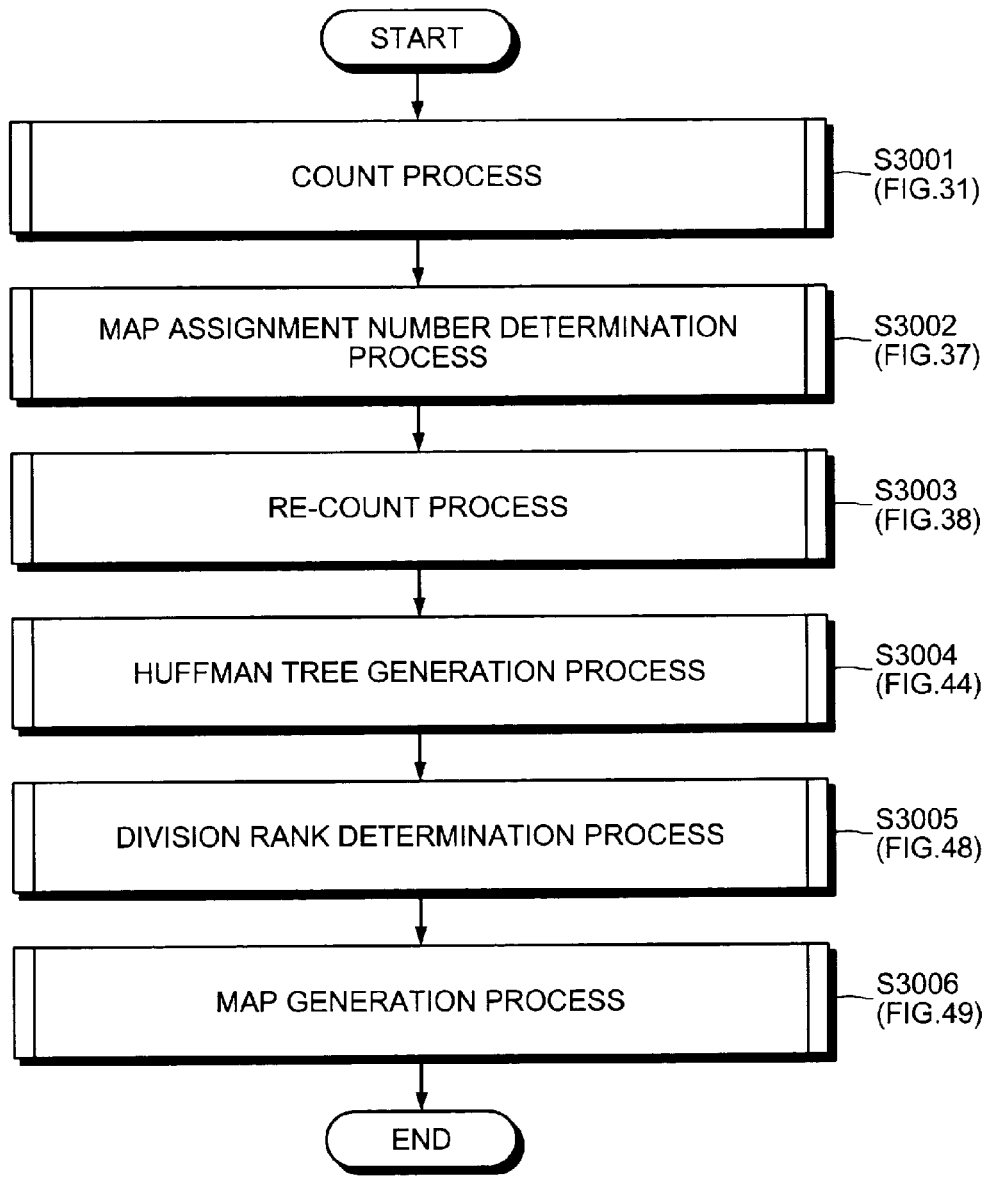
FIG. 30 is a flowchart of an example of a compression code map generation process procedure executed by a computer using a generation program.

FIG. 30 is a flowchart of the example of the compression code map generation process procedure executed by the computer using the generation program. The computer executes a count process (step S3001), a map assignment number determination process (step S3002), a re-count process (step S3003), a Huffman tree generation process (step S3004), a division rank determination process (step S3005), and a map generation process (step S3006).

The count process (step S3001) is a process of counting the numbers of appearances (also called appearance frequencies) of single characters and fundamental words in the data file group Fs. The map assignment number determination process (step S3002) is a process of determining the map assignment numbers of the single characters and the fundamental words counted at the count process (step S3001). Single characters and fundamental words in the appearance ranks corresponding to the map assignment numbers are respectively defined as the specified single characters and the fundamental words.

The re-count process (step S3003) is a process of dividing non-specific characters other than the specified single characters among the single characters into upper character code components and lower character code components, and counting the respective numbers of appearances. In the re-count process (step S3003), the numbers of appearances of bi-gram character strings are also counted.

The Huffman tree generation process (step S3004) is a process of generating a $2^N$-branch nodeless Huffman tree as depicted in FIGS. 19 to 24. The division rank determination process (step S3005) is a process of determining the division rank. The division rank is the appearance rank of bi-gram character strings that divide the compression code maps of bi-gram character strings re-counted in the re-count process (step S3003). As a result, the compression code maps of the bi-gram character strings below the division rank are divided.

The map generation process (step S3006) is a process of generating the compression code maps of specified single characters, fundamental words, upper character code components, lower character code components, and bi-gram character strings. Among the compression code maps of bi-gram character strings, the compression code maps of the bi-gram character strings after the division rank determined in the division rank determination process (step S3005) are divided. As a result, the reduction of retrieval noise can be achieved.

Figure 31:
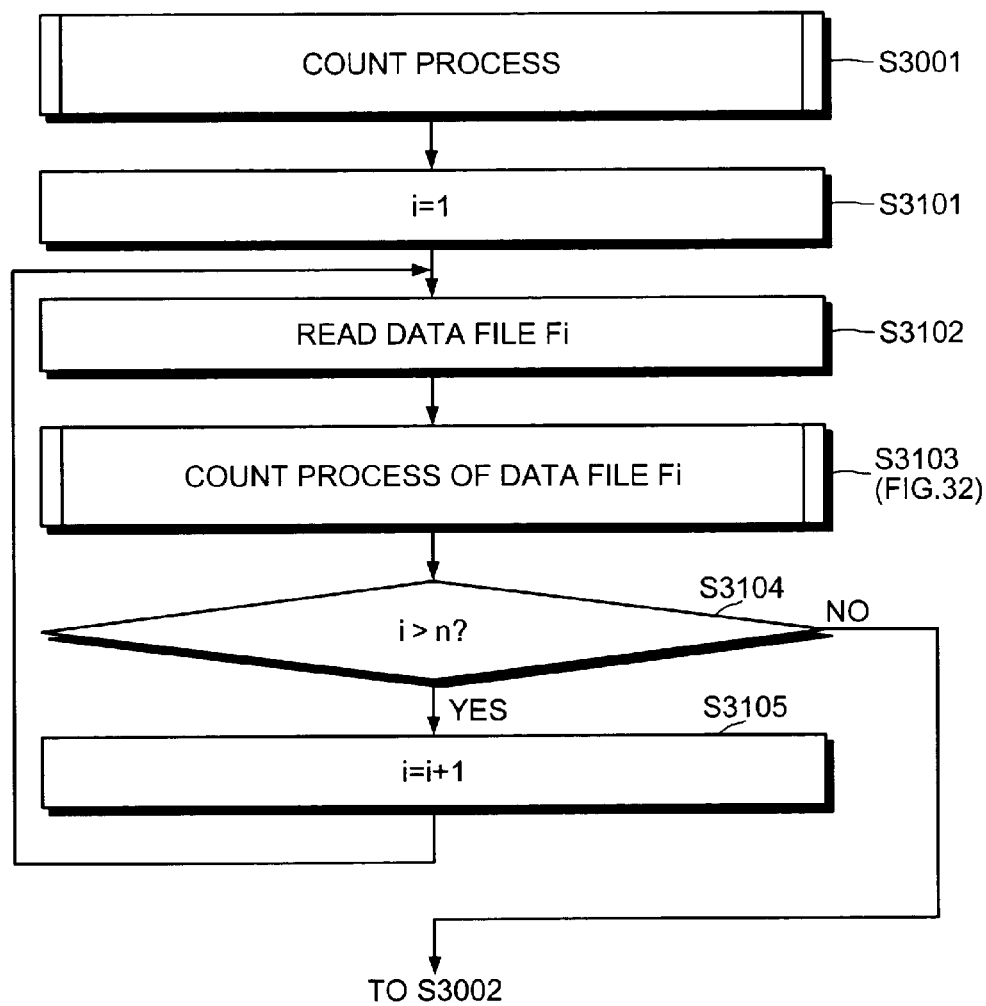
FIG. 31 is a flowchart of a detailed process procedure example of a count process (step S3001) depicted in FIG. 30.

(Count Process (Step S3001)) FIG. 31 is a flowchart of a detailed process procedure example of the count process (step S3001) depicted in FIG. 30. First, the computer sets a file number i to i=1 (step S3101) and reads a data file Fi (step S3102). The computer executes the count process on the data file Fi (step S3103). Details of the count process of the data file Fi (step S3103) will be described with reference to FIG. 32. The computer then determines whether the file number i satisfies i>n (where n is the total number of data files F1 to Fn) (step S3104).

If i>n is not satisfied (step S3104: NO), the computer increments i (step S3105) and returns to step S3102. On the other hand, if i>n is satisfied (step S3104: YES), the computer goes to the map assignment number determination process (step S3002) depicted in FIG. 30 and terminates the count process (step S3001). With this count process (step S3001), the count process of the data file Fi (step S3103) can be executed for each of the data files Fi.

Figure 32:
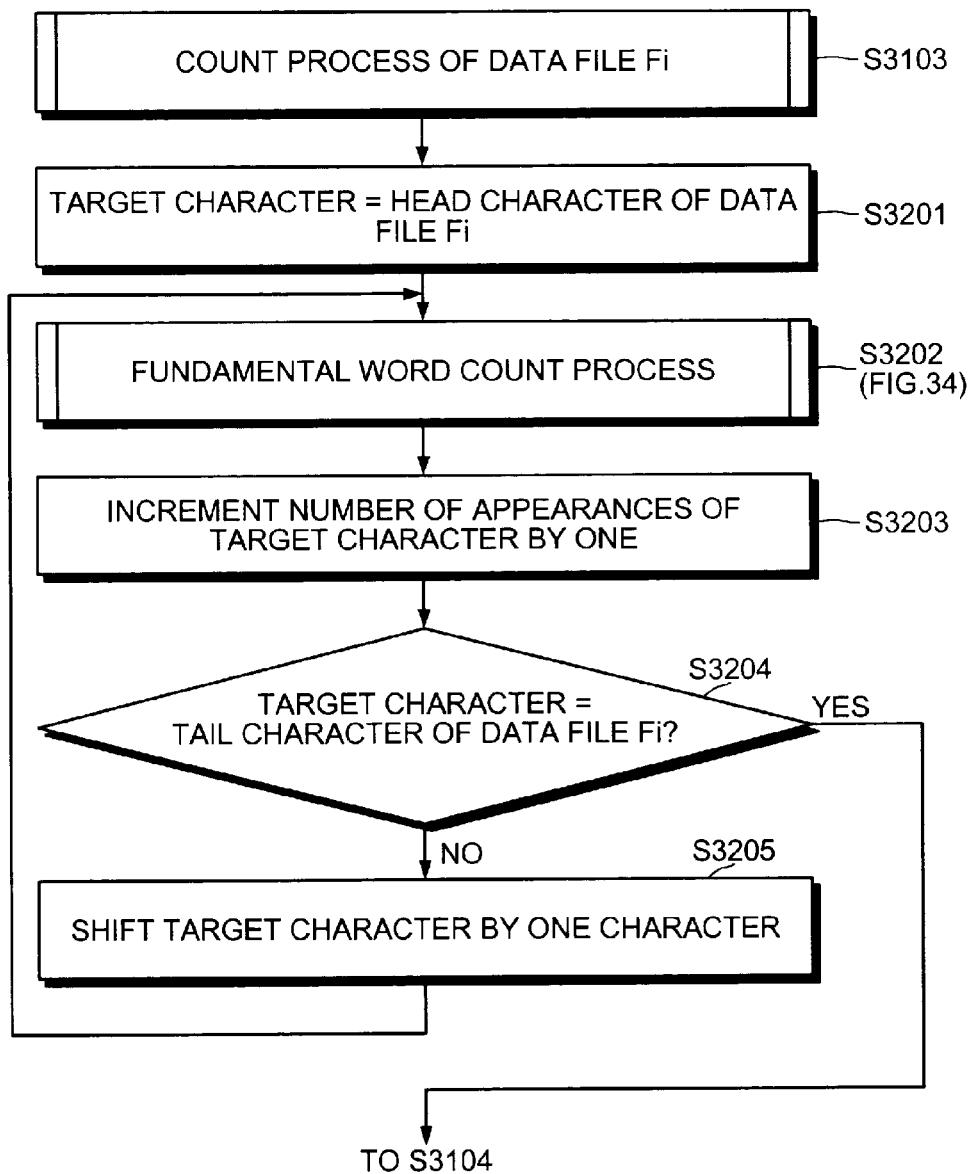
FIG. 32 is a flowchart of a detailed process procedure example of a count process of a data file Fi (step S3103) depicted in FIG. 31.

(Count Process of Data file Fi (step S3103)) FIG. 32 is a flowchart of a detailed process procedure example of the count process of the data file Fi (step S3103) depicted in FIG. 31. First, the computer defines the head character of the data file Fi as the target character (step S3201) and executes a fundamental word count process (step S3202). Details of the fundamental word count process (step S3202) will be described with reference to FIG. 34. The computer then increments the number of appearances of the target character by one in the character appearance frequency count table (step S3203).

FIG. 33 is an explanatory diagram of the character appearance frequency count table. A character appearance frequency count table 3300 is stored in a storage device such as the RAM 2903 or the magnetic disk 2905 and the number of appearances is incremented by one each time a corresponding character appears.

As depicted in FIG. 32, the computer determines whether the target character is the tail character of the data file Fi (step S3204). If the target character is not the tail character of the data file Fi (step S3204: NO), the computer shifts the target character by one character toward the tail (step S3205) and returns to step S3202.

On the other hand, if the target character is the tail character of the data file Fi (step S3204: YES), the computer goes to step S3104 and terminates the count process of the data file Fi (step S3103). With this count process of the data file Fi (step S3103), the appearance frequencies of the fundamental words and the single characters present in the data file group Fs can be counted.

FIG. 34 is a flowchart of a detailed process procedure example of the fundamental word count process (step S3202) depicted in FIG. 32. First, the computer executes a longest match retrieval process (step S3401) and determines whether a longest matching fundamental word is present (step S3402). Details of the longest match retrieval process (step S3401) will be described with reference to FIG. 36. If the longest matching fundamental word is present (step S3402; YES), the computer increments the number of appearances of the longest matching fundamental word by one in the fundamental word appearance frequency count table (step S3403) and goes to step S3203.

FIG. 35 is an explanatory diagram of the fundamental word appearance frequency count table. A fundamental word appearance frequency count table 3500 is stored in the storage device such as the RAM 2903 or the magnetic disk 2905 and the number of appearances is incremented by one each time a corresponding fundamental word appears.

As depicted in FIG. 34, if no longest matching fundamental word is present (step S3402; NO), the computer goes to step S3203. This leads to the termination of the fundamental word count process (step S3202). With the fundamental word count process (step S3202), fundamental words can be counted by the longest match retrieval process (step S3401) and therefore, fundamental words of longer character strings can preferentially be counted.

Figure 36:
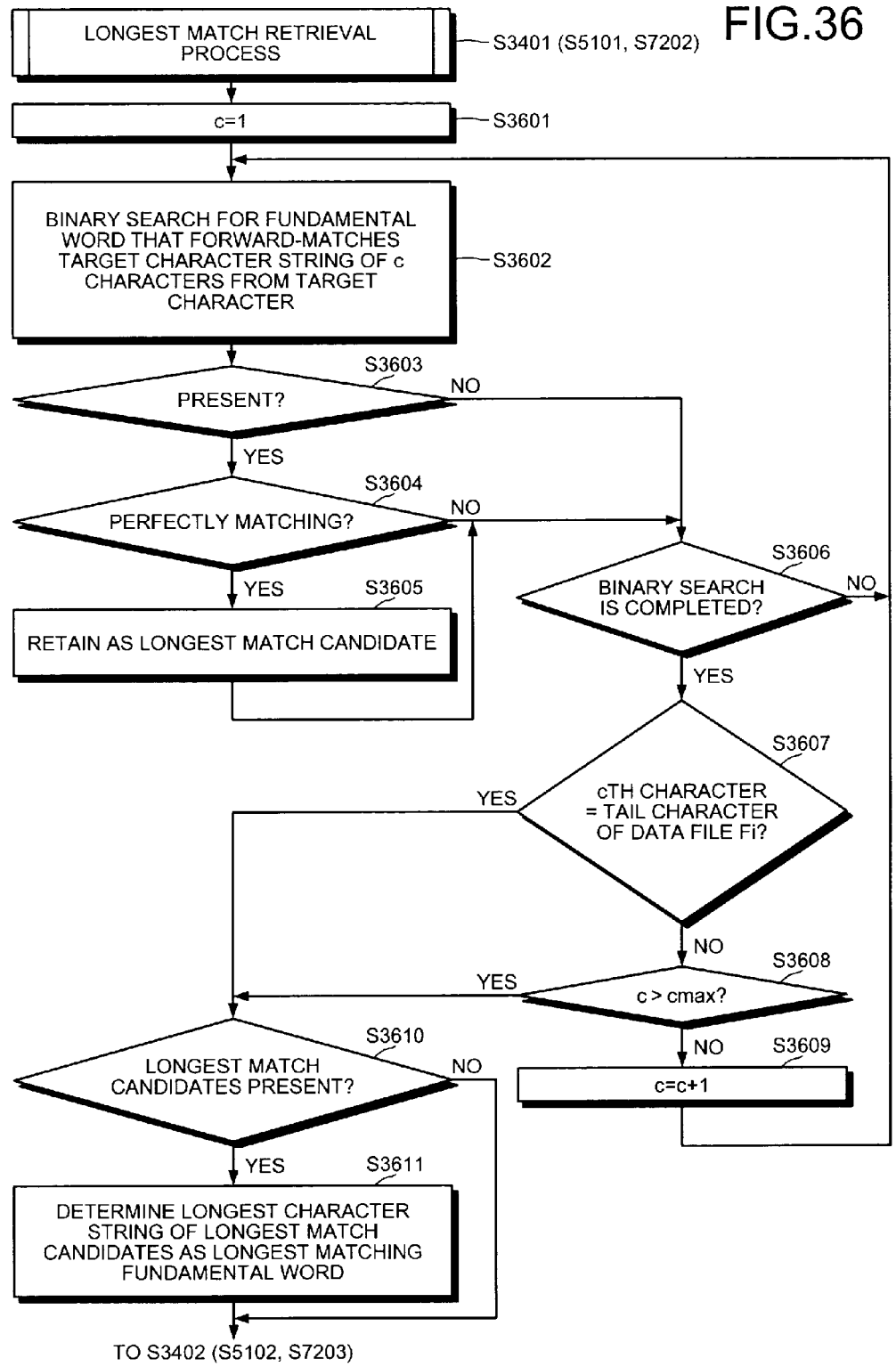
FIG. 36 is a flowchart of a detailed process procedure of a longest match retrieval process (step S3401) depicted in FIG. 34.

FIG. 36 is a flowchart of a detailed process procedure of the longest match retrieval process (step S3401) depicted in FIG. 34. First, the computer sets c=1 (step S3601). The number of characters from the target character is denoted by c (including the target character). In the case of c=1, only the target character is indicated. The computer then performs binary search for a fundamental word that forward-matches an target character string of c characters from the target character (step S3602). The computer determines whether the fundamental word is present as a result of the search (step S3603). If no fundamental word is hit by the binary search (step S3603: NO), the computer goes to step S3606.

On the other hand, if a fundamental word is hit by the binary search (step S3603: YES), the computer determines whether the hit fundamental word perfectly matches the target character string (step S3604). If not (step S3604: NO), the computer goes to step S3606. On the other hand, if the hit fundamental word perfectly matches (step S3604: YES), the computer retains in a storage device, the fundamental word as a longest match candidate (step S3605) and goes to step S3606.

At step S3606, the computer determines whether the binary search has been completed for the target character string (step S3606). For example, the computer determines whether the binary search has been performed for the ending fundamental word. If the binary search is not finished (step S3606: NO), the computer goes to step S3602 to continue until the binary search is completed.

On the other hand, if the binary search has been completed for the target character string (step S3606: YES), the computer determines whether a cth character is the tail character of the data file Fi (step S3607). If the cth character is the tail character of the data file Fi (step S3607: YES), the computer goes to step S3610. On the other hand, if the cth character is not the tail character of the data file Fi (step S3607: NO), the computer determines whether c>cmax is satisfied (step S3608). A preset value is denoted by cmax and, as a result, the upper limit number of characters of the target character string is set.

If c>cmax is not satisfied (step S3608: NO), the computer increments c (step S3609) and returns to step S3602. On the other hand, if c>cmax is satisfied (step S3608: YES), the computer determines whether a longest match candidate is present (step S3610). For example, the computer determines whether at least one longest match candidate is retained in the memory at step S3605.

If a longest match candidate is present (step S3610: YES), the computer determines the longest character string of the longest match candidates as the longest matching fundamental word (step S3611). The computer then goes to step S3402. On the other hand, if no longest match candidate is present at step S3610 (step S3610: NO), the computer goes to step S3402. This leads to the termination of the longest match retrieval process (step S3401). With this longest match retrieval process (step S3401), the longest character string that the perfectly matches the character string can be retrieved as the fundamental word among fundamental words within the fundamental word structure.

Figure 37:
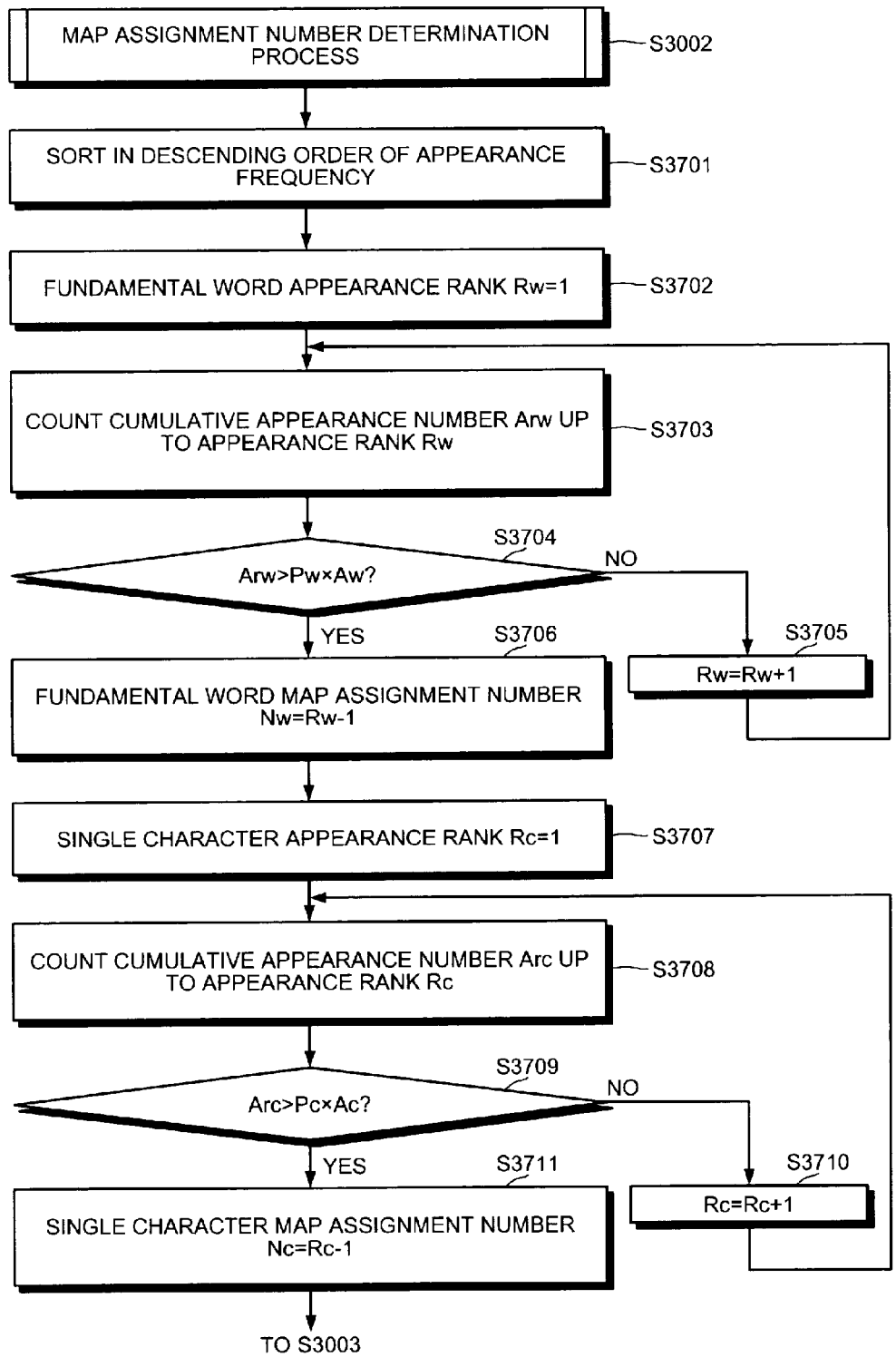
FIG. 37 is a flowchart of a detailed process procedure example of a map assignment number determination process (step S3002) depicted in FIG. 30.

FIG. 37 is a flowchart of a detailed process procedure example of the map assignment number determination process (step S3002) depicted in FIG. 30. First, the computer sorts in descending order of appearance frequency, the fundamental word appearance frequency count table 3500 indicative of the appearance frequency of each fundamental word and the character appearance frequency count table 3300 indicative of the appearance frequency of each single character obtained by the count process (step S3001) (step S3701). The computer refers to the sorted fundamental word appearance frequency count table 3500, sets an appearance rank Rw of the fundamental words to Rw=1 (step S3702), and counts the cumulative appearance number Arw until the appearance rank Rw (step S3703). The computer determines whether expression (1) is satisfied (step S3704).

$$Arw > Pw \times Aw \quad (1)$$

where Aw is the total number of appearances of the counted fundamental words.

If expression (1) is not satisfied (step S3704: NO), the computer increments the appearance rank Rw (step S3705), and returns to step S3703. Therefore, the appearance rank Rw is continuously lowered until expression (1) is satisfied.

When expression (1) is satisfied (step S3704: YES), the computer sets a map assignment number Nw of the fundamental words to Nw=Rw−1 (step S3706). The map assignment number Nw is the number of fundamental words assigned to the fundamental word appearance map generated in the map generation process (step S3006) and means the number of records (lines) of the fundamental word appearance map.

The computer sets an appearance rank Rc of the single characters to Rc=1 (step S3707) and counts the cumulative appearance number Arc until the appearance rank Rc (step S3708). The computer determines whether the following expression (2) is satisfied (step S3709).

$$Arc > Pc \times Ac \quad (2)$$

where Ac is the total number of appearances of the counted single characters.

If expression (2) is not satisfied (step S3709: NO), the computer increments the appearance rank Rc (step S3710) and returns to step S3708. Therefore, the appearance rank Rc is continuously lowered until expression (2) is satisfied.

When expression (2) is satisfied (step S3709: YES), the computer sets a map assignment number Nc of the single characters to Nc=Rc−1 (step S3711). The map assignment number Nc is the number of specified single characters assigned to the specified single character appearance map generated in the map generation process (step S3006) and means the number of records (lines) of the specified single character appearance map. Subsequently, the computer goes to the re-count process (step S3003) and terminates the map assignment number determination process (step S3002).

With the map assignment number determination process (step S3002), the fundamental word appearance map can be generated for the number of the fundamental words corresponding to the target appearance rate Pw in the map generation process (step S3006). Therefore, since it is not necessary to assign all the fundamental words to the map and the assignment is determined in accordance with the target appearance rate Pw, the map size can be optimized.

For the single characters, the compression code map of specified single characters can be generated for the number of the single characters corresponding to the target appearance rate Pc in the map generation process (step S3006). Therefore, since it is not necessary to assign all the single characters to the map and the assignment is determined in accordance with the target appearance rate Pc, the map size can be optimized.

Figure 38:
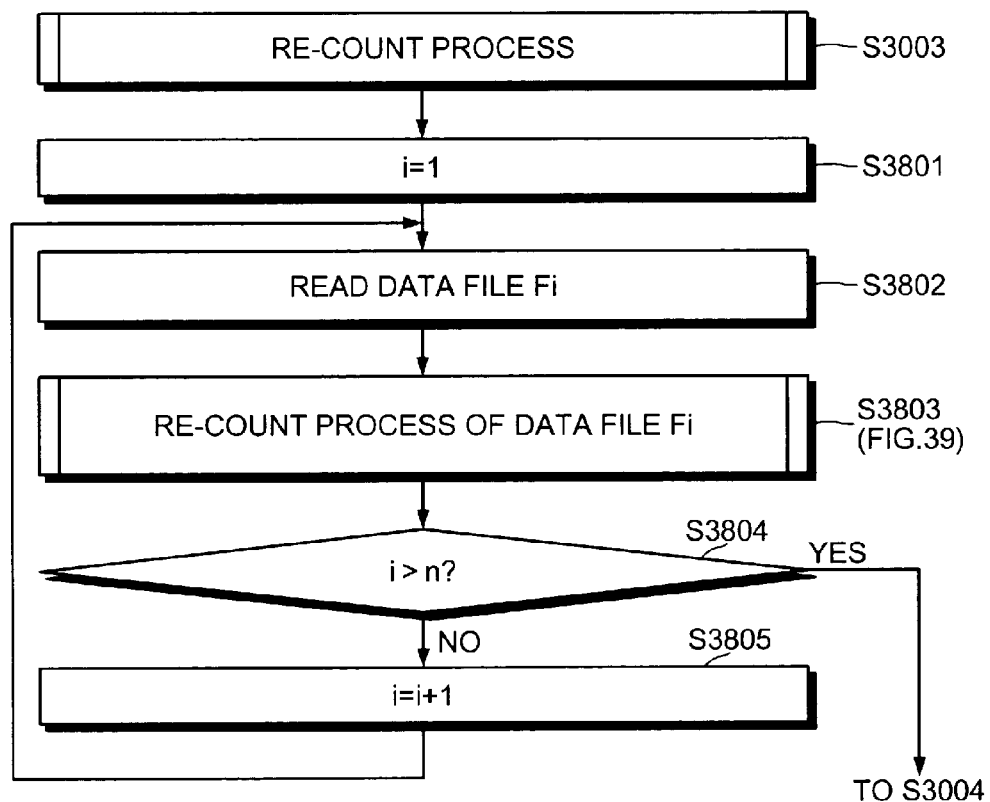
FIG. 38 is a flowchart of a detailed process procedure example of a re-count process (step S3003) depicted in FIG. 30.

FIG. 38 is a flowchart of a detailed process procedure example of the re-count process (step S3003) depicted in FIG. 30. First, the computer sets the file number i to i=1 (step S3801) and reads the data file Fi (step S3802). The computer executes the re-count process of the data file Fi (step S3803). Details of the re-count process of the data file Fi (step S3803) will be described with reference to FIG. 39. Subsequently, the computer determines whether the file number i satisfies i>n (where n is the total number of the data files F1 to Fn) (step S3804).

If i>n is not satisfied (step S3804: NO), the computer increments i (step S3805) and returns to step S3802. On the other hand, if i>n is satisfied (step S3804: YES), the computer goes to the Huffman tree generation process (step S3004) depicted in FIG. 30 and terminates the re-count process (step S3003). With this re-count process (step S3003), the re-count process of the data file Fi (step S3803) can be executed for each of the data files Fi.

Figure 39:
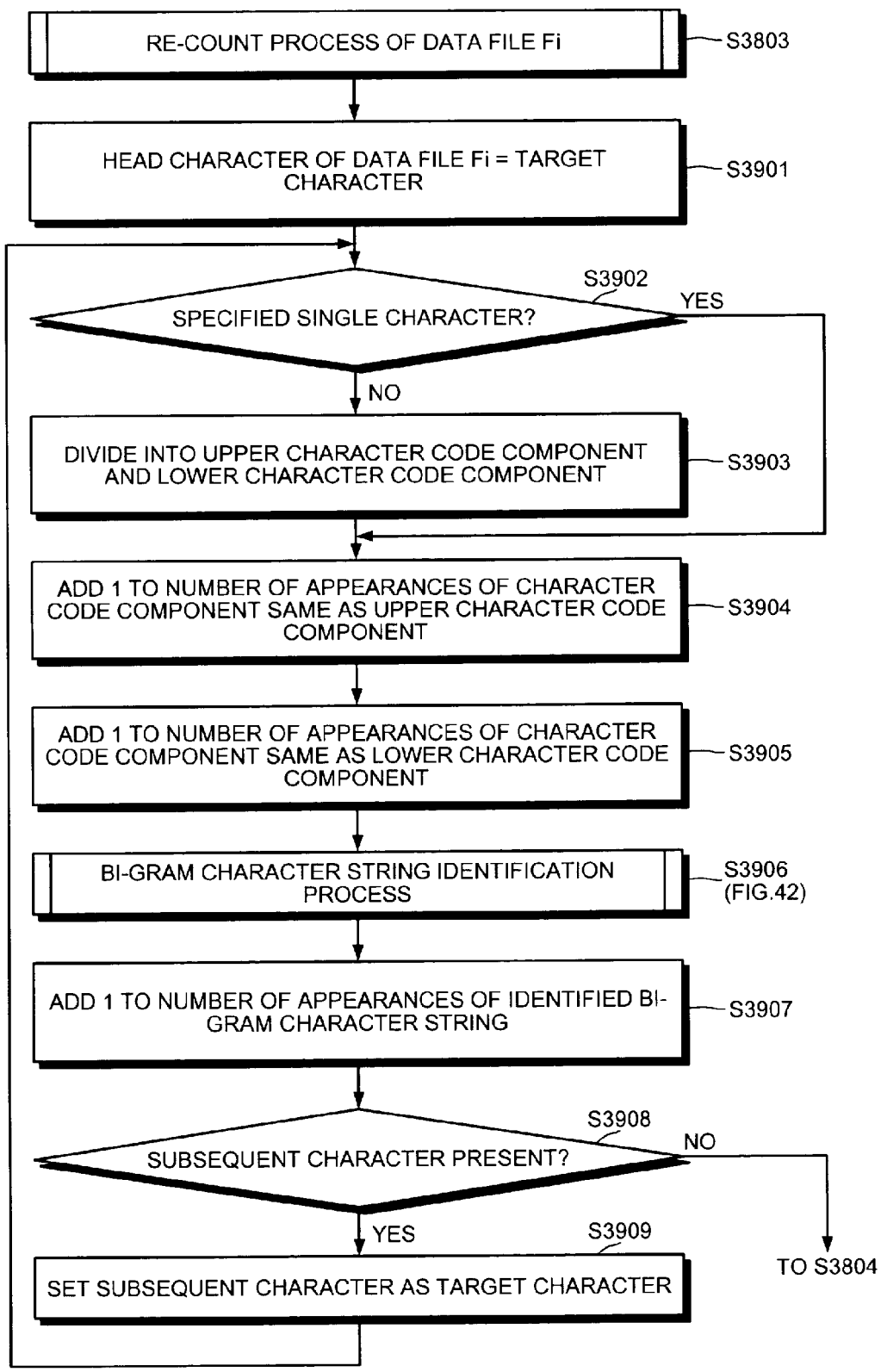
FIG. 39 is a flowchart of a detailed process procedure example of a re-count process of the data file Fi (step S3803).

FIG. 39 is a flowchart of a detailed process procedure example of the re-count process of the data file Fi (step S3803). First, the computer defines the head character of the data file Fi as the target character (step S3901) and determines whether the target character is a specified single character (step S3902). If the target character is a specified single character (step S3902: YES), the computer goes to step S3904 without dividing the character.

On the other hand, if the target character is not a specified single character (step S3902: NO), the computer divides the character code of the target character into the upper character code component and the lower character code component (step S3903). The computer goes to step S3904.

At step S3904, the computer adds one to the number of appearances of the same character code component as the upper character code component acquired at step S3903 in an upper character code component appearance frequency count table (step S3904).

FIG. 40 is an explanatory diagram of the upper character code component appearance frequency count table. An upper character code component appearance frequency count table 4000 is stored in the storage device such as the RAM 2903 or the magnetic disk 2905 and the number of appearances is incremented by one each time a corresponding upper character code component appears.

In FIG. 39, the computer adds one to the number of appearances of the same character code component as the lower character code component acquired at step S3903 in a lower character code component appearance frequency count table (step S3905).

FIG. 41 is an explanatory diagram of the lower character code component appearance frequency count table. An lower character code component appearance frequency count table 4100 is stored in the storage device such as the RAM 2903 or the magnetic disk 2905 and the number of appearances is incremented by one each time a corresponding lower character code component appears.

In FIG. 39, the computer executes a bi-gram character string identification process (step S3906). In the bi-gram character string identification process (step S3906), a bigram character string starting from the target character is identified. Details of the bi-gram character string identification process (step S3906) will be described with reference to FIG. 42.

The computer adds one to the number of appearances of the bi-gram character string identified in the bi-gram character string identification process (step S3906) in a bi-gram character string appearance frequency count table (step S3907).

Figure 42:
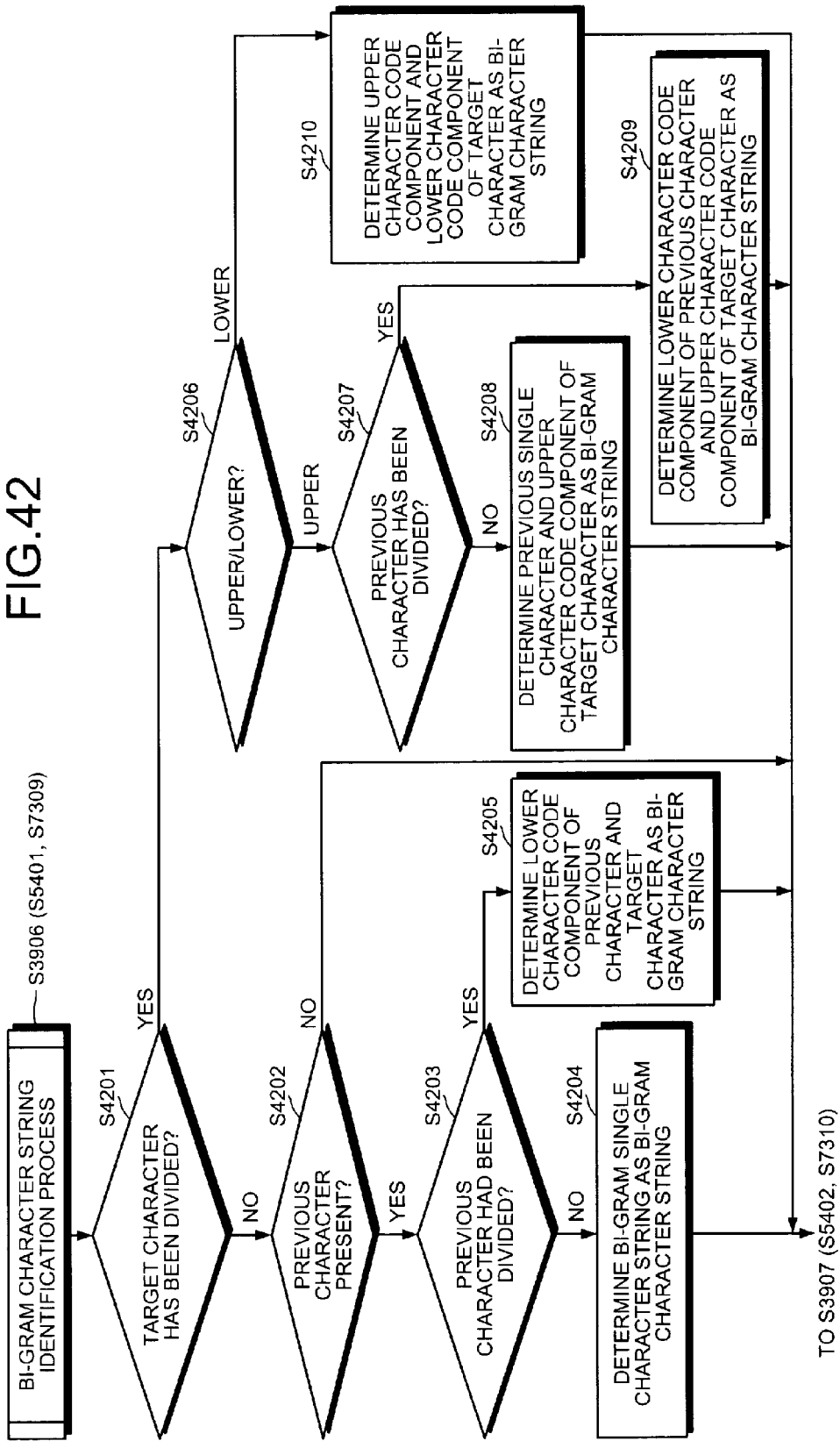
FIG. 42 is a flowchart of a detailed process procedure of a bi-gram character string identification process (step S3906) depicted in FIG. 39.

FIG. 42 is a flowchart of a detailed process procedure of the bi-gram character string identification process (step S3906) depicted in FIG. 39. First, for the target character, the computer determines whether the target character has been divided (step S4201). In other words, the computer determines whether the target character is a character code component. If not (step S4201: NO), i.e., in the case of a single character, the computer determines whether the previous character is present (step S4202).

If the previous character is present (step S4202: YES), the computer determines whether the previous character has been divided (step S4203). In other words, the computer determines whether the previous character is a character code component. If not (step S4203: NO), i.e., in the case of a single character, the computer determines a character string consisting of the previous single character before the target character and the target character (single character) as a bi-gram character string (step S4204). The computer goes to step S3907.

On the other hand, at step S4203, if the previous character has been divided (step S4203: YES), i.e., in the case of a character code component, the character code component, i.e., the previous character is a lower character code component. Therefore, the computer determines a character string consisting of the lower character code component, which is the previous character, and the target character as a bi-gram character string (step S4205). The computer goes to step S3907.

At step S4202, if no previous character is present (step S4202: NO), since only the target character is left, the computer goes to step S3907 without determining a bi-gram character string.

At step S4201, if the target character has been divided (step S4201: YES), i.e., in the case of a character code component, the computer determines whether the character code component is an upper character code component or a lower character code component (step S4206).

In the case of the upper character code component (step S4206: upper), the computer determines whether the previous character has been divided (step S4207). In other words, it is determined whether the previous character is a character code component. If not (step S4207: NO), i.e., in the case of a single character, the computer determines a character string consisting of the previous single character before the target character and the upper character code component divided from the target character as a bi-gram character string (step S4208). The computer goes to step S3907.

On the other hand, at step S4207, if the previous character has been divided (step S4207: YES), i.e., in the case of a character code component, the character code component, i.e., the previous character is a lower character code component. Therefore, the computer determines a character string consisting of the lower character code component, which is the previous character, and the upper character code component divided from the target character as a bi-gram character string (step S4209). The computer goes to step S3907.

At step S4206, in the case of the lower character code component (step S4206: lower), the computer determines a character string consisting of the upper character code component and the lower character code component divided from the target character as a bi-gram character string (step S4210). The computer goes to step S3907.

With the bi-gram character string identification process (step S3906), a bi-gram character string can be identified even if the target character has been divided. Since the bi-gram character strings are identified by shifting characters one-by-one, the map can simultaneously be generated in parallel with the compression code map of fundamental words and the compression code map of specified single characters.

With the information generation as described above, since the numbers of fundamental words and single characters associated with the map generation are limited by the target appearance rates Pw and Pc, wasteful map generation is eliminated, and the acceleration of the map generation and the optimization of the map size can be realized at the same time. The generation of multiple types of maps can simultaneously be executed in parallel by shifting characters one-by-one, and the generation of multiple types of maps used in highly accurate retrieval can be made more efficient.

Figures 43, 44:
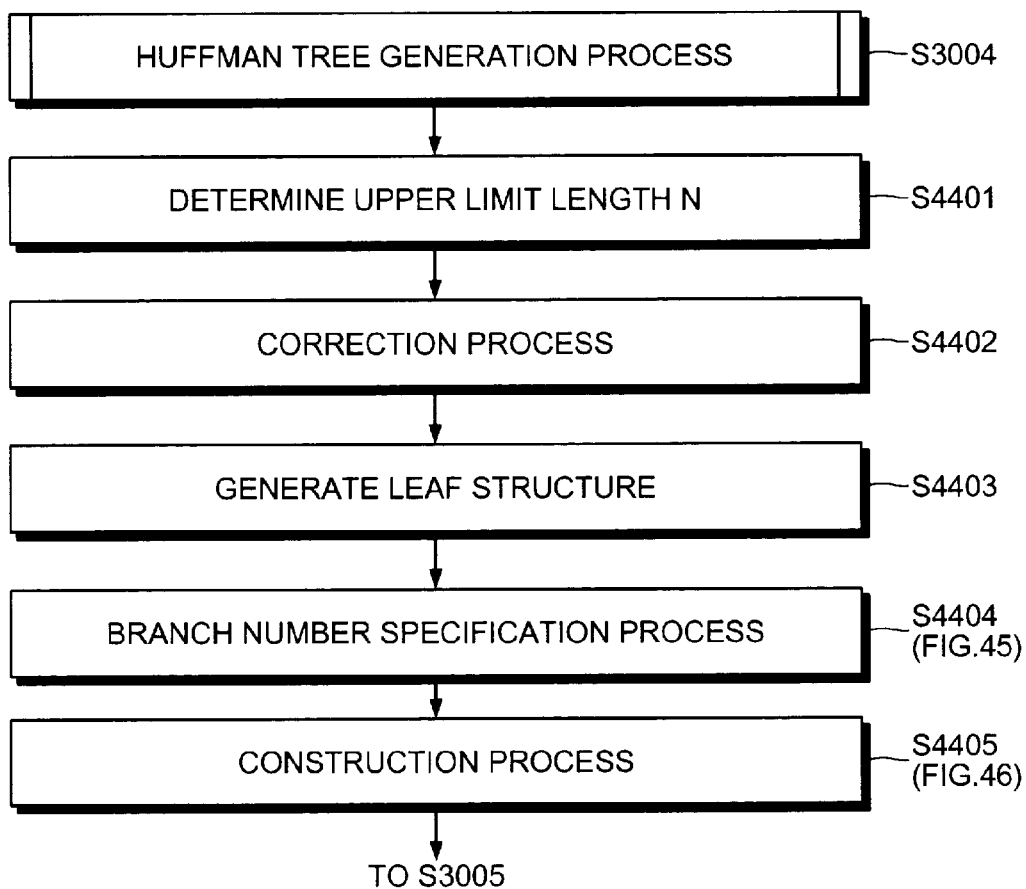
FIG. 43 is an explanatory diagram of a bi-gram character string appearance frequency count table.
FIG. 44 is a flowchart of a detailed process procedure example of a Huffman tree generation process (step S3004) depicted in FIG. 30.

FIG. 43 is an explanatory diagram of the bi-gram character string appearance frequency count table. A bi-gram character string appearance frequency count table 4300 is stored in the storage device such as the RAM 2903 or the magnetic disk 2905 and the number of appearances is incremented by one each time a corresponding bi-gram character string appears.

Subsequently, the computer determines whether the subsequent character of the target character is present within the data file Fi (step S3908), if the subsequent character is present (step S3908: YES), the subsequent character is set as the target character (step S3909) and the computer returns to step S3902. On the other hand, if no subsequent character is present (step S3908: NO), the computer terminates the re-count process of the data file Fi (step S3803) and goes to step S3804.

As a result, the number of appearances of the upper character code components, the lower character code components, and the bi-gram character strings present within the data files Fi can be counted for each of the data files Fi.

FIG. 44 is a flowchart of a detailed process procedure example of the Huffman tree generation process (step S3004) depicted in FIG. 30. As depicted in FIG. 44, the computer determines the upper limit length N of the compression code length (step S4401). The computer then executes a correction process (step S4402). The correction process is a process of correcting the occurrence probability and the compression code length for each character unit by using the upper limit length N of the compression code length as described with reference to FIGS. 19 to 21.

The computer generates a leaf structure for each of the character units (step S4403). The computer executes a branch number specification process (step S4404). In the branch number specification process (step S4404), the number of branches per leaf is specified for each compression code length. Details of the branch number specification process (step S4404) will be described with reference to FIG. 45.

The computer executes a construction process (step S4405). Since the number of branches of each leaf structure is specified by the branch number specification process (step S4404), the computer first generates pointers to the leaves by the number of branches for each leaf structure. The computer integrates the generated pointers to leaves for the leaf structures to form a root structure. As a result, a $2^N$-branch nodeless Huffman tree is generated. The generated $2^N$-branch nodeless Huffman tree is stored in a storage device (such as the RAM 2903 or the magnetic disk 2905) in the computer. The computer then goes to the division rank determination process (step S3005) of FIG. 30.

Figure 45:
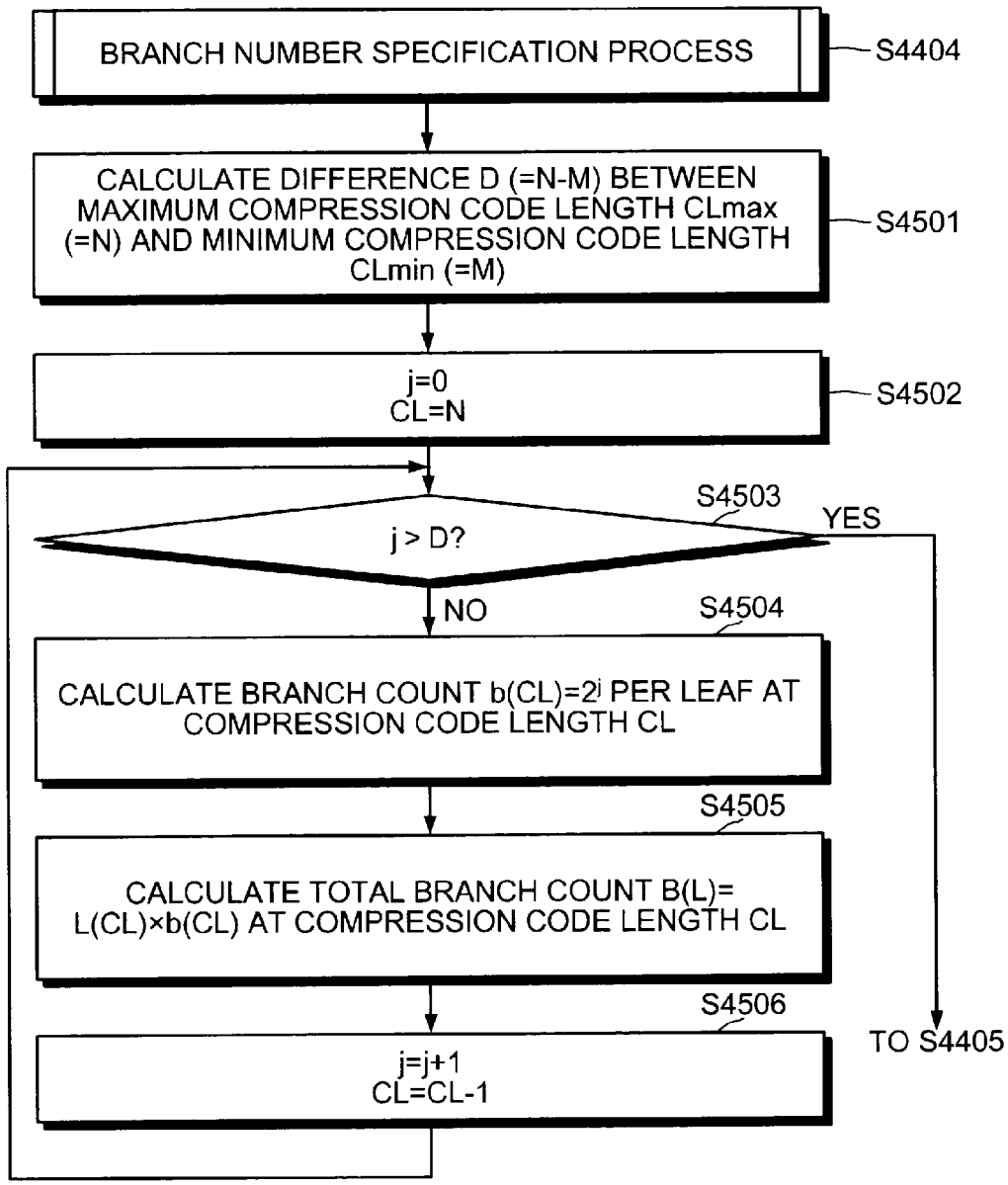
FIG. 45 is a flowchart of a detailed process procedure example of a branch number specification process (step S4404) depicted in FIG. 44.

FIG. 45 is a flowchart of a detailed process procedure example of the branch number specification process (step S4404) depicted in FIG. 44. First, the computer calculates a difference D (=N-M) between a maximum compression code length CLmax (=N) and a minimum compression code length CLmin (=M) (step S4501). For example, in the case of N=11, M=6 is known by reference to FIG. 19. Therefore, D=5 is obtained.

The computer sets a variable j that is an exponent of 2 to j=0 and sets a variable CL of compression code length to CL=N (step S4502). The computer determines whether j>D is satisfied (step S4503). If j>D is not satisfied (step S4503: NO), the computer calculates the count b(CL) of branches per leaf at the compression code length CL (step S4504). The count b(CL) of branches per leaf at the compression code length CL is calculated from b(CL)=$2^j$. For example, since j=0 corresponds to the compression code length CL=N=11, the count b(11) of branches per leaf at the compression code length of 11 bits is b(11)=$2^j$=$2^0$=1.

The computer calculates the total count B(L) of branches at the compression code length CL (step S4505). The total count B(L) of branches at the compression code length CL is calculated by B(L)=L(CL)×b(CL). L(CL) is the count of leaves (number of types of character units) at the compression code length CL. For example, since j=0 corresponds to the compression code length CL=N=11, the total count B(L) of branches at the compression code length of 11 bits is 1216×$2^0$=1216.

Subsequently, the computer increments j and decrements the compression code length CL (step S4506) and returns to step S4503 to determine whether j after the increment satisfies j>D. In the case of N=11, j=D leads to j=D=5 and, as a result, CL=M=6 is obtained. Therefore, at step S4504, the count b(6) of branches per leaf at the compression code length CL (5 bits) is b(6)=$2^6$=64. Similarly, the total count B(L) is B(6)=0×$2^6$=0. If j>D is satisfied (step S4503: YES), the computer goes to the construction process (step S4405).

Figure 46:
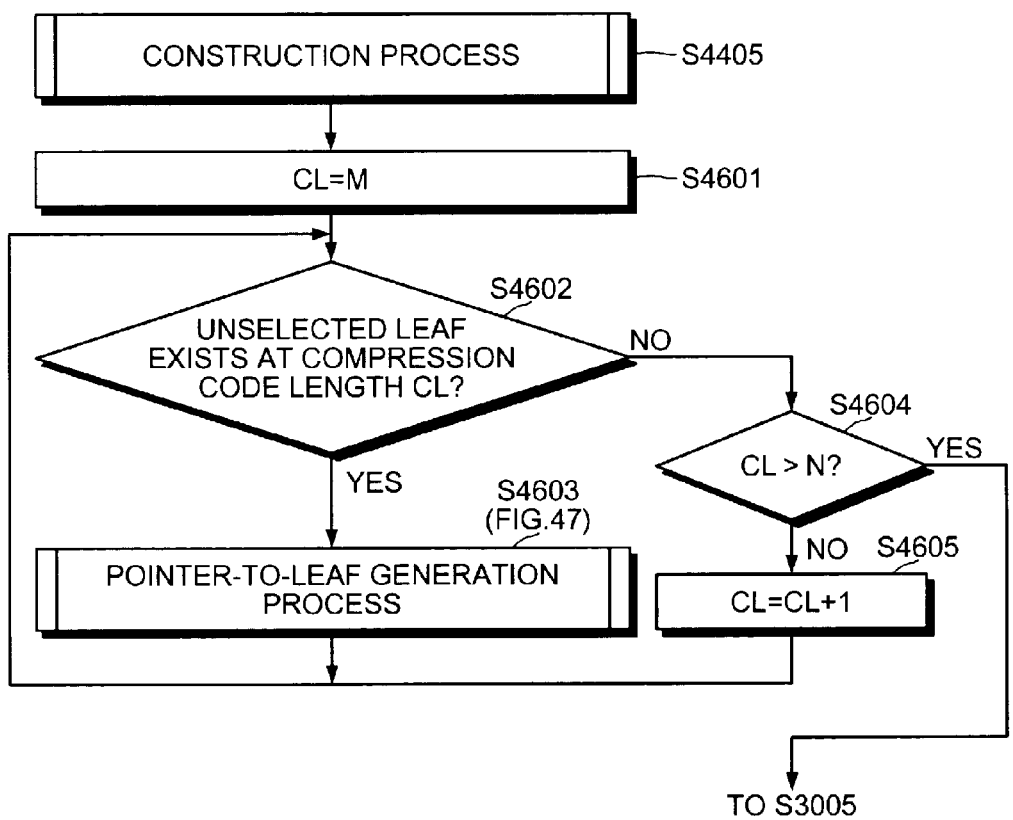
FIG. 46 is a flowchart of a detailed process procedure of a construction process (step S4405) depicted in FIG. 44.

FIG. 46 is a flowchart of a detailed process procedure of the construction process (step S4405) depicted in FIG. 44. First, the computer sets the compression code length CL to CL=CLmin=M (step S4601). The computer determines whether an unselected leaf exists at the compression code length CL (step S4602). If an unselected leaf exists (step S4602: YES), the computer executes a pointer-to-leaf generation process (step S4603) and returns to step S4602. In the pointer-to-leaf generation process (step S4603), pointers to the leaf are generated by the number of branches corresponding to the compression code length CL for each leaf structure. Details of the pointer-to-leaf generation process (step S4603) will be described with reference to FIG. 47.

On the other hand, at step S4602, if no unselected leaf exists (step S4602: NO), the computer determines whether CL>N is satisfied (step S4604). If CL>N is not satisfied (step S4604: NO), the computer increments CL (step S4605) and returns to step S4602. On the other hand, if CL>N is satisfied (step S4604: YES), this means that the $2^N$-branch nodeless Huffman tree is constructed, and the computer goes to the division rank determination process (step S3005) of FIG. 30.

Figure 47:
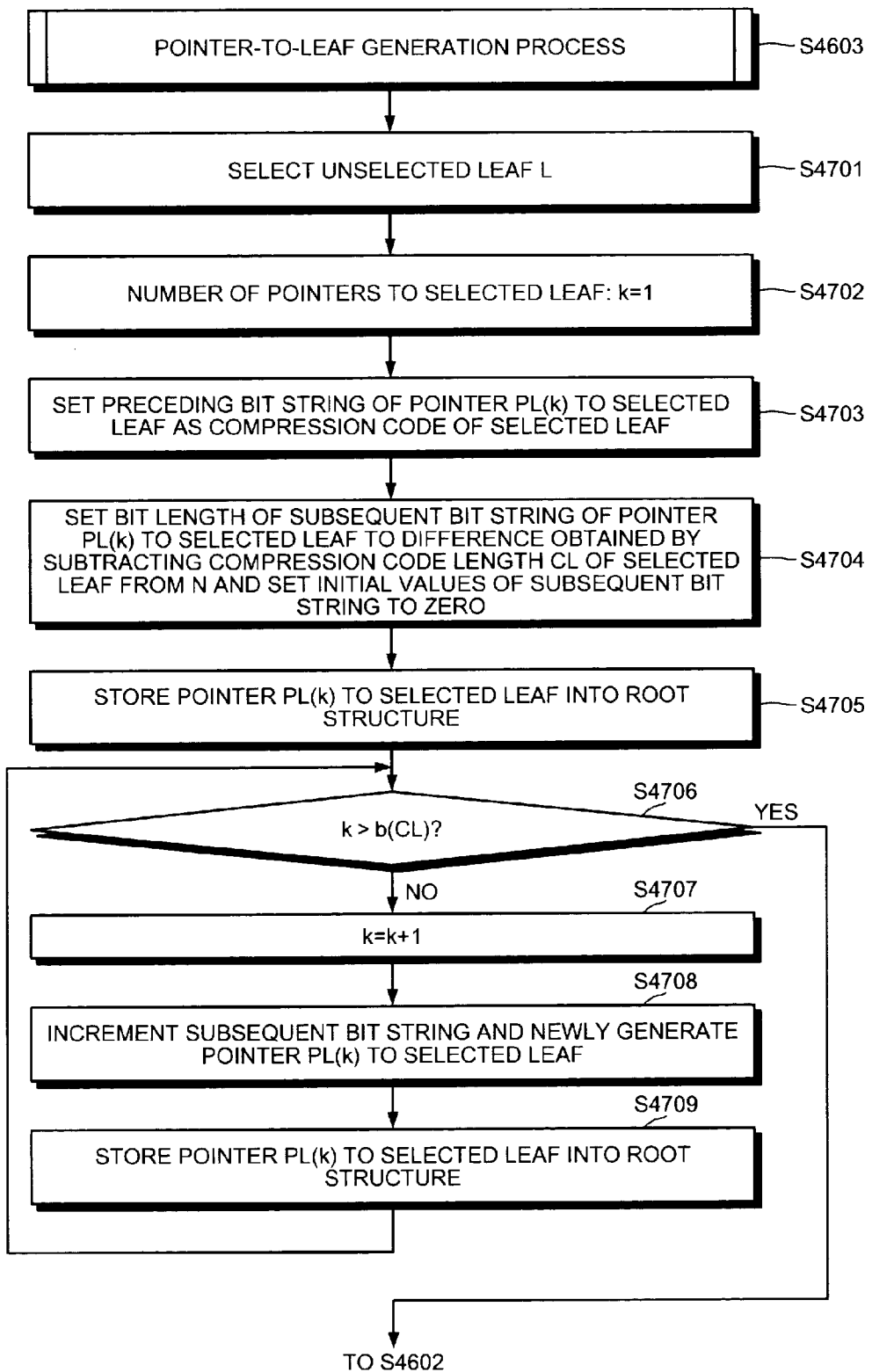
FIG. 47 is a flowchart of a detailed process procedure of a pointer-to-leaf generation process (step S4603) depicted in FIG. 46.

FIG. 47 is a flowchart of a detailed process procedure of the pointer-to-leaf generation process (step S4603) depicted in FIG. 46. First, the computer selects an unselected leaf L (step S4701) and sets a number k of pointers to the selected leaf to k=1 (step S4702). The computer sets the preceding bit string of a pointer PL(k) to the selected leaf as the compression code of the selected leaf (step S4703). For example, in the case of the upper limit length N=11, if the selected leaf is the leaf structure of the character unit "0", the compression code is "000000". Therefore, the preceding bit string of the pointer PL(k) to the selected leaf is also "000000".

The computer sets the bit length of the subsequent bit string of the pointer PL(k) to the selected leaf to the difference obtained by subtracting the compression code length CL of the selected leaf from the maximum compression code length N and sets initial values of the subsequent bit string to zero, respectively (step S4704). For example, if the selected leaf is the leaf structure of the character unit "0", the compression code length CL is 6 bits and therefore, the bit length of the subsequent bit string is 5 bits (=11−6). In the case of k=1, the subsequent bit string is set to zero, respectively, and therefore, the subsequent bit string is "00000", which is 5-bit.

The computer stores the pointer PL(k) to the selected leaf into the root structure (step S4705). Subsequently, the computer determines whether k>b(CL) is satisfied (step S4706), where b(CL) is the number of branches per leaf of the selected leaf at the compression code length CL. If k>b(CL) is not satisfied (step S4706: NO), since pointers to leaf have not been generated for all the branches assigned to the selected leaf, the computer increments k (step S4707).

The computer increments the current subsequent bit string and concatenates the incremented subsequent bit string to the end of the preceding bit string to newly generate the pointer PL(k) to the selected leaf (step S4708). The computer stores the pointer PL(k) to the selected leaf into the root structure (step S4709) and returns to step S4706. By repeating step S4706 to S4709, the pointers to leaf are generated by the number of branches per leaf. At step S4706, if k>b(CL) is satisfied (step S4706: YES), the computer goes to step S4602.

Since the maximum number $2^N$ of branches in the $2^N$-branch nodeless Huffman tree can be set to the optimum number depending on the number of types of character unit appearing in the data file group Fs, the size of the $2^N$-branch nodeless Huffman tree can be made appropriate. According to this embodiment, even if the upper limit length N is not an integral multiple of 2 to 4 (e.g., the upper limit length N=11 or 13), the $2^N$-branch nodeless Huffman tree can be generated with good compression efficiency.

Subsequently, the computer mutually correlates the leaf structures in the $2^N$-branch nodeless Huffman tree with the fundamental word structure, the specific character code structure, and the character code component structure by reference to the character unit table depicted in FIG. 21. For example, as described above, the leaf structures store pointers to the specific characters, the character code components, and the fundamental words corresponding to the compression codes stored in the corresponding leaves.

The computer stores a pointer to a leaf that stores a corresponding compression code for each fundamental word of the fundamental word structure. The computer stores a pointer to a leaf that stores a corresponding compression code for each specific character of the specific character code structure. The computer stores a pointer to a leaf that stores a corresponding compression code for each character code component of the character code component structure.

Figure 48:
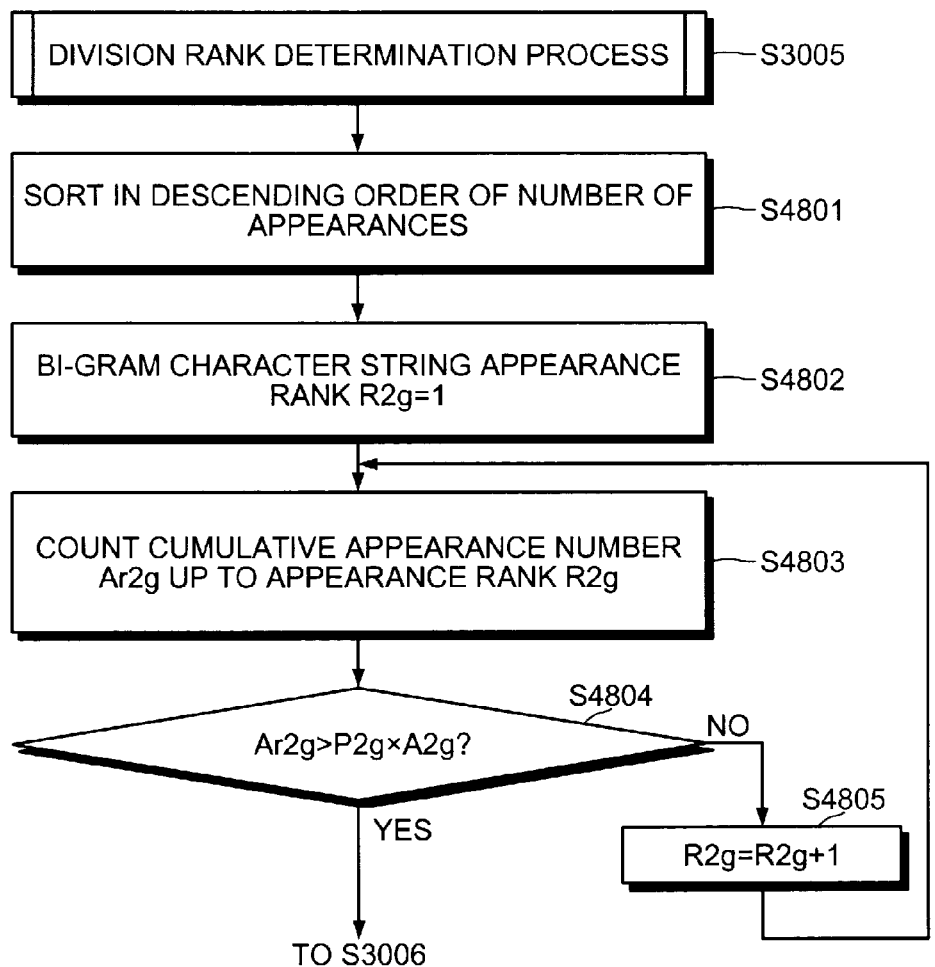
FIG. 48 is a flowchart of a detailed process procedure example of a division rank determination process (step S3005) depicted in FIG. 30.

FIG. 48 is a flowchart of a detailed process procedure example of the division rank determination process (step S3005) depicted in FIG. 30. First, the computer sorts the bi-gram character string appearance frequency count table 4300 in descending order of the number of appearances (step S4801). The computer then sets an appearance rank R2g of bi-gram character strings to R2g=1 (step S4802). The computer refers to the bi-gram character string appearance frequency count table 4300 to count the cumulative appearance number Ar2g up to the appearance rank R2g (step S4803).

The computer determines whether expression (3) is satisfied (step S4804).

$$Ar2g > P2g \times A2g \qquad (3)$$

where P2g is the target appearance rate of the bi-gram character strings and A2g is the total number of appearances of the counted bi-gram character strings.

If expression (3) is not satisfied (step S4804: NO), the computer increments the appearance rank R2g (step S4805) and returns to step S4803. Therefore, the appearance rank R2g is continuously lowered until expression (3) is satisfied.

When expression (3) is satisfied (step S4804: YES), the computer transitions to the map generation process (step S3006) depicted in FIG. 30. When the expression (3) is satisfied, the appearance rank R2g is the division rank. As a result, the bi-gram character strings after the division rank R2g are divided.

Figure 49:
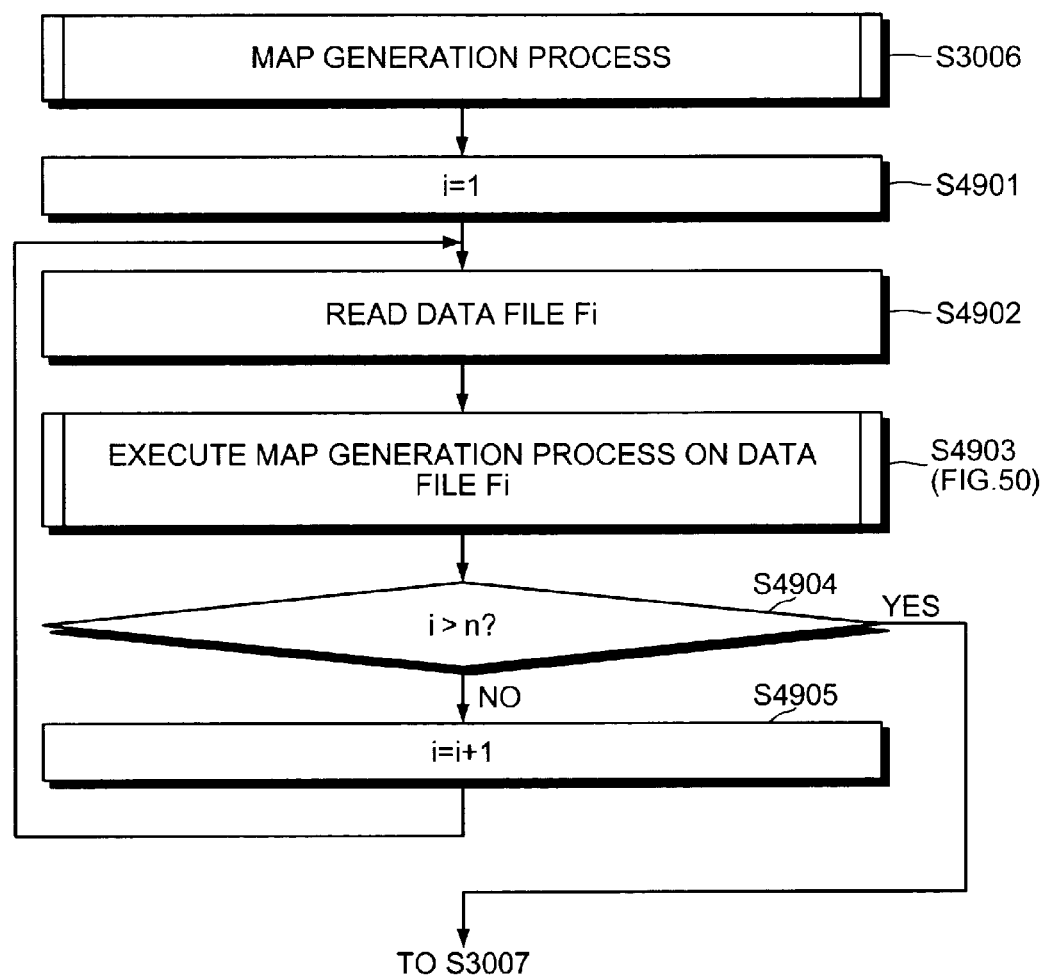
FIG. 49 is a flowchart of a detailed process procedure example of a map generation process (step S3006) depicted in FIG. 30.

FIG. 49 is a flowchart of a detailed process procedure example of the map generation process (step S3006) depicted in FIG. 30. First, the computer sets the file number i to i=1 (step S4901) and reads the data file Fi (step S4902). The computer executes the map generation process of the data file Fi (step S4903). Details of the map generation process of the data file Fi (step S4903) will be described with reference to FIG. 50. Subsequently, the computer determines whether the file number i satisfies i>n (where n is the total number of the data files F1 to Fn) (step S4904).

If i>n is not satisfied (step S4904: NO), the computer increments i (step S4905) and returns to step S4902. On the other hand, if i>n is satisfied (step S4904: YES), the map generation process (step S3006) is terminated. With this map generation process (step S3006), the map generation process of the data file Fi (step S4903) can be executed for each of the data files Fi.

Figure 50:
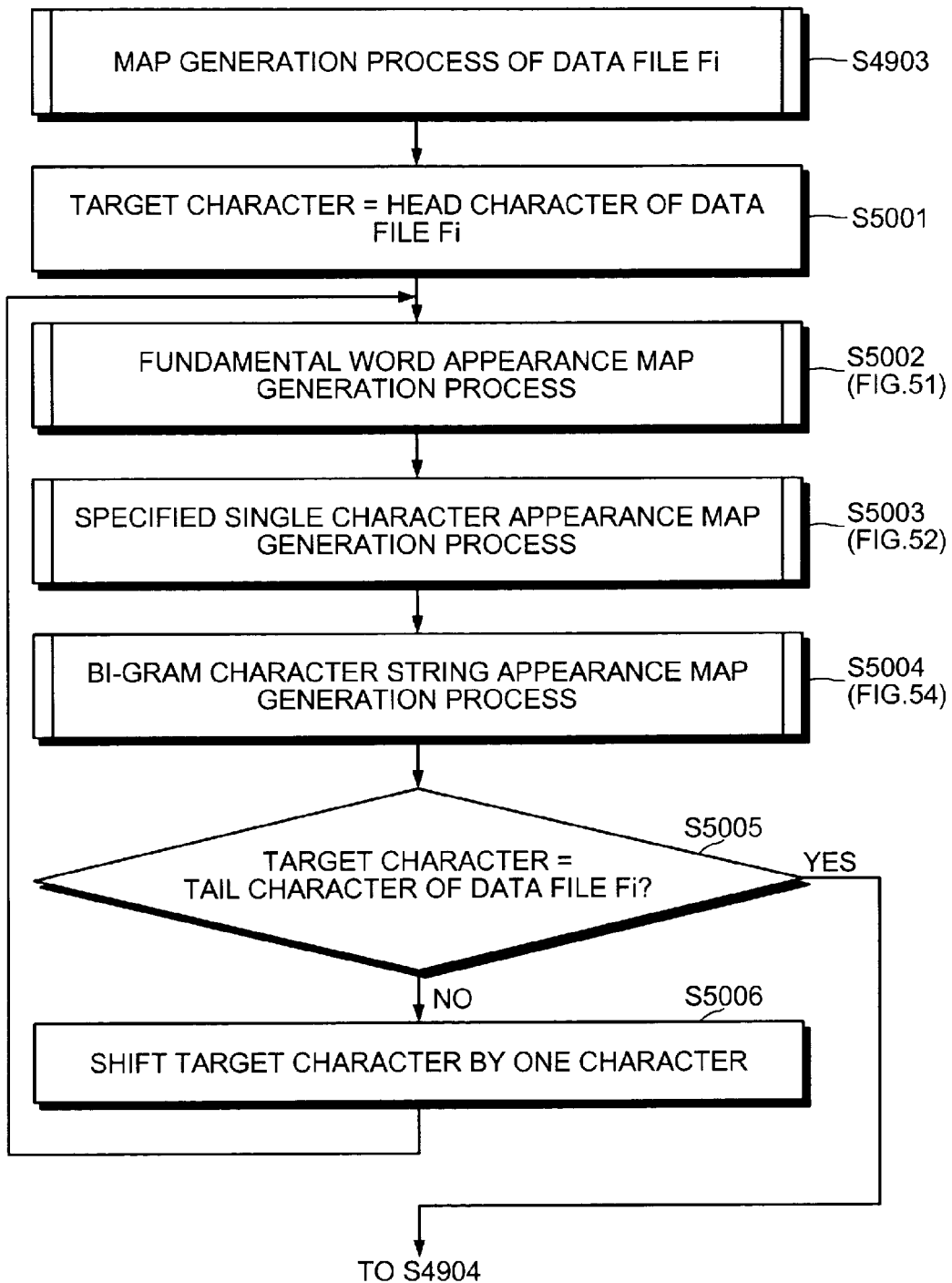
FIG. 50 is a flowchart of a detailed process procedure of a map generation process of the data file Fi (step S4903) depicted in FIG. 49.

FIG. 50 is a flowchart of a detailed process procedure of the map generation process of the data file Fi (step S4903) depicted in FIG. 49. First, the computer defines the head character of the data file Fi as the target character (step S5001) and executes a fundamental word appearance map generation process (step S5002), a specified single character appearance map generation process (step S5003), and a bi-gram character string appearance map generation process (step S5004).

Details of the fundamental word appearance map generation process (step S5002) will be described with reference to FIG. 51. Details of the specified single character appearance map generation process (step S5003) will be described with reference to FIG. 52. Details of the bi-gram character string appearance map generation process (step S5004) will be described with reference to FIG. 54.

Subsequently, the computer determines whether the target character is the tail character of the data file Fi (step S5005). If the target character is not the tail character of the data file Fi (step S5005: NO), the computer shifts the target character by one character toward the end (step S5006) and returns to step S5002. On the other hand, if the target character is the tail character of the data file Fi (step S5005: YES), the computer goes to step S4904 and terminates the map generation process of the data file Fi (step S4903).

With this map generation process of the data file Fi (step S4903), the fundamental word appearance map, the specified single character appearance map, and the bi-gram character string appearance map can simultaneously be generated in parallel while shifting the target character one-by-one.

Figure 51:
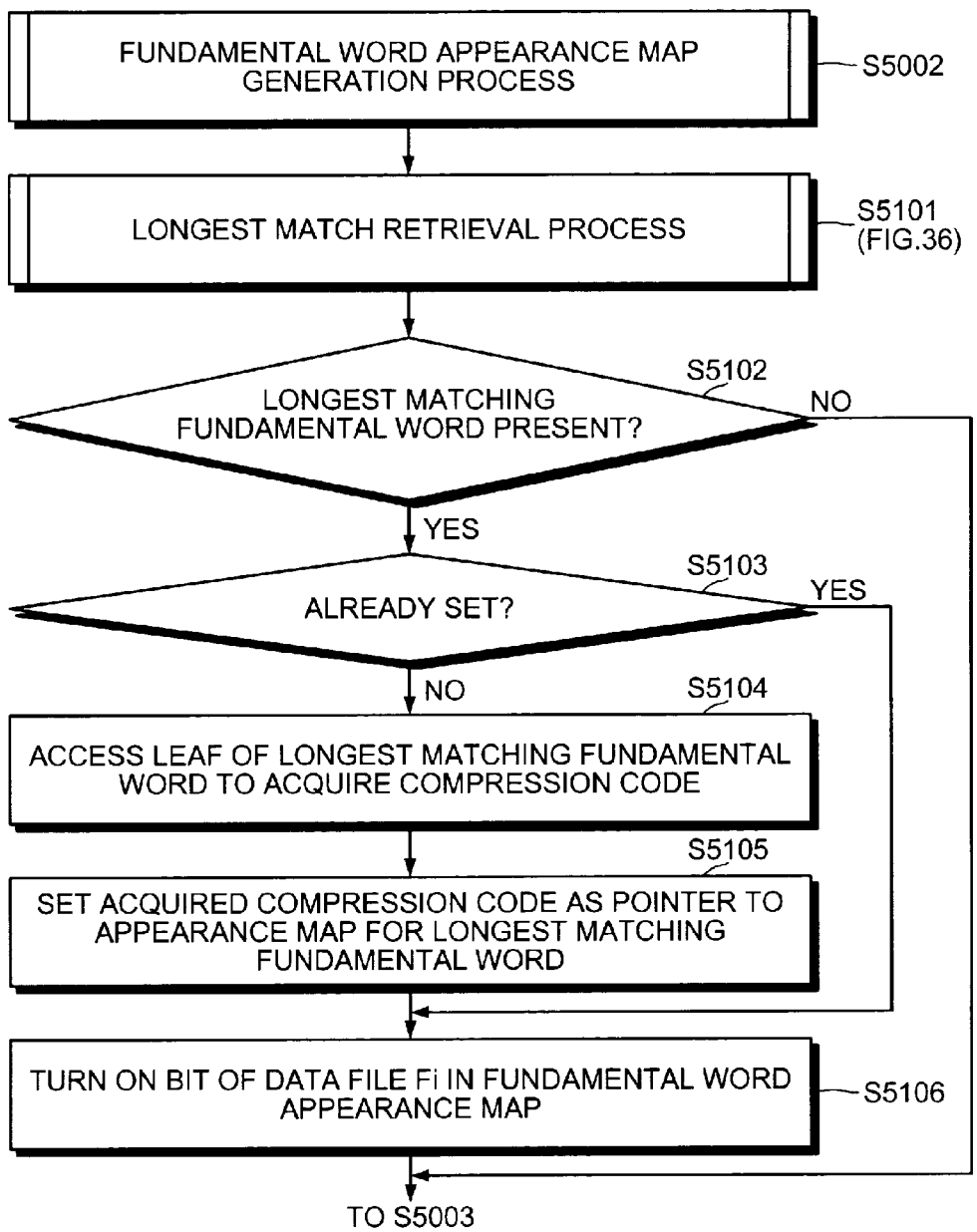
FIG. 51 is a flowchart of a detailed process procedure example of a fundamental word appearance map generation process (step S5002) depicted in FIG. 50.

FIG. 51 is a flowchart of a detailed process procedure example of the fundamental word appearance map generation process (step S5002) depicted in FIG. 50. First, the computer executes a longest match retrieval process (step S5101). A detailed process procedure of the longest match retrieval process (step S5101) has the same process contents as the longest match retrieval process (step S3401) depicted in FIG. 36 and will not be described.

The computer determines whether a longest matching fundamental word, i.e., a fundamental word, is present (step S5102). If no longest matching fundamental word is present (step S5102: NO), the computer goes to the specified single character appearance map generation process (step S5003). On the other hand, if a longest matching fundamental word is present (step S5102: YES), the computer determines whether the fundamental word appearance map is already set in terms of the longest matching fundamental word (step S5103).

If already set (step S5103: YES), the computer goes to step S5106. On the other hand, if not already set (step S5103: NO), the computer accesses the leaf of the longest matching fundamental word in the $2^N$-branch nodeless Huffman tree to acquire the compression code thereof (step S5104). The computer sets the acquired compression code as a pointer to the fundamental word appearance map for the longest matching fundamental word (step S5105) and goes to step S5106. At step S5106, the computer turns on the bit of the data file Fi in the fundamental word appearance map for the longest matching fundamental word (step S5106).

The computer then terminates the fundamental word appearance map generation process (step S5002) and goes to the specified single character appearance map generation process (step S5003). With this fundamental word appearance map generation process (step S5002), the map generation can be performed with the longest matching fundamental word defined as a fundamental word for each target character.

Figure 52:
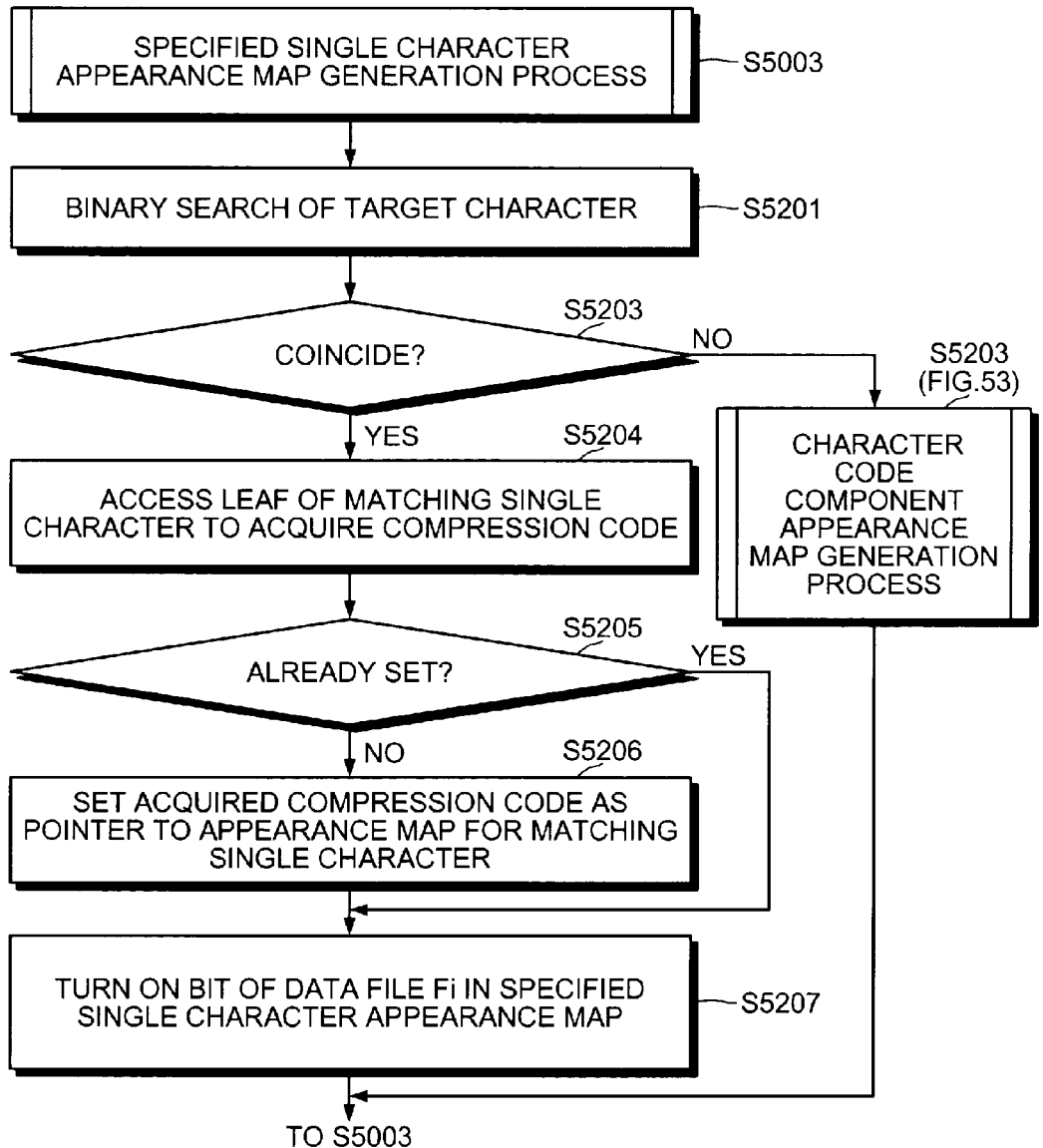
FIG. 52 is a flowchart of a detailed process procedure example of a specified single character appearance map generation process (step S5003) depicted in FIG. 50.

FIG. 52 is a flowchart of a detailed process procedure example of the specified single character appearance map generation process (step S5003) depicted in FIG. 50. First, the computer performs binary search of the specified single character structure for the target character (step S5201) and determines whether a coinciding character is found (S5202). If no coinciding single character is present (step S5202: NO), the computer executes a character code component appearance map generation process (step S5203) and goes to the bi-gram character string appearance map generation process (step S5004). Details of the character code component appearance map generation process (step S5203) will be described with reference to FIG. 53.

On the other hand, at step S5202, if a single character coinciding with the target character is present as a result of the binary search (step S5202: YES), the computer accesses the leaf of the binary-searched single character in the $2^N$-branch nodeless Huffman tree to acquire the compression code thereof (step S5204). The computer determines whether the specified single character appearance map is already set in terms of the acquired compression code (step S5205). If already set (step S5205: YES), the computer goes to step S5207.

On the other hand, if not already set (step S5205: NO), the computer sets the acquired compression code as a pointer to the specified single character appearance map for the binary-searched single character (step S5206) and goes to step S5207. At step S5207, the computer turns on the bit of the data file Fi in the specified single character appearance map for the binary-searched single character (step S5207).

The computer then terminates the specified single character appearance map generation process (step S5003) and goes to the bi-gram character string appearance map generation process (step S5004). With this specified single character appearance map generation process (step S5003), the map generation can be performed with the binary-searched target character defined as a specified single character.

Figure 53:
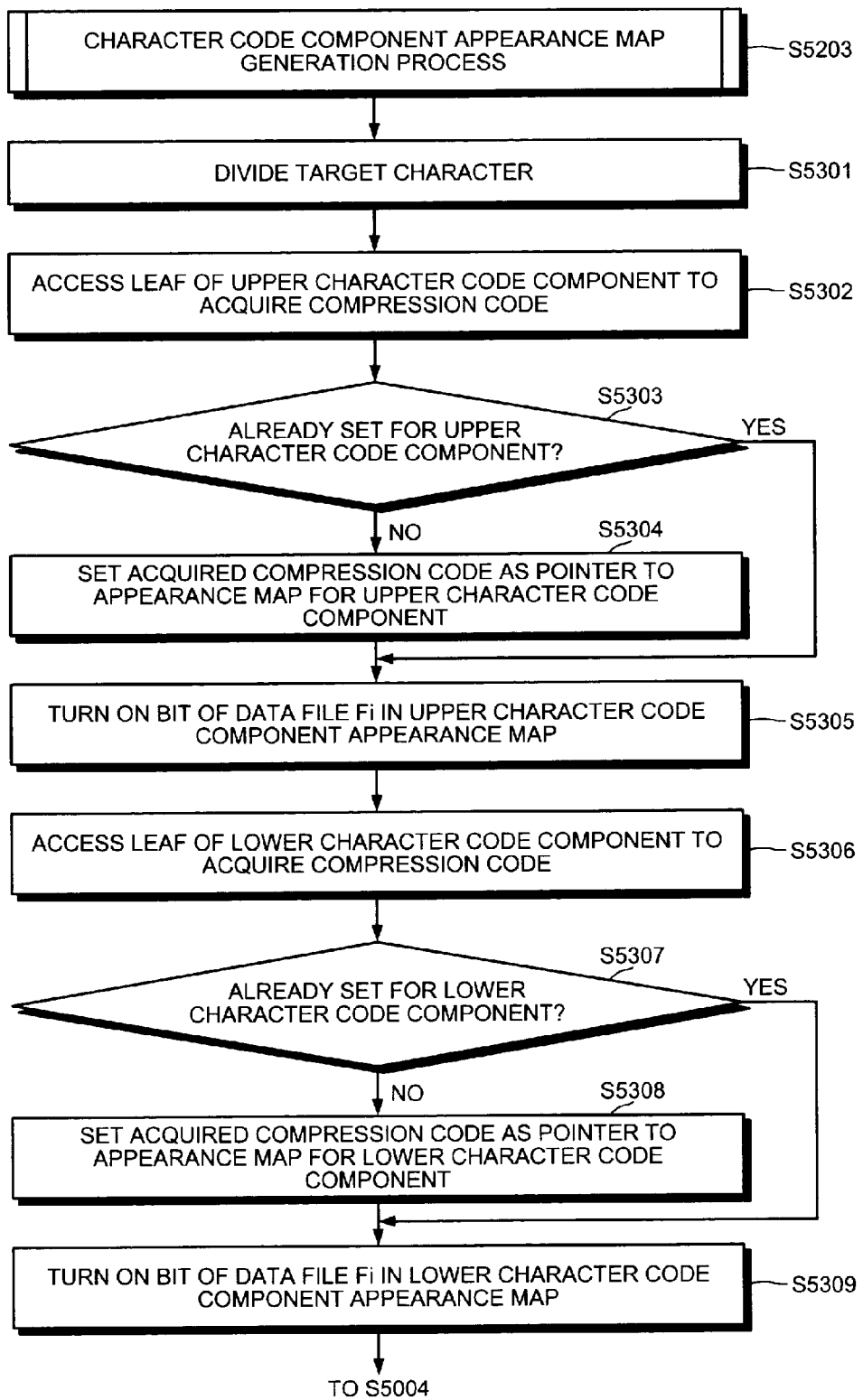
FIG. 53 is a flowchart of a detailed process procedure example of a character code component appearance map generation process (step S5203) depicted in FIG. 52.

FIG. 53 is a flowchart of a detailed process procedure example of the character code component appearance map generation process (step S5203) depicted in FIG. 52. First, the computer divides the target character (step S5301) and accesses the leaf of the upper character code component in the $2^N$-branch nodeless Huffman tree to acquire the compression code thereof (step S5302). The computer determines whether the appearance map of the upper character code component is already set in terms of the acquired compression code (step S5303).

If already set (step S5303: YES), the computer goes to step S5305. On the other hand, if not already set (step S5303: NO), the computer sets the acquired compression code as a pointer to the appearance map of the upper character code component (step S5304) and goes to step S5305. At step S5305, the computer turns on the bit of the data file Fi in the appearance map of the upper character code component divided from the target character (step S5305).

The computer accesses the leaf of the lower character code component in the $2^N$-branch nodeless Huffman tree to acquire the compression code thereof (step S5306). The computer determines whether the appearance map of the lower character code component is already set in terms of the acquired compression code (step S5307). If already set (step S5307: YES), the computer goes to step S5309.

On the other hand, if not already set (step S5307: NO), the computer sets the acquired compression code as a pointer to the appearance map of the lower character code component (step S5308) and goes to step S5309. At step S5309, the computer turns on the bit of the data file Fi in the appearance map of the lower character code component separated from the target character (step S5309).

The computer then terminates the character code component appearance map generation process (step S5203) and goes to the bi-gram character string appearance map generation process (step S5004). With regard to this character code component appearance map generation process (step S5203), for single characters ranked lower than the rank corresponding to the target appearance rate Pc, a multiplicity of OFF bits appears due to lower appearance frequency.

However, by excluding the single characters ranked lower than the rank corresponding to the target appearance rate Pc from the generation of the appearance map of the specified single characters, the map size of the compression code map of the specified single characters can be optimized. By dividing characters, the single characters ranked lower than the rank corresponding to the target appearance rate Pc are set in maps having fixed map sizes such as the compression code map of the upper character code components and the compression code map of the lower character code components. Therefore, the map sizes can be prevented from increasing and memory can be saved regardless of an appearance rate set as the target appearance rate Pc.

Figure 54:
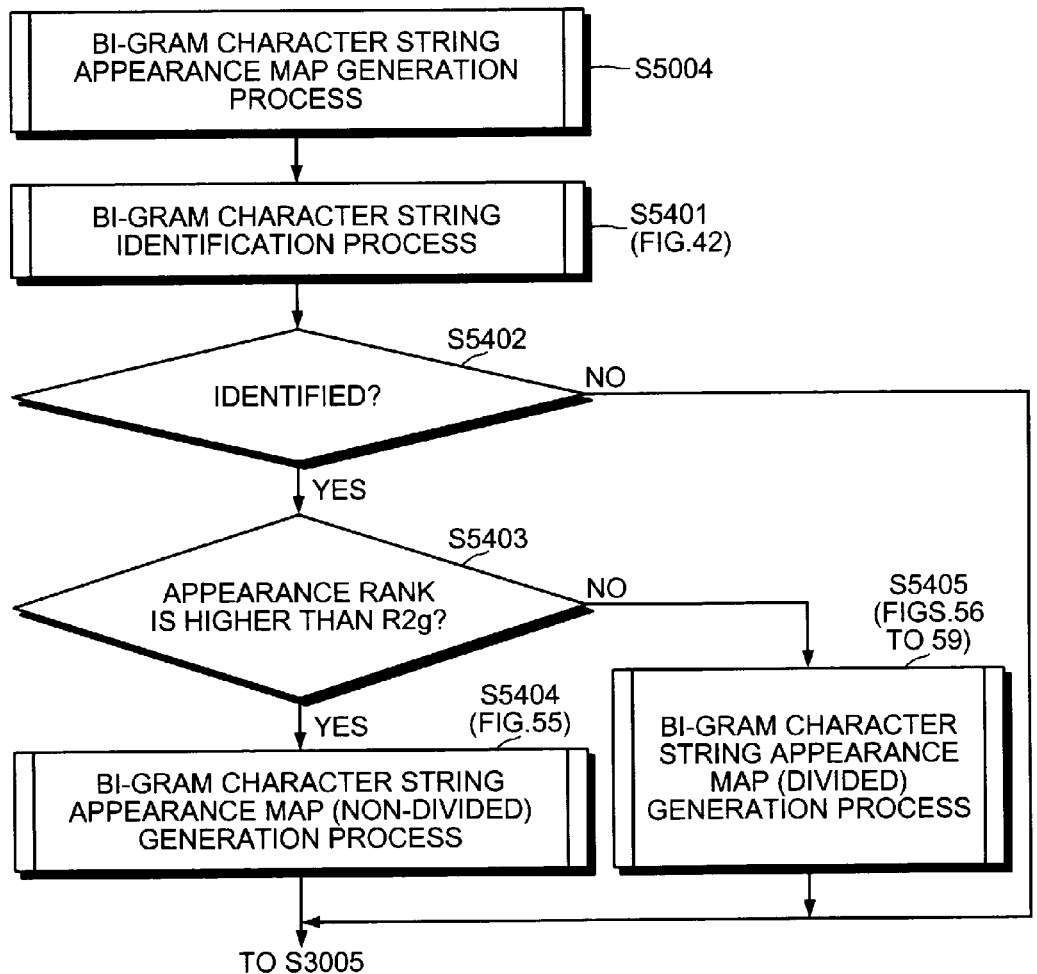
FIG. 54 is a flowchart of a detailed process procedure example of a bi-gram character string appearance map generation process (step S5004) depicted in FIG. 50.

FIG. 54 is a flowchart of a detailed process procedure example of the bi-gram character string appearance map generation process (step S5004) depicted in FIG. 50. As depicted in FIG. 54, first, the computer executes a bi-gram character string identification process (step S5401). A detailed process procedure of the bi-gram character string identification process (step S5401) has the same process contents as the bi-gram character string identification process (step S3906) depicted in FIG. 42 and will not be described.

The computer determines whether a bi-gram character string is identified by the bi-gram character string identification process (step S5401) (step S5402). If no bi-gram character string is identified (step S5402: NO), the computer goes to step S5005 of FIG. 50.

On the other hand, if a bi-gram character string is identified (step S5402: YES), the computer determines whether the appearance rank of the identified bi-gram character string is higher than the division rank R2g determined by the division rank determination process (step S3005), by reference to the sorted bi-gram character string appearance frequency count table 4300 (step S5403).

If the appearance rank is higher than the division rank R2g (step S5403: YES), the computer executes a bi-gram character string appearance map (non-divided) generation process (step S5404) and goes to step S5005. In the bi-gram character string appearance map (non-divided) generation process (step S5404), the division as depicted in FIGS. 1B and 1C is not performed.

On the other hand, if the appearance rank is equal to or lower than the division rank R2g (step S5403: NO), the computer executes a bi-gram character string appearance map (divided) generation process (step S5405) and goes to step S5005. In the bi-gram character string appearance map (divided) generation process (step S5405), the division as depicted in FIGS. 1B and 1C is performed.

Figure 55:
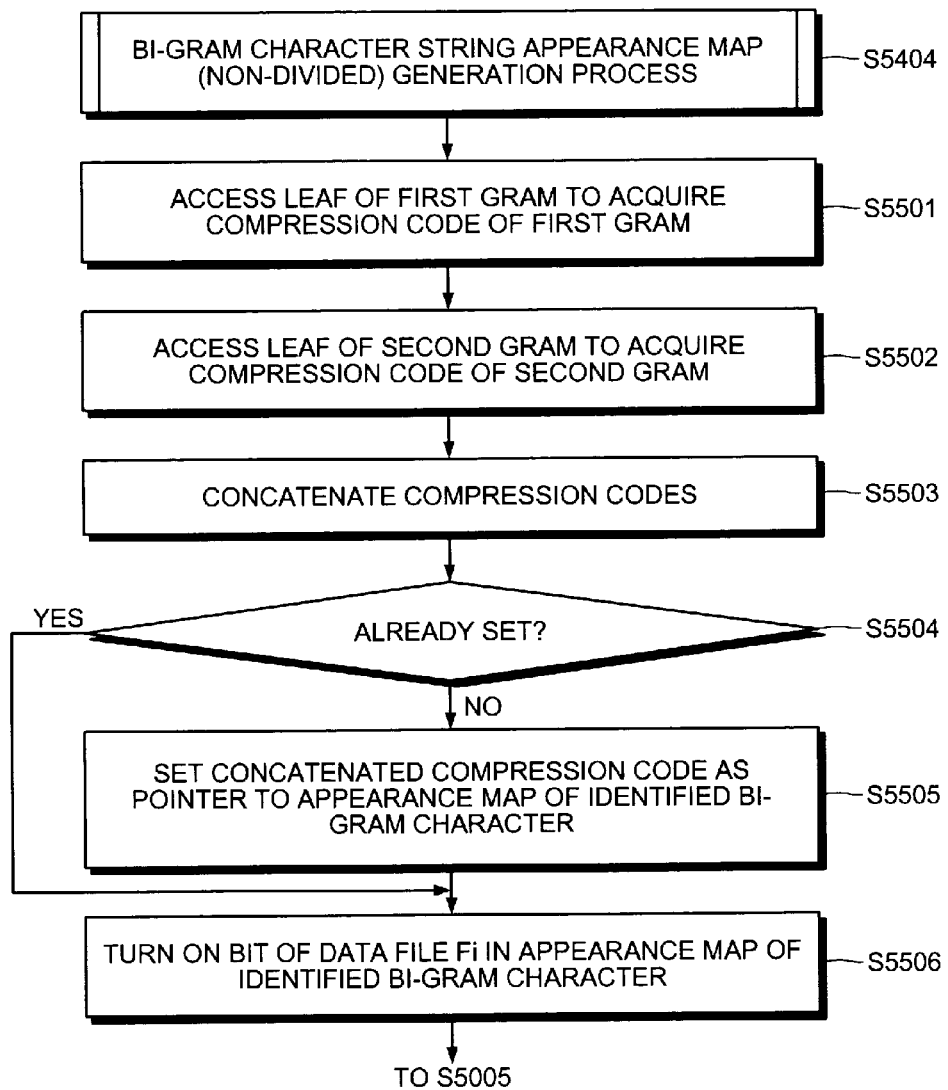
FIG. 55 is a flowchart of a detailed process procedure example of a bi-gram character string appearance map (non-divided) generation process (step S5404).

FIG. 55 is a flowchart of a detailed process procedure example of the bi-gram character string appearance map (non-divided) generation process (step S5404). As depicted in FIG. 55, first, the computer accesses a leaf of the $2^N$-branch nodeless Huffman tree for a first gram (specified single character or character code component) of the bi-gram character string identified by the bi-gram character string identification process (step S5401) depicted in FIG. 54 to acquire a compression code (step S5501). The computer also accesses a leaf of the 2N-branch nodeless Huffman tree for a second gram (specified single character or character code component) to acquire a compression code (step S5502).

The computer concatenates the compression code of the first gram and the compression code of the second gram (step S5503). The computer determines whether an appearance map having the concatenated compression code as a pointer is already set (step S5504). If already set (step S5504: YES), the computer goes to step S5506.

On the other hand, if not already set (step S5504: NO), the computer sets the concatenated compression code as the pointer to the appearance map of the identified bi-gram character string (step S5505). At step S5506, the computer turns on the bit of the data file Fi in the appearance map for the identified bi-gram character string (step S5506).

The computer then terminates the bi-gram character string appearance map (non-divided) generation process (step S5404) and proceeds to step S5005. With the bi-gram character string appearance map (non-divided) generation process (step S5404), for bi-gram character strings ranked higher than the rank corresponding to the target appearance rate Pc, the appearance map is generated without dividing the characters. Therefore, no retrieval noise is superimposed on the appearance map of divided bi-grams.

A detailed process procedure example of the bi-gram character string appearance map (divided) generation process (step S5405) depicted in FIG. 54 will be described. Three types of the bi-gram character string appearance map (divided) generation processes (step S5405) exist depending on the dividing method. The type to be executed is determined by default.

Figure 56:
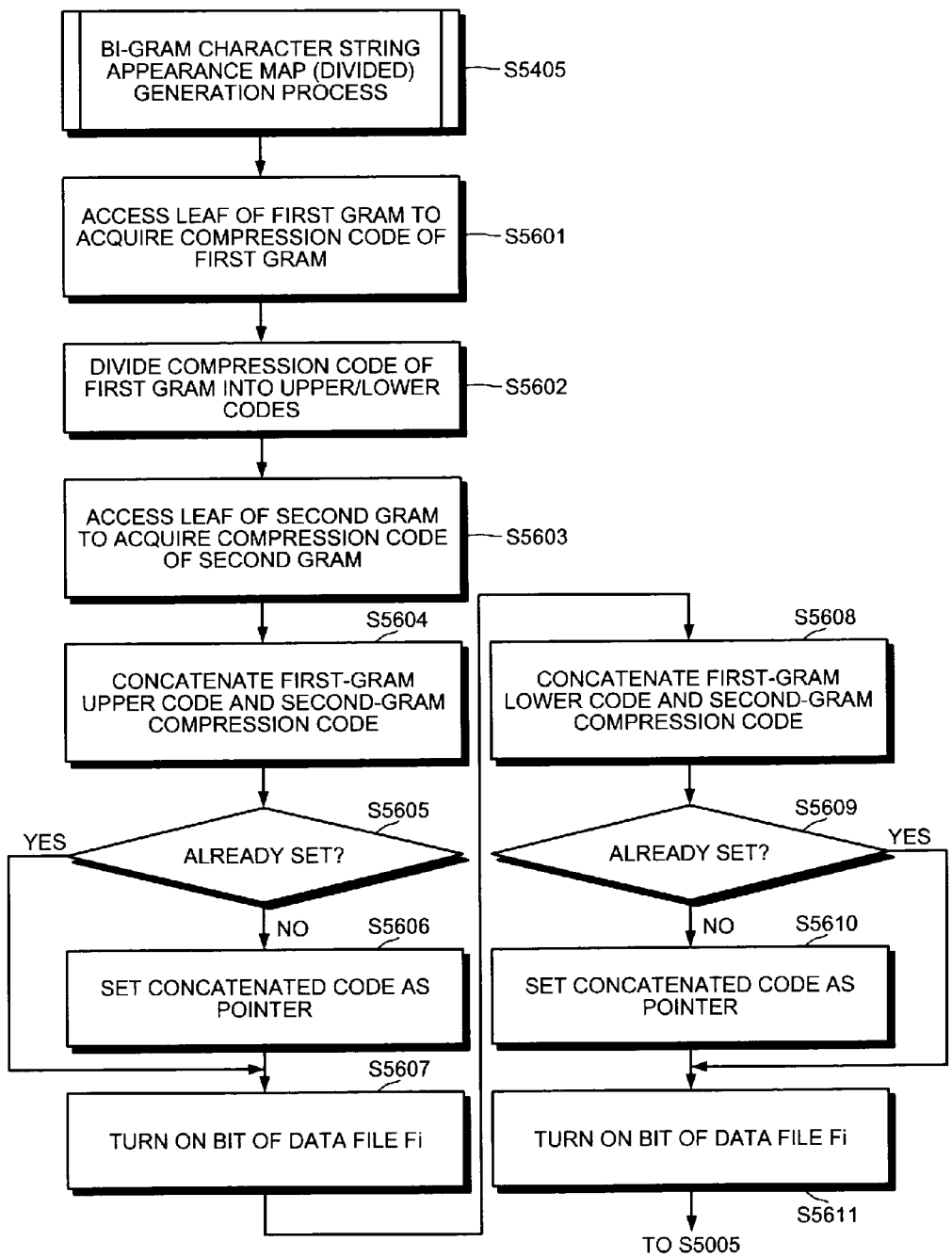
FIG. 56 is a flowchart of a detailed process procedure example (part 1) of a bi-gram character string appearance map (divided) generation process (step S5405) depicted in FIG. 54.

FIG. 56 is a flowchart of a detailed process procedure example (part 1) of the bi-gram character string appearance map (divided) generation process (step S5405) depicted in FIG. 54. FIG. 56 depicts an example of dividing the first gram (specified single character or character code component) and not dividing the second gram (specified single character or character code component) of a bi-gram character string after the division rank R2g.

As depicted in FIG. 56, first, the computer accesses a leaf of the $2^N$-branch nodeless Huffman tree for the first gram (specified single character or character code component) of the bi-gram character string identified by the bi-gram character string identification process (step S5401) depicted in FIG. 54 to acquire a compression code (step S5601). The computer divides the acquired compression code of the first gram into an upper code and a lower code (step S5602).

The computer accesses a leaf of the $2^N$-branch nodeless Huffman tree for the second gram (specified single character or character code component) to acquire a compression code (step S5603). The computer concatenates the upper code (first-gram upper code) of the compression code of the first gram and the compression code of the second gram (step S5604).

The computer determines whether an appearance map having the concatenated code of step S5604 as a pointer is already set (step S5605). If already set (step S5605: YES), the computer goes to step S5607.

On the other hand, if not already set (step S5605: NO), the computer sets the concatenated code as the pointer (step S5606). At step S5507, the computer turns on the bit of the data file Fi in the appearance map for the concatenated code (step S5607).

Similarly, for the lower code resulting at step S5602, the computer concatenates the lower code (first-gram lower code) of the compression code of the first gram and the compression code of the second gram (step S5608).

The computer determines whether an appearance map having the concatenated code of step S5608 as a pointer is already set (step S5609). If already set (step S5609: YES), the computer goes to step S5611.

On the other hand, if not already set (step S5609: NO), the computer sets the concatenated code as the pointer (step S5610). At step S5611, the computer turns on the bit of the data file Fi in the appearance map for the concatenated code (step S5611).

The computer then terminates the bi-gram character string appearance map (divided) generation process (step S5405) and proceeds to step S5005. With the bi-gram character string appearance map (divided) generation process (step S5405), since the compression code map of bi-gram character strings after the rank corresponding to the target appearance rate Pc is divided into two parts, no retrieval noise is superimposed and the reduction of memory size can be achieved.

Figure 57:
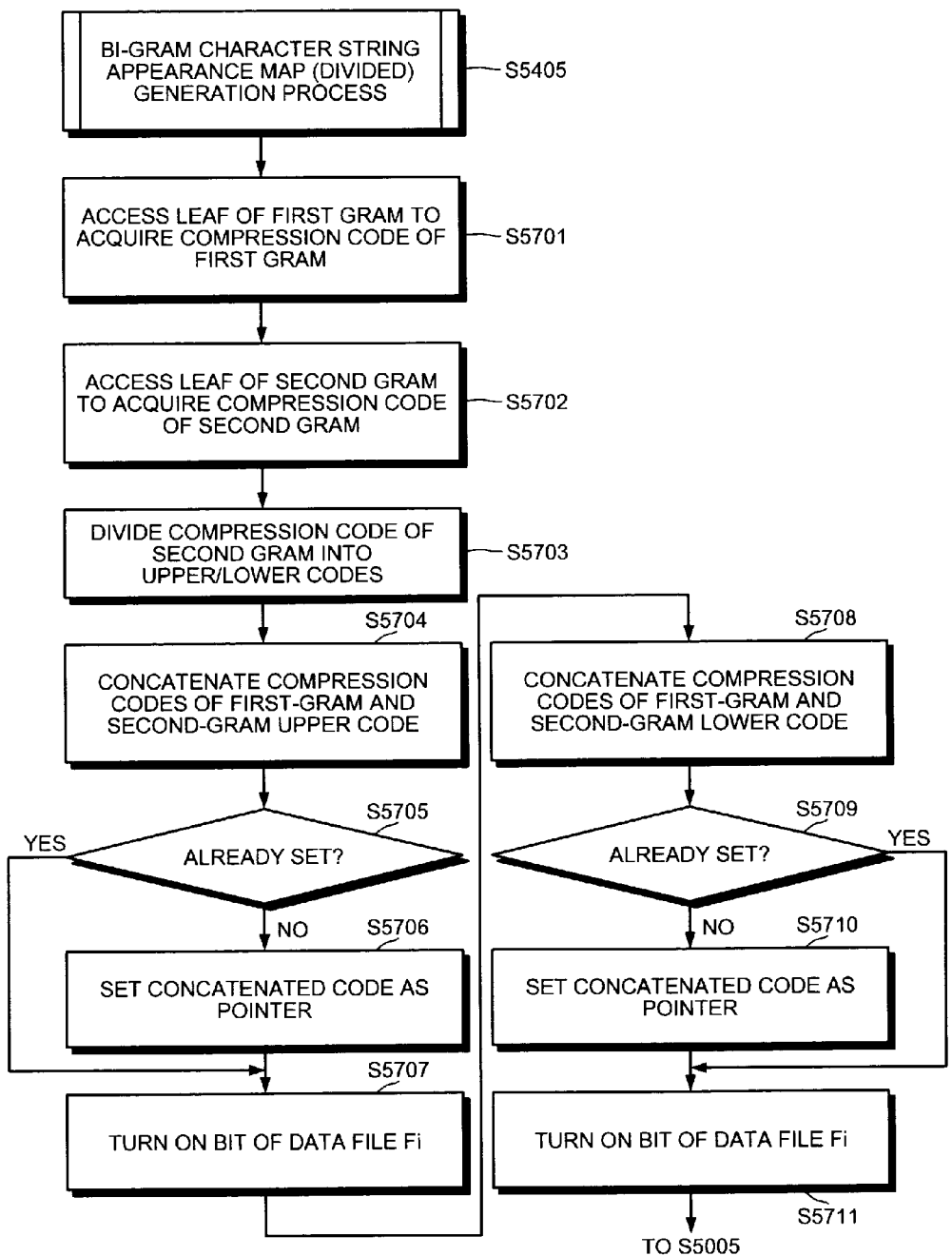
FIG. 57 is a flowchart of a detailed process procedure example (part 2) of the bi-gram character string appearance map (divided) generation process (step S5405) depicted in FIG. 54.

FIG. 57 is a flowchart of a detailed process procedure example (part 2) of the bi-gram character string appearance map (divided) generation process (step S5405) depicted in FIG. 54. FIG. 57 depicts an example of dividing the second gram (specified single character or character code component) and not dividing the first gram (specified single character or character code component) of a bi-gram character string after the division rank R2g.

As depicted in FIG. 57, first, the computer accesses a leaf of the $2^N$-branch nodeless Huffman tree for the first gram (specified single character or character code component) of the bi-gram character string identified by the bi-gram character string identification process (step S5401) depicted in FIG. 54 to acquire a compression code (step S5701).

The computer also accesses a leaf of the $2^N$-branch nodeless Huffman tree for the second gram (specified single character or character code component) to acquire a compression code (step S5702). The computer divides the acquired compression code of the second gram into an upper code and a lower code (step S5703). The computer concatenates the compression code of the first gram and the upper code (second-gram upper code) of the compression code of the second gram (step S5704).

The computer determines whether an appearance map having the concatenated code of step S5704 as a pointer is already set (step S5705). If already set (step S5705: YES), the computer goes to step S5707.

On the other hand, if not already set (step S5705: NO), the computer sets the concatenated code as the pointer (step S5706). At step S5707, the computer turns on the bit of the data file Fi in the appearance map for the concatenated code (step S5707).

Similarly, for the lower code resulting at step S5703, the computer concatenates the compression code of the first gram and the lower code (second-gram lower code) of the compression code of the second gram (step S5708).

The computer determines whether an appearance map having the concatenated code of step S5708 as a pointer is already set (step S5709). If already set (step S5709: YES), the computer goes to step S5711.

On the other hand, if not already set (step S5709: NO), the computer sets the concatenated code as the pointer (step S5710). At step S5711, the computer turns on the bit of the data file Fi in the appearance map for the concatenated code (step S5711).

The computer then terminates the bi-gram character string appearance map (divided) generation process (step S5405) and proceeds to step S5005. With the bi-gram character string appearance map (divided) generation process (step S5405), since the compression code map of bi-gram character strings after the rank corresponding to the target appearance rate Pc is divided into two parts, no retrieval noise is superimposed and the reduction of memory size can be achieved.

Figure 58:
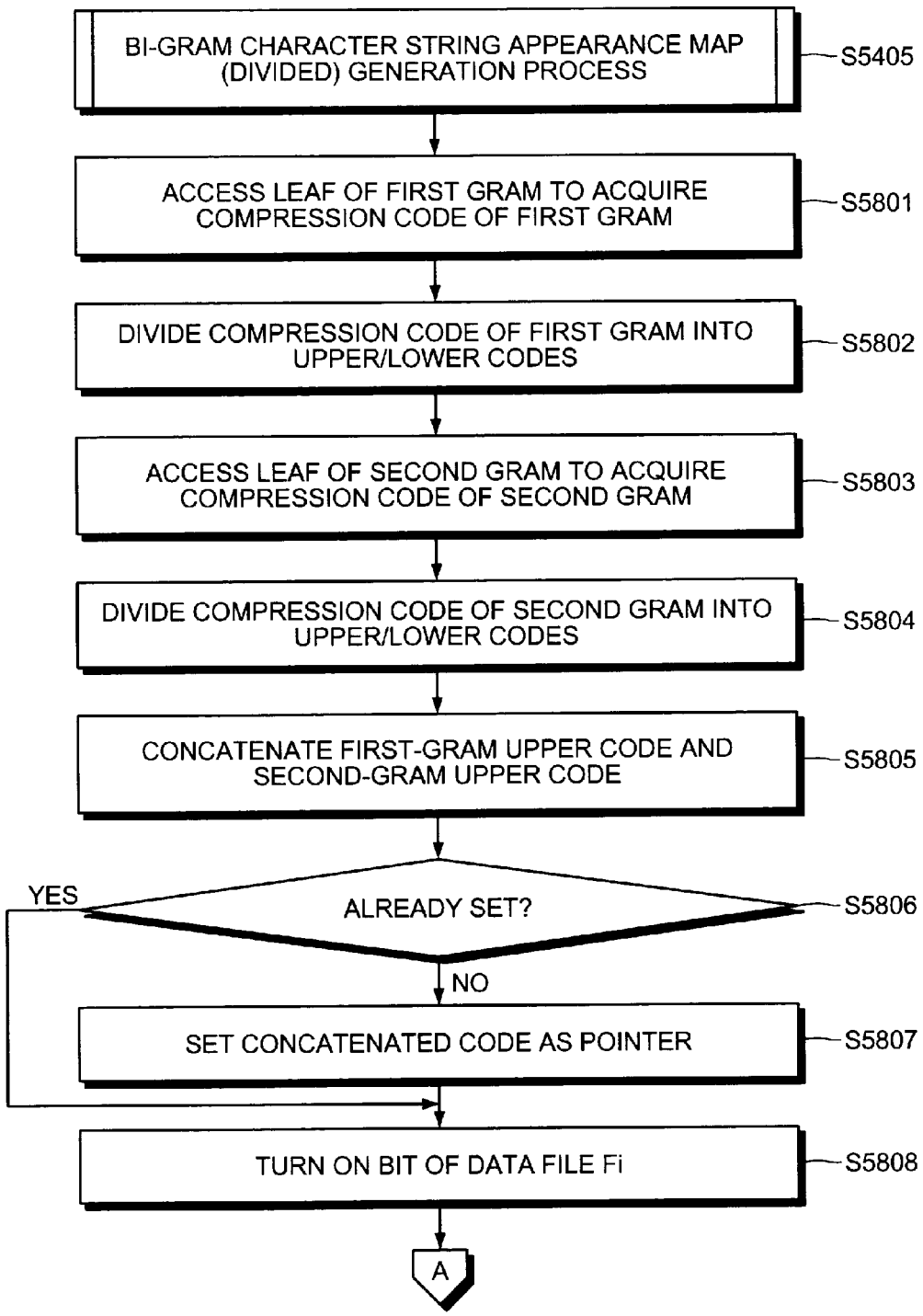
FIG. 58 is a flowchart (part 1) of a detailed process procedure example (part 3) of the bi-gram character string appearance map (divided) generation process (step S5405) depicted in FIG. 54.
Figure 59:
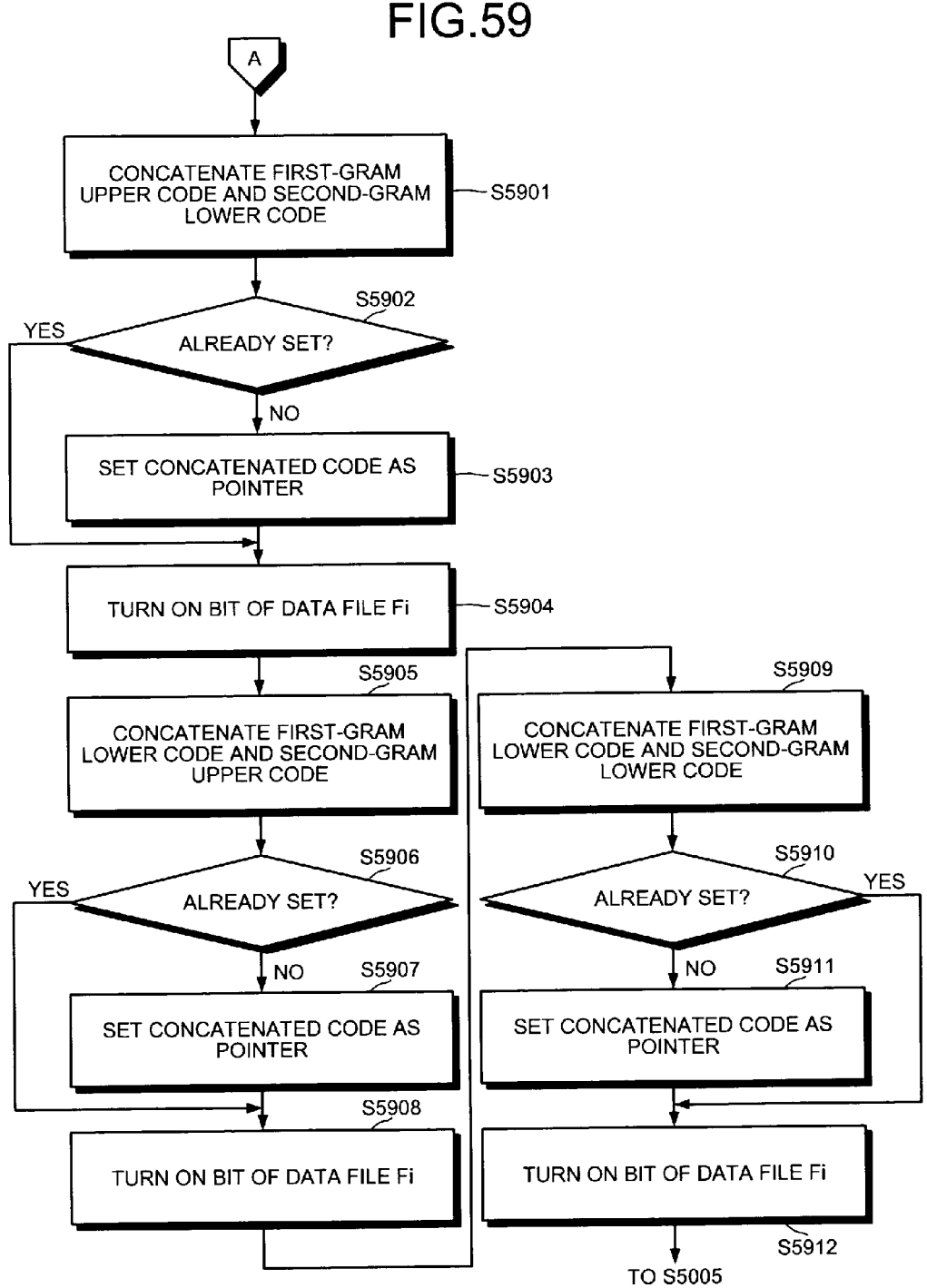
FIG. 59 is a flowchart (part 2) of a detailed process procedure example (part 3) of the bi-gram character string appearance map (divided) generation process (step S5405) depicted in FIG. 54.

FIGS. 58 and 59 are flowcharts of a detailed process procedure example (part 3) of the bi-gram character string appearance map (divided) generation process (step S5405) depicted in FIG. 54. FIGS. 57 and 59 depict an example of dividing the first gram (specified single character or character code component) and the second gram (specified single character or character code component) of a bi-gram character string after the division rank R2g.

As depicted in FIG. 58, first, the computer accesses a leaf of the $2^N$-branch nodeless Huffman tree for the first gram (specified single character or character code component) of the bi-gram character string identified by the bi-gram character string identification process (step S5401) depicted in FIG. 54 to acquire a compression code (step S5801). The computer divides the acquired compression code of the first gram into an upper code and a lower code (step S5802).

The computer accesses a leaf of the $2^N$-branch nodeless Huffman tree for the second gram (specified single character or character code component) to acquire a compression code (step S5803). The computer divides the acquired compression code of the second gram into an upper code and a lower code (step S5804).

The computer then concatenates the upper code (first-gram upper code) of the compression code of the first gram and the upper code (second-gram upper code) of the compression code of the second gram (step S5805).

The computer determines whether an appearance map having the concatenated code of step S5805 as a pointer is already set (step S5806). If already set (step S5806: YES), the computer goes to step S5808.

On the other hand, if not already set (step S5806: NO), the computer sets the concatenated code as the pointer (step S5807). At step S5808, the computer turns on the bit of the data file Fi in the appearance map for the concatenated code (step S5808). The computer goes to step S5901 of FIG. 59.

In FIG. 59, similarly, the computer concatenates the first-gram upper code and the lower code (second-gram lower code) of the compression code of the second gram (step S5901). The computer determines whether an appearance map having the concatenated code of step S5901 as a pointer is already set (step S5902). If already set (step S5902: YES), the computer goes to step S5904.

On the other hand, if not already set (step S5902: NO), the computer sets the concatenated code as the pointer (step S5903). At step S5904, the computer turns on the bit of the data file Fi in the appearance map for the concatenated code (step S5904).

Similarly, the computer concatenates the lower code (first-gram lower code) of the compression code of the first gram and the second-gram upper code (step S5905). The computer determines whether an appearance map having the concatenated code of step S5905 as a pointer is already set (step S5906). If already set (step S5906: YES), the computer goes to step S5908.

On the other hand, if not already set (step S5906: NO), the computer sets the concatenated code as the pointer (step S5907). At step S5908, the computer turns on the bit of the data file Fi in the appearance map for the concatenated code (step S5908).

Similarly, the computer concatenates the first-gram lower code and the second-gram lower code (step S5909). The computer determines whether an appearance map having the concatenated code of step S5909 as a pointer is already set (step S5910). If already set (step S5910: YES), the computer goes to step S5912.

On the other hand, if not already set (step S5910: NO), the computer sets the concatenated code as the pointer (step S5911). At step S5912, the computer turns on the bit of the data file Fi in the appearance map for the concatenated code (step S5912).

The computer then terminates the bi-gram character string appearance map (divided) generation process (step S5405) and proceeds to step S5005. With the bi-gram character string appearance map (divided) generation process (step S5405), since the compression code map of bi-gram character strings after the rank corresponding to the target appearance rate Pc is divided into four parts, no retrieval noise is superimposed and the reduction of memory size can be achieved.

A specific example of the compression process of the data file Fi will be described. As described above, if a compression code map is generated, an appearance map within the compression code map can be pointed to by a compression code string that is a compressed retrieval character string. A specific example of the compression process will hereinafter be described.

Figure 60:
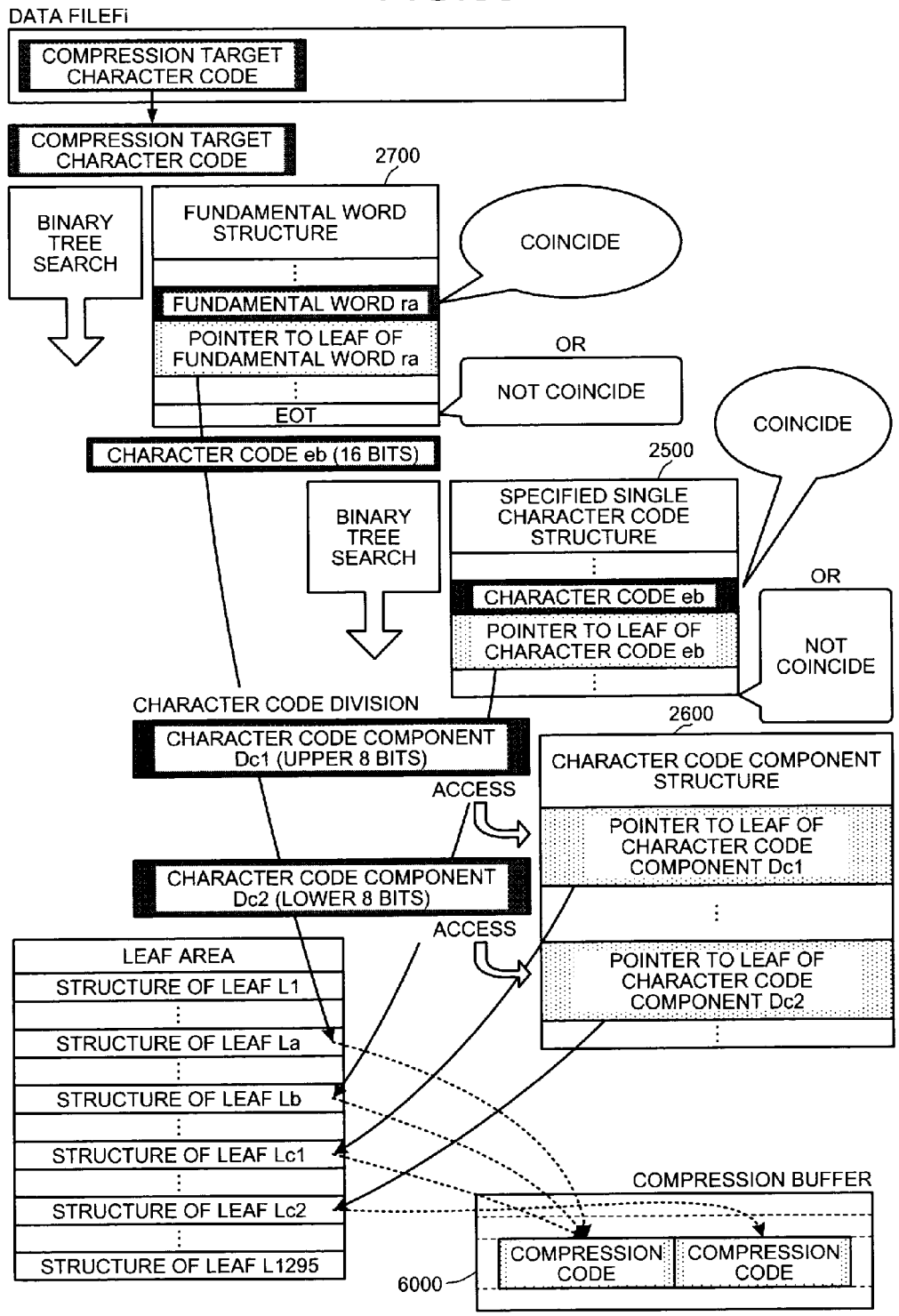
FIG. 60 is an explanatory diagram of a specific example of a compression process using a $2^N$-branch nodeless Huffman tree.

FIG. 60 is an explanatory diagram of a specific example of the compression process using a $2^N$-branch nodeless Huffman tree. First, the computer acquires a compression target character code of a first character from the data file group Fs and retains a position on the data file Fi. The computer performs binary tree search of the fundamental word structure. Since a fundamental word is a character code string of two or more characters, if the compression target character code of the first character is hit, a character code of a second character is acquired as the compression target character code.

The character code of the second character is searched from the position where the compression target character code of the first character is hit. The binary tree search is performed for a third or later character until a compression target character code that does not coincide appears. If a coinciding fundamental word ra ("a" is a number of a leaf) is retrieved, a pointer to the leaf La correlated in the fundamental word structure is used to access a structure of the leaf La. The computer searches for the compression code of the fundamental word ra stored in the accessed structure of the leaf La and stores the compression code into a compression buffer 6000.

On the other hand, if a non-coinciding compression character code appears, the binary tree search of the fundamental word structure is terminated (proceeds to End Of Transmission (EOT)). The computer sets the compression target character code of the first character into a register again and performs the binary tree search of the specific single character structure.

If a coinciding character code eb ("b" is a number of a leaf) is retrieved, the computer uses a pointer to the leaf Lb to access a structure of the leaf Lb. The computer searches for the compression code of the character code eb stored in the accessed structure of the leaf Lb and stores the compression code into the compression buffer 6000.

On the other hand, if no coinciding character code appears and the binary tree search is terminated, the compression target character code is not a specified single character code and therefore, the computer divides the compression target character code into upper eight bits and lower eight bits. For the character code component of the upper eight bits, the computer performs binary tree search of the character code component structure. If a coinciding character code component Dc1 ("c1" is a number of a leaf) is retrieved, the computer uses a pointer to the leaf Lc1 to access a structure of the leaf Lc1. The computer searches for the compression code of the character code component Dc1 stored in the accessed structure of the leaf Lc1 and stores the compression code into the compression buffer 6000.

For the character code component of the lower eight bits, the computer continues the binary tree search of the character code component structure. If a coinciding character code component Dc2 ("c2" is a number of a leaf) is retrieved, the computer uses a pointer to the leaf Lc2 to access a structure of the leaf Lc2. The computer searches for the compression code of the character code component Dc2 stored in the accessed structure of the leaf Lc2 and stores the compression code into the compression buffer 6000. As a result, the data file Fi is compressed.

A process procedure of the compression process of the data file group Fs will be described.

Figure 61:
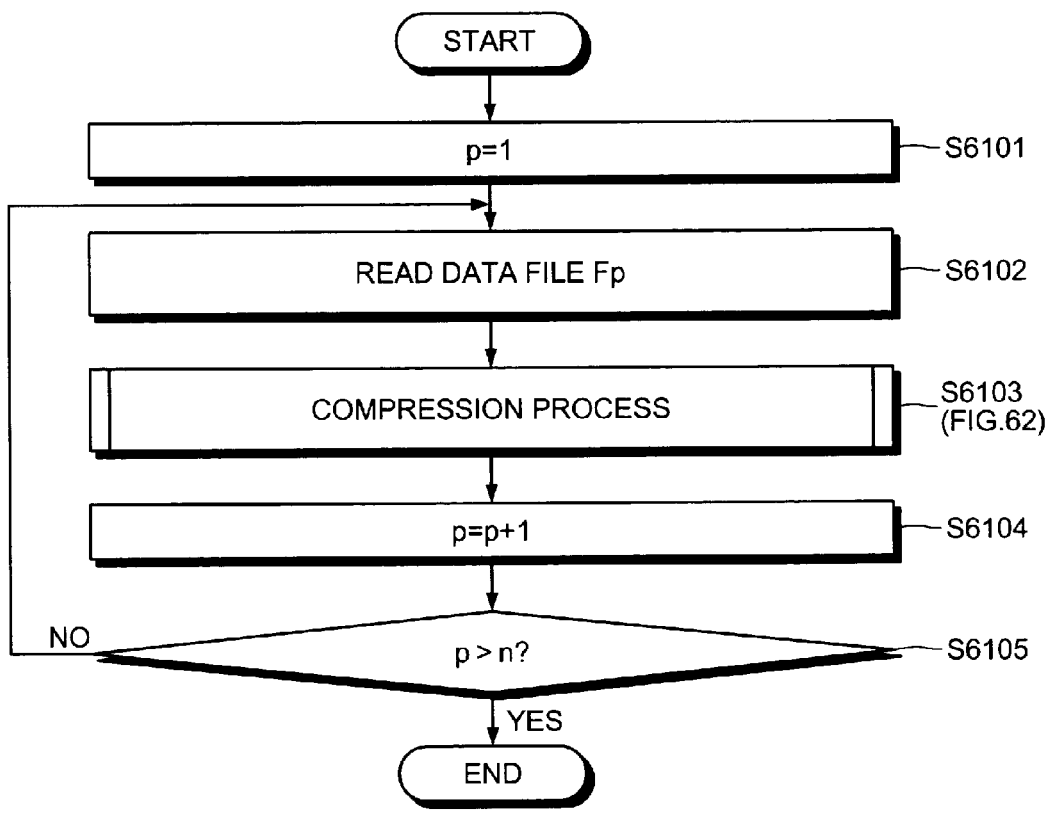
FIG. 61 is a flowchart of a compression process procedure example of a data file group Fs using the $2^N$-branch nodeless Huffman tree automatically executed by a computer.

FIG. 61 is a flowchart of the compression process procedure example of the data file group Fs using the $2^N$-branch nodeless Huffman tree automatically executed by the computer. The computer sets the file number: p to p=1 (step S6101) and reads a data file Fp (step S6102). The computer executes the compression process (step S6103) and increments the file number: p (step S6104). Details of the compression process (step S6103) will be described with reference to FIG. 62.

The computer determines whether p>n is satisfied (step S6105), where n is the total number of the data files Fs. If p>n is not satisfied (step S6105: NO), the computer returns to step S6102. On the other hand, if p>n is satisfied (step S6105: YES), the computer terminates the compression process of the data file group Fs.

Figure 62:
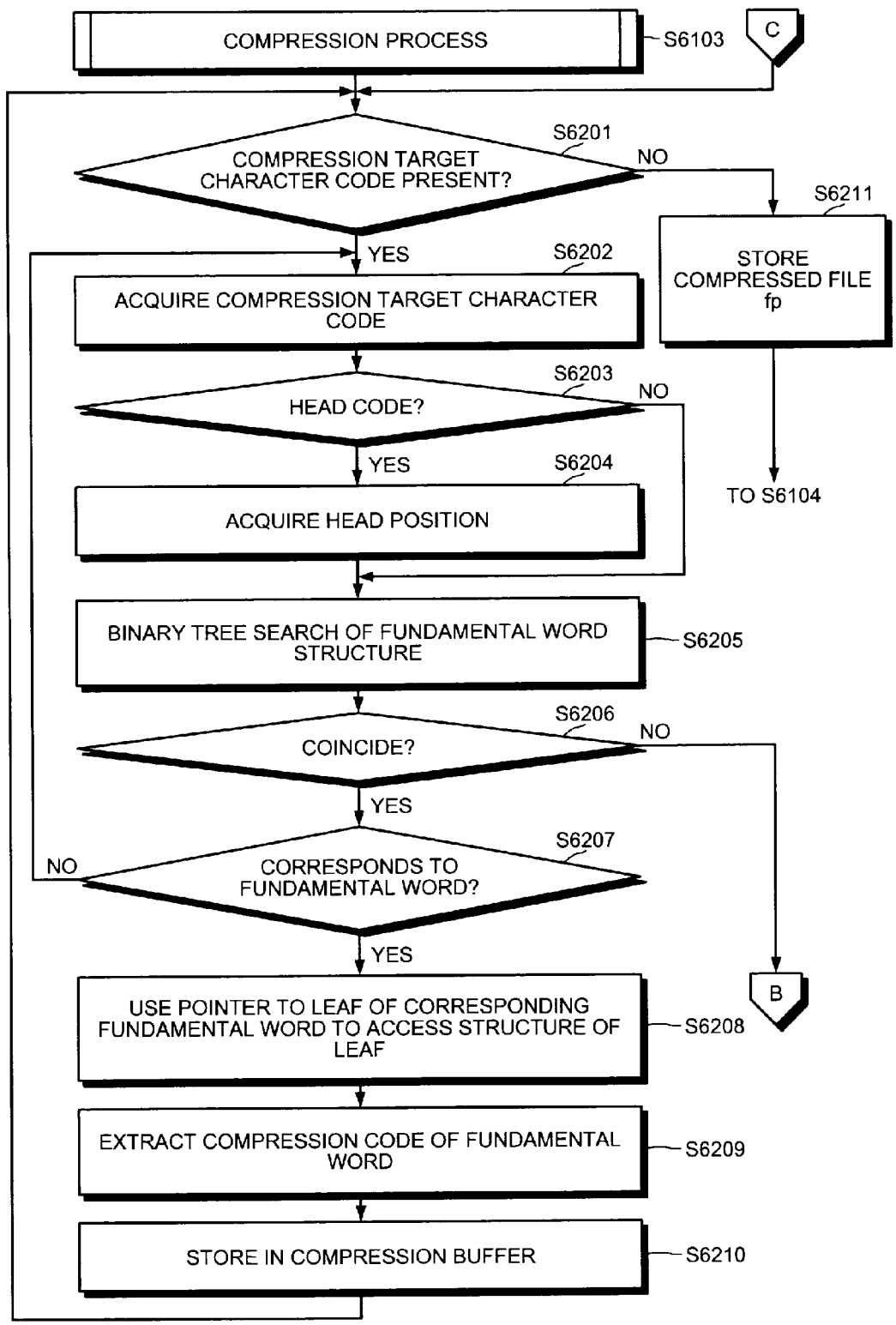
FIG. 62 is a flowchart (part 1) of a detailed process procedure of the compression process (step S6103) depicted in FIG. 61.

FIG. 62 is a flowchart (part 1) of a detailed process procedure of the compression process (step S6103) depicted in FIG. 61. As depicted in FIG. 62, first, the computer determines whether a compression target character code is present in the data file group Fs (step S6201). If present (step S6201: YES), the computer acquires and sets the compression target character code in a register (step S6202). The computer determines whether the compression target character code is the head compression target character code (step S6203).

The head compression target character code is uncompressed character code of the first character. If the compression target character code is the head compression target character code (step S6203: YES), the computer acquires a pointer of the position (head position) of the compression target character code on the data file group Fs (step S6204) and goes to step S6205. On the other hand, if the compression target character code is not the head compression target character code (step S6203: NO), the computer goes to step S6205 without acquiring the head position.

The computer performs the binary tree search of the fundamental word structure (step S6205). If code coinciding with the compression target character code is present (step S6206: YES), the computer determines whether successive coinciding character code strings correspond to (the character code string of) a fundamental word (step S6207). If not (step S6207: NO), the computer returns to step S6202 and acquires the subsequent character code as the compression target character code. In this case, since the subsequent character code is not the head code, the head position is not acquired.

On the other hand, at step S6207, if successive coinciding character code strings correspond to a fundamental word (step S6207: YES), the computer uses a pointer to the leaf L# of the corresponding fundamental word to access a structure of the leaf L# (step S6208). The computer extracts the compression code of the fundamental word stored in the structure of the leaf L# that is pointed to (step S6209).

Subsequently, the computer stores the extracted compression code into the compression buffer 6000 (step S6210) and returns to step S6201. This loop makes a flow of the compression process of fundamental words. At step S6201, if no compression target character code is present (step S6201: NO), the computer performs file output to store a compressed file fp obtained by compressing the data file Fp, from the compression buffer 6000 (step S6211). The computer goes to step S6104. On the other hand, if coinciding code is not present at step S6206 (step S6206: NO), the computer enters a loop of the compression process of 16-bit character codes.

Figure 63:
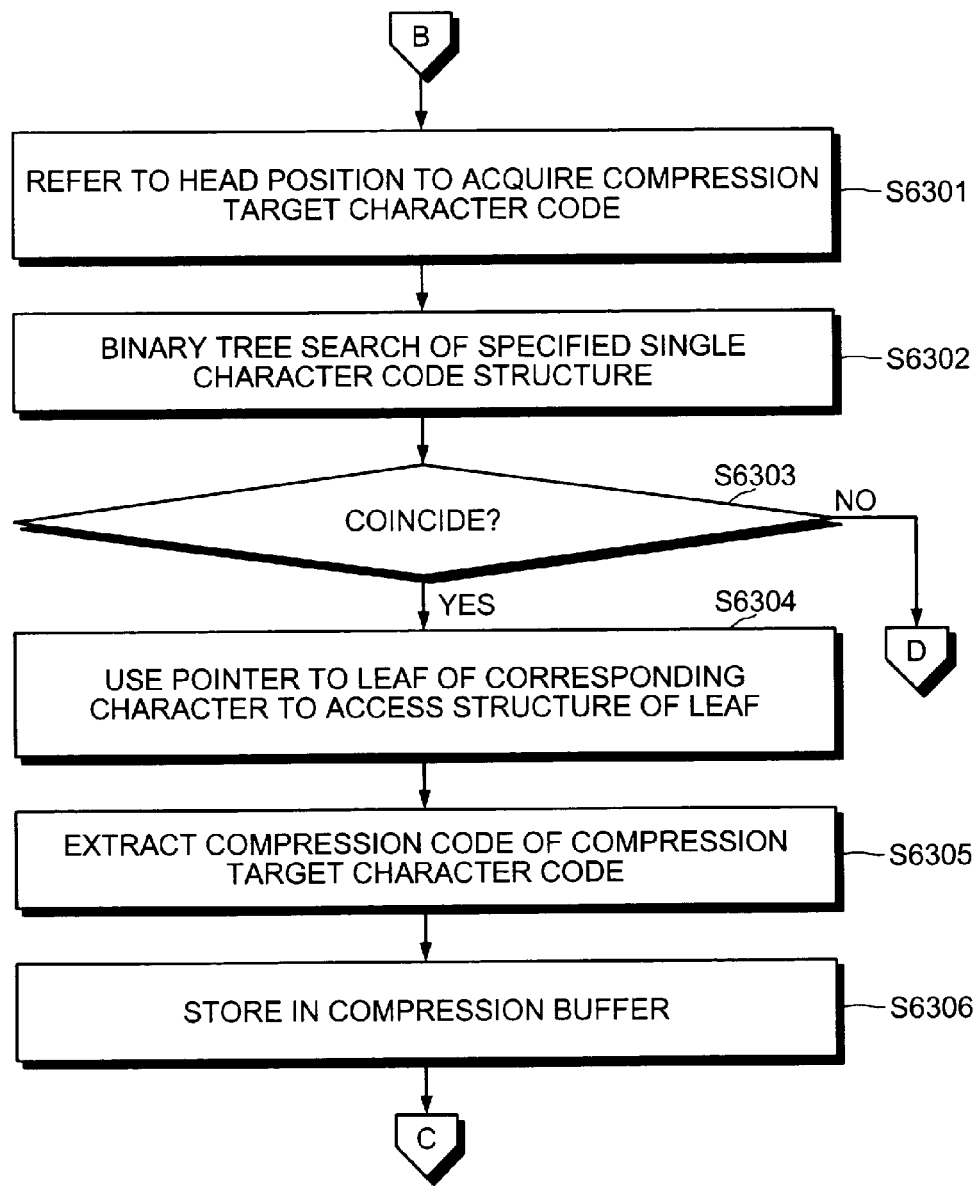
FIG. 63 is a flowchart (part 2) of the detailed process procedure of the compression process (step S6103) depicted in FIG. 61.

FIG. 63 is a flowchart (part 2) of the detailed process procedure of the compression process (step S6103) depicted in FIG. 61. As depicted in FIG. 63, the computer refers to the pointer of the head position acquired at step S6204 to acquire and set the compression target character code from the data file group Fs into the register (step S6301).

The computer performs the binary tree search of the specified single character code structure for the compression target character code (step S6302). If coinciding code is present (step S6303: YES), the computer uses a pointer to the leaf L# of the corresponding character to access the structure of the leaf L# (step S6304). The computer extracts the compression code of the compression target character code stored in the structure of the leaf L# (step S6305) pointed to.

Subsequently, the computer stores the retrieved compression code into the compression buffer 6000 (step S6306) and returns to step S6201. This loop makes a flow of the compression process of 16-bit character codes. On the other hand, if no coinciding character code is present at step S6303 (step S6303: NO), the computer enters a loop of the compression process of character code components.

Figure 64:
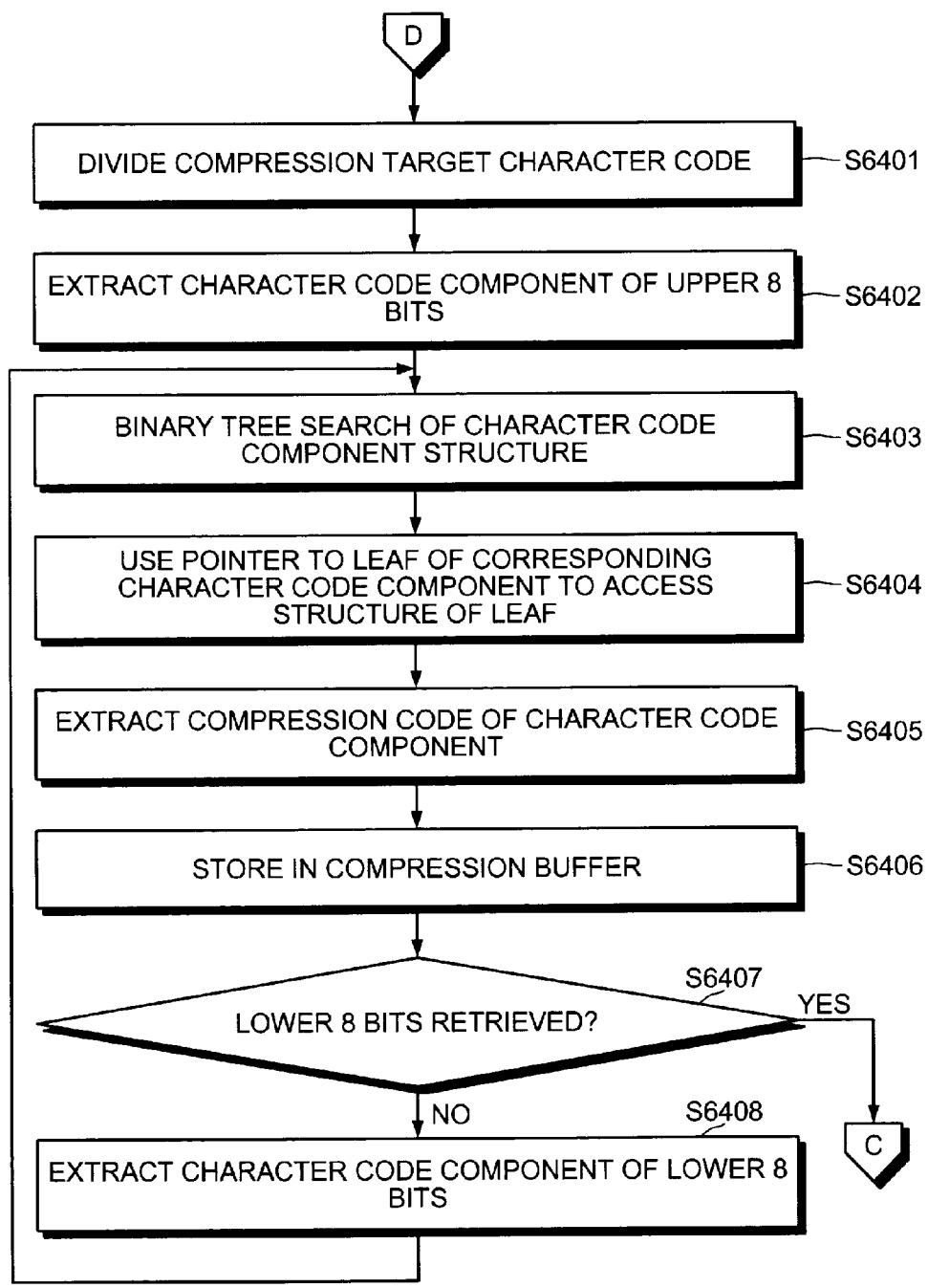
FIG. 64 is a flowchart (part 3) of the detailed process procedure of the compression process (step S6103) depicted in FIG. 61.

FIG. 64 is a flowchart (part 3) of the detailed process procedure of the compression process (step S6103) depicted in FIG. 61. As depicted in FIG. 64, first, the computer divides the compression target character code into upper eight bits and lower eight bits (step S6401) and extracts the character code component of the upper eight bits (step S6402). The computer performs a binary tree search of the character code component structure (step S6403).

The computer uses a pointer to the leaf L# of the retrieved character code component to access the structure of the leaf L# (step S6404). The computer extracts the compression code of the character code component stored in the structure of the leaf L# pointed to (step S6405). Subsequently, the computer stores the retrieved compression code into the compression buffer 6000 (step S6406).

The computer determines whether the lower eight bits have been retrieved (step S6407) and if not (step S6407: NO), the computer extracts the character code component of the lower eight bits (step S6408) and executes steps S6403 to S6406. On the other hand, if the lower eight bits have been retrieved (step S6407: YES), the computer returns to step S6201 and enters the loop of the compression process of fundamental words.

As described above, in the compression process using the $2^N$-branch nodeless Huffman tree, it is not necessary to search toward the root because of the absence of inner nodes, and the character unit stored in the pointed structure of the leaf L# may simply be written into the compression buffer 6000. Therefore, the compression process can be accelerated.

The structure of the leaf L# storing the compression target character code can be immediately identified from the fundamental word structure, the specified single character code structure, and the character code component structure. Therefore, it is not necessary to search the leaves of the $2^N$-branch nodeless Huffman tree and the compression process can be accelerated. By dividing a lower-order character code into an upper bit code and a lower bit code, nonspecified single characters can be compressed into compression codes of 256 types of character code components. Therefore, the compression rate can be improved.

Flows (A) to (D) of a retrieval process using the compression code maps will be described with reference to FIGS. 65 to 67. In this description, the retrieval character string is assumed to be "や🐍🐓".

FIG. 65 is an explanatory diagram of the flow (A) of the retrieval process using the compression code maps. As depicted in FIG. 65, at (A) in the retrieval process, a compression code of each character unit "や", "🐍", and "🐓" making up the retrieval character string is obtained by accessing the $2^N$-branch nodeless Huffman tree through a process identical to the compression process. For each of the character units "や", "🐍", and "🐓" making up the retrieval character string, the computer then acquires the appearance map of "や", the appearance map of "🐍", and the appearance map of "🐓", from the compression code map of specified single characters.

Figure 66:
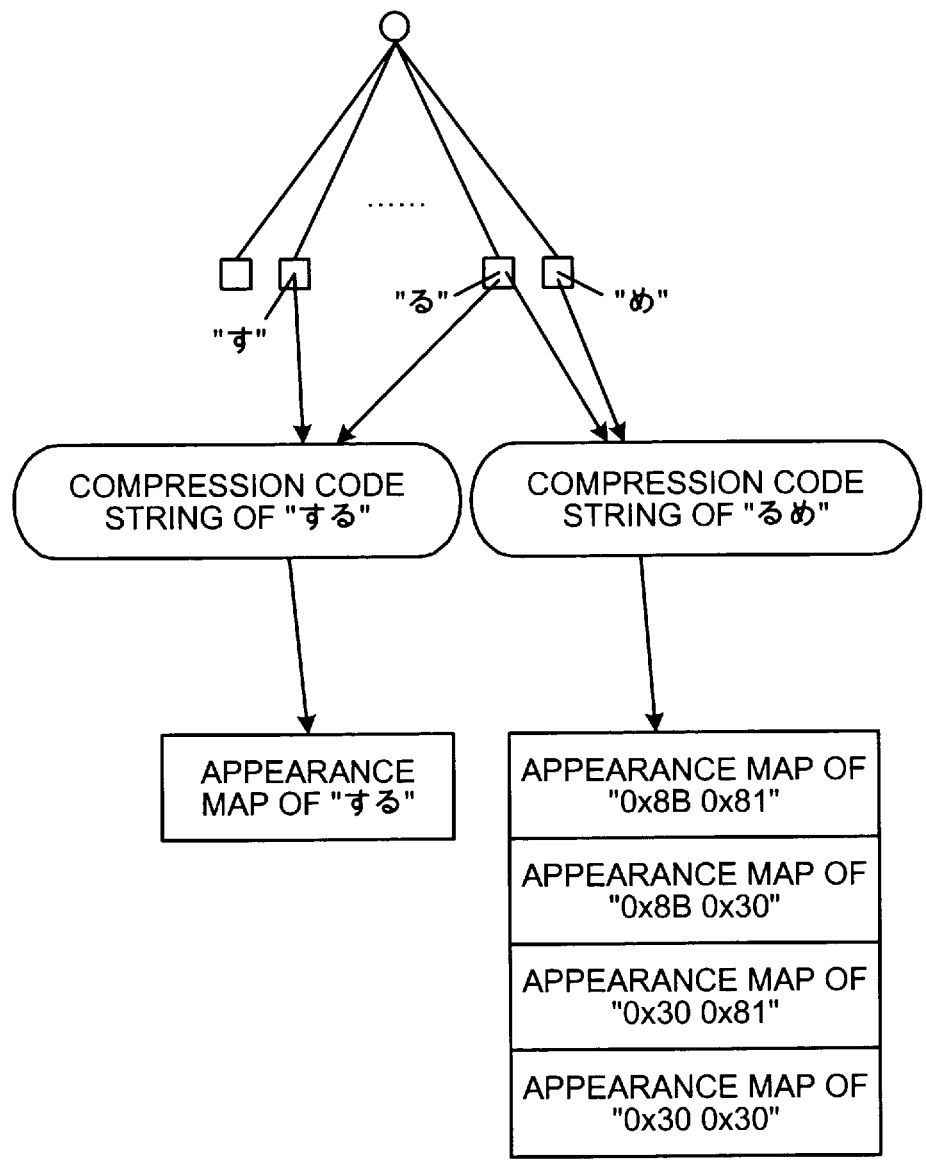
FIG. 66 is an explanatory diagram of a flow (B) of the retrieval process using the compression code maps.

FIG. 66 is an explanatory diagram of the flow (B) of the retrieval process using the compression code maps. After (A) depicted in FIG. 65, it is determined whether bi-gram strings "や🐍" and "🐍🐓" making up the retrieval character string "や🐍🐓" are ranked below the division rank. Since "や🐍" is ranked higher than the division rank, the computer acquires from the compression code map of bi-gram character strings, the appearance map of "や🐍" pointed to by the compression code string obtained by concatenating the compression code of "や" and the compression code of "🐍".

On the other hand, since "🐍🐓" is ranked below the division rank, the computer uses the concatenated code of the upper code (first-gram upper code) of the compression code of the first gram "🐍" and the upper code (second-gram upper code) of the compression code of the second gram "🐓" for the pointing. As a result, the computer acquires from the compression code map of the first-gram upper codes and the second-gram upper codes, the appearance map of a bi-gram character string having the upper code "0x8B" of the first gram "🐍" and the upper code "0x81" of the second gram "🐓".

Similarly, the computer uses the concatenated code of the upper code (first-gram upper code) of the compression code of the first gram "🐍" and the lower code (second-gram lower code) of the compression code of the second gram "🐓" for the pointing. As a result, the computer acquires from the compression code map of the first-gram upper codes and the second-gram lower codes, the appearance map of a bi-gram character string having the upper code "0x8B" of the first gram "🐍" and the lower code "0x30" of the second gram "🐓".

Similarly, the computer uses the concatenated code of the lower code (first-gram lower code) of the compression code of the first gram "🐍" and the upper code (second-gram upper code) of the compression code of the second gram "🐓" for the pointing. As a result, the computer acquires from the compression code map of the first-gram lower codes and the second-gram upper codes, the appearance map of a bi-gram character string having the lower code "0x30" of the first gram "🐍" and the upper code "0x81" of the second gram "🐓".

Similarly, the computer uses the concatenated code of the lower code (first-gram lower code) of the compression code of the first gram "🐍" and the lower code (second-gram lower code) of the compression code of the second gram "🐓" for the pointing. As a result, the computer acquires from the compression code map of the first-gram lower codes and the second-gram lower codes, the appearance map of a bi-gram character string having the lower code "0x30" of the first gram "🐍" and the lower code "0x30" of the second gram "🐓".

Figure 67:
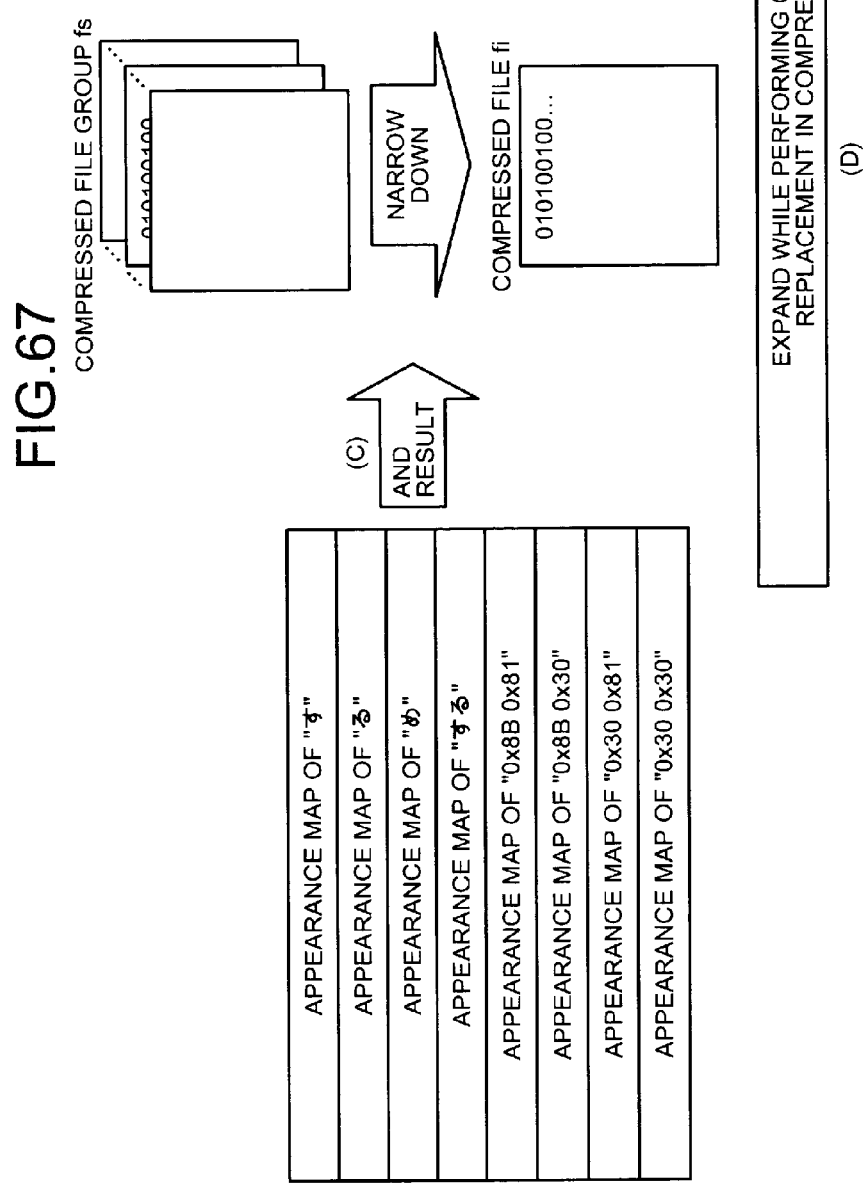
FIG. 67 is an explanatory diagram of flows (C) and (D) of the retrieval process using the compression code maps.

FIG. 67 is an explanatory diagram of the flows (C) and (D) of the retrieval process using the compression code maps. At (C), the computer can narrow down from the compressed file group fs, compressed files fi potentially having "す る め", by performing the AND operation of the appearance maps acquired at (B) depicted in FIG. 66.

(D) The computer uses a compression character string obtained by compressing the retrieval character string with the $2^N$-branch nodeless Huffman tree to collate the compressed files fi narrowed down at (C) still in the compressed state with the compression character string and expand the compressed files fi while performing replacement (e.g., sandwiching between tags for color display).

The collation/expansion example of (D) of FIG. 67 will for example be described. In the example of this description, the compression code string of the retrieval character string "す る め" is used to expand compressed files fi while performing the collation. In this example, it is assume that the compression code of the specified single character "す" is "1100010011" (10 bits); the compression code of the specified single character "る" is "0100010010" (8 bits); and the compression code of the specified single character "め" is "1010010100" (10 bits).

In the expansion process, the compression code string is set in the register and a compression code is extracted through a mask pattern. The extracted compression code is searched for from the root of the $2^N$-branch nodeless Huffman tree by one pass (access through one branch). A character code stored in the accessed structure of the leaf L# is read and stored in the expansion buffer.

To extract the compression code, the mask position of the mask pattern is offset. The initial value of the mask pattern is set to "0xFFF00000". This mask pattern is a bit string whose head 12 bits are "1" and the subsequent 20 bits are "0".

FIGS. 68 to 70 are explanatory diagrams of collation/expansion according to (D) depicted in FIG. 67. FIG. 68 depicts an example (A) of collating/expanding the specified single character "す". In FIG. 68, the CPU calculates a bit address abi, a byte offset byos, and a bit offset bios. The bit address abi is a value indicative of a bit position of the extracted compression code and the current bit address abi is a value obtained by adding a compression code length leg of the previously extracted compression code to the previous bit address abi. In the initial state, the bit address abi is set to abi=0.

The byte offset byos is a value indicative of a byte boundary of the compression code string retained in a memory and is obtained as a quotient of the bit address abi/8. For example, in the case of the byte offset byos=0, the compression code string from the start stored in the memory is set in a register and, in the case of the byte offset byos=1, the compression code string from the first byte stored in the memory is set in the register.

The bit offset bios is a value of offsetting the mask position ("FFF") of the mask pattern and is a remainder of the bit address abi/8. For example, in the case of the bit offset bios=0, the mask position is not shifted, resulting in the mask pattern of "0xFFF00000". On the other hand, in the case of the bit offset bios=4, the mask position is shifted by 4 bits toward the end, resulting in the mask pattern of "0x0FFF0000".

A register shift number rs is the number of bits by which the compression code string in the register is shifted toward the tail after AND operation with the mask pattern, and is obtained by rs=32-12-bios. Due to this shift, a bit string of the tail m bits in the register after the shift is extracted as a target bit string. After the target bit string is extracted, the register is cleared.

A block in the memory indicates a one-byte bit string and a numerical character inside indicates a byte position serving as a byte boundary. In FIG. 68, the bit address abi=0 leads to the byte offset byos=0 and the bit offset bios=0. Because of the byte offset byos=0, a compression code string of four bytes (shaded in FIG. 68) from the start of the compression code string retained in the memory is set in the register.

Because of the bit offset bios=0, the mask pattern is "0xFFF00000". Therefore, an AND result is acquired from the logical product (AND) operation of the compression code string set in the register and the mask pattern "0xFFF00000".

Because of the bit offset bios=0, the register shift number rs is rs=32−m−bios=32−12−0=20. Therefore, the AND result in the register is shifted by 20 bits toward the end. Due to this shift, "110001001100" is left in the register and therefore, the tail 12 bits are extracted as the target bit string. In this case, "110001001100" is extracted as the target bit string. After the extraction, the register is cleared.

Since the root structure of the $2^N$-branch nodeless Huffman tree includes the extracted target bit string "110001001100", the pointer (branch number) to the leaf L# coinciding with this target bit string is searched. In this case, since one of the pointers to a leaf L691 coincides, the corresponding pointer to the leaf L691 is read to access the structure of the leaf L691.

Since the structure of the leaf L691 stores a character code "0x5930", this character code "0x5930" is extracted and stored in the expansion buffer. Since the structure of the leaf L691 also stores the compression code length leg (=10 bits) of the character code "0x5930", the compression code length leg of the character code "0x5930" is extracted. The bit address abi is updated with this extracted compression code length leg. In this case, the updated bit address abi is abi=0+10=10.

FIG. 69 depicts an example (B) of collating/expanding the specified single character "る". For example, if the register is shifted by the byte offset byos from the state at (A) depicted in FIG. 68, since the previous bit address abi, i.e., the bit address abi at (A) is abi=0 and the compression code length leg is 10 bits, the bit address abi at (B) is abi=10 bits.

This bit address abi=10 leads to the byte offset byos=1 and the bit offset bios=2. Because of the byte offset byos=1, a compression code string of four bytes (shaded in FIG. 66) from the first byte of the compression code string retained in the memory is set in the register.

Because of the bit offset bios=2, the mask pattern is "0x3FFC0000". Therefore, an AND result is acquired from the logical product (AND) operation of the compression code string set in the register and the mask pattern "0x3FFC0000".

Because of the bit offset bios=2, the register shift number rs is rs=32−m−bios=32−12−2=18. Therefore, the AND result in the register is shifted by 18 bits toward the end. Due to this shift, "00000100010010" is left in the register and therefore, the tail 14 bits are extracted as the target bit string. In this case, "0100010010" is extracted as the target bit string. After the extraction, the register is cleared.

Since the root structure of the $2^N$-branch nodeless Huffman tree includes the extracted target bit string "0100010010", the pointer (branch number) to the leaf L# coinciding with this bit string is searched. In this case, since the target bit string "0100010010" coincides with one of the pointers to a leaf L24, the corresponding pointer to the leaf L24 is read to access the structure of the leaf L24.

Since the structure of the leaf L24 stores a character code "0x8B30", this character code "0x8B30" is extracted and stored in the expansion buffer. Since the structure of the leaf L24 also stores the compression code length leg (=8 bits) of the character code "0x8B30", the compression code length leg of the character code "0x8B30" is extracted. The bit address abi is updated with this extracted compression code length leg. In this case, the updated bit address abi is abi=10+8=18.

FIG. 70 depicts an example (C) of collating/expanding the specified single character "  ". For example, if the register is shifted by the byte offset byos from the state at (B) depicted in FIG. 69, since the previous bit address abi, i.e., the bit address abi at (B) is abi=10 and the compression code length leg is 8 bits, the bit address abi at (C) is abi=18 bits.

This bit address abi=18 leads to the byte offset byos=2 and the bit offset bios=2. Because of the byte offset byos=2, a compression code string of four bytes (shaded in FIG. 70) from the second byte of the compression code string retained in the memory is set in the register.

Because of the bit offset bios=2, the mask pattern is "0x3FFC0000". Therefore, an AND result is acquired from the logical product (AND) operation of the compression code string set in the register and the mask pattern "0x3FFC0000".

Because of the bit offset bios=2, the register shift number rs is rs=32−m−bios=32−12−2=18. Therefore, the AND result in the register is shifted by 18 bits toward the end. Due to this shift, "00001010010000" is left in the register and therefore, the tail 14 bits are extracted as the target bit string. In this case, "1010010000" is extracted as the target bit string. After the extraction, the register is cleared.

Since the root structure of the $2^N$-branch nodeless Huffman tree includes the extracted target bit string "1010010000", the pointer (branch number) to the leaf L# coinciding with this bit string is searched. In this case, since the target bit string "1010010000" coincides with one of the pointers to a leaf L167, the corresponding pointer to the leaf L167 is read to access the structure of the leaf L167.

Since the structure of the leaf L167 stores a character code "0x8130", this character code "0x8130" is extracted and stored in the expansion buffer. Since the structure of the leaf L167 also stores the compression code length leg (=10 bits) of the character code "0x8130", the compression code length leg of the character code "0x8130" is extracted. The bit address abi is updated with this extracted compression code length leg. In this case, the updated bit address abi is abi=18+10=28.

FIG. 71 is a flowchart of a retrieval process procedure of this embodiment. First, the computer waits for input of a retrieval character string (step S7101: NO) and, when a retrieval character string is input (step S7101: YES), the computer executes a file narrowing-down process (step S7102) and an expansion process (step S7103). In the file narrowing-down process (step S7102), as depicted in (C) of FIG. 67, the compressed files fi of the data files Fi having the character unit making up the retrieval character string are narrowed down from the compressed file group fs. Details of the file narrowing-down process (step S7102) will be described with reference to FIGS. 72 and 73.

In the expansion process (step S7103), as depicted in (D) of FIG. 67, the compression code string to be expanded is collated with the compression character string of the retrieval character string in the course of expanding the compressed files fi narrowed down by the file narrowing-down process (step S7102). Details of the expansion process (step S7103) will be described with reference to FIGS. 74 and 75.

FIG. 72 is a flowchart (part 1) of a detailed process procedure of the file narrowing-down process (step S7102) depicted in FIG. 71. First, the computer sets the retrieval character string as the target character string (step S7201) and executes the longest match retrieval process (step S7202). The longest match retrieval process (step S7202) is the same process as the longest match retrieval process (step S3401) depicted in FIG. 36 and will not be described.

The computer performs binary search of the fundamental word structure for the longest match retrieval result obtained by the longest match retrieval process (step S7202) (step S7203). If the longest match retrieval result is retrieved from the fundamental word structure (step S7203: YES), for the fundamental word that is the target character string, the computer acquires the appearance map of the fundamental word from the appearance map group of fundamental words (step S7204).

The computer determines whether the target character string has a subsequent character string (step S7205). If a subsequent character string is present (step S7205: YES), the computer sets the subsequent character string as the target character string (step S7206) and returns to the longest match retrieval process (step S7202). If no subsequent character string is present (step S7205: NO), the data files are narrowed down through the AND operation of the acquired appearance map group (step S7207). The computer then terminates the file narrowing-down process (step S7102) and transitions to the expansion process (step S7103).

At step S7203, if the longest match retrieval result is not retrieved from the fundamental word structure (step S7203: NO), the computer proceeds to step S7301 of FIG. 73. For example, if the longest match retrieval result is not registered in the fundamental word structure or if no longest match candidate is present consequent to the longest match retrieval (step S7203: NO), the computer proceeds to step S7301 depicted in FIG. 73.

FIG. 73 is a flowchart (part 2) of the detailed process procedure of the file narrowing-down process (step S7102) depicted in FIG. 71. FIG. 73 depicts a process of acquiring an appearance map for each character making up the target character string.

The computer sets the head character of the target character string as the target character (step S7301). The computer performs a binary search of the specified single character structure for the target character (step S7302). If the target character is retrieved (step S7303: YES), the computer acquires the appearance map of the target character from the compression code map of specified single characters (step S7304). The computer returns to step S7205 of FIG. 72.

On the other hand, if the target character is not retrieved at step S7303 (step S7303: NO), the computer divides the target character into an upper 8 bits and a lower 8 bits (step S7305). The computer acquires from the compression code map of upper character code components, the appearance map of the upper character code component obtained by the division at step S7305 (step S7306). Subsequently, the computer executes a bi-gram character string identification process (step S7309). The bi-gram character string identification process (step S7309) is the same process as the bi-gram character string identification process (step S3906) depicted in FIG. 42 and will not be described.

The computer also acquires from the compression code map of lower character code components, the appearance map of the lower character code component obtained by the division at step S7305 (step S7307). For the target character and the character code components divided at step S7505, the computer accesses the leaves of the $2^N$-branch nodeless Huffman tree to turn on collation flags (step S7308). Subsequently, the computer executes the bi-gram character string identification process (step S7309).

If no bi-gram character string is identified by the bi-gram character string identification process (step S7309) (step S7310: NO), the computer returns to step S7205 of FIG. 72. On the other hand, if a bi-gram character string is identified (step S7310: YES), it is determined whether the appearance rank of the identified bi-gram character string is higher than the division rank R2g (step S7311).

If the rank is higher than the division rank R2g (step S7311: YES), the computer acquires an appearance map of a non-divided bi-gram character string (step S7312). For example, the computer accesses the $2^N$-branch nodeless Huffman tree to acquire and concatenate the compression code of the first gram and the compression code of the second gram, and acquires the appearance map identified by the concatenated compression code from the compression code map of bi-gram character strings.

On the other hand, if the rank is equal to or lower than the division rank R2g (step S7311: NO), the computer generates a concatenated code group (step S7313). For example, for example, the computer accesses the $2^N$-branch nodeless Huffman tree to acquire the compression code of the first gram and the compression code of the second gram. In the case of four-part division, the computer divides the compression code of the first gram and the compression code of the second gram, respectively, into an upper code and a lower code. The computer generates a first concatenated code obtained by concatenating the first-gram upper code and the second-gram upper code, a second concatenated code obtained by concatenating the first-gram upper code and the second-gram lower code, a third concatenated code obtained by concatenating the first-gram lower code and the second-gram upper code, and a fourth concatenated code obtained by concatenating the first-gram lower code and the second-gram lower code.

The computer acquires the appearance map group of the bi-gram character strings (step S7314). For example, the computer acquires from the first component compression code map, the appearance map identified by the first concatenated code generated at step S7313. The computer acquires from the second component compression code map, the appearance map identified by the second concatenated code generated at step S7313. The computer acquires from the third divided compression code map, the appearance map identified by the third concatenated code generated at step S7313. The computer acquires from the fourth divided compression code map, the appearance map identified by the fourth concatenated code generated at step S7313. The computer returns to step S7205 of FIG. 72.

As described above, by the process procedure depicted in FIG. 73, the appearance map group for the target character and the appearance map group for the bi-gram character strings can be acquired. Therefore, the compressed files fi can be narrowed down through the AND operation at step S7207 depicted in FIG. 72.

FIG. 74 is a flowchart (part 1) of a detailed example of the expansion process (step S7103) using the $2^N$-branch nodeless Huffman tree depicted in FIG. 71. As depicted in FIG. 74, first, the computer sets the bit address abi to abi=0 (step S7401), calculates the byte offset byos (step S7402), and calculates the bit offset bios (step S7403). The computer sets a compression code string from the position of the byte offset byos into a register r1 (step S7404).

The computer shifts toward the tail and by the bit offset bios, a mask pattern set in a register r2 (step S7405) and performs an AND operation with the compression code string set in the register r1 (step S7406). The computer subsequently calculates the register shift number rs (step S7407) and after the AND operation, shifts the register r2 toward the tail, by the register shift number rs (step S7408).

FIG. 75 is a flowchart (part 2) of the detailed example of the expansion process (step S7103) using the $2^N$-branch nodeless Huffman tree depicted in FIG. 71. After step S7408, as depicted in FIG. 75, the computer extracts the tail N bits as a target bit string, from the register r2 after the shift (step S7501). The computer identifies the pointer to the leaf L# from the root structure of the $2^N$-branch nodeless Huffman tree (step S7502) and accesses the structure of the leaf L# pointed to by one pass (S7503). The computer determines whether the collation flag of the accessed structure of the leaf L# is ON (step S7504).

If the collation flag is ON (step S7504: YES), a replacement character of the character unit in the accessed structure of the leaf L# is written into the expansion buffer (step S7505) and the computer proceeds to step S7507. On the other hand, if the collation flag is OFF (step S7504: NO), the character unit (expanded character) in the accessed structure of the leaf L# is written into the expansion buffer (step S7506) and the computer proceeds to step S7507.

At step S7507, the computer extracts the compression code length leg from the accessed structure of the leaf L# (step S7507) and updates the bit address abi (step S7508). The computer then determines whether a compression code string is present in the memory, for example, whether a compression code string not subjected to the mask process using the mask pattern is present (step S7509). For example, this is determined based on whether a byte position corresponding to the byte offset byos is present. If the compression code string is present (step S7509: YES), the computer returns to step S7402 of FIG. 74. On the other hand, if no compression code string is present (step S7509: NO), the expansion process (step S7103) is terminated.

By this expansion process (step S7103), the collation/expansion can be performed while the compressed state is maintained and the expansion rate can be accelerated.

As described above, according to this embodiment, the two-part or four-part divided appearance map group can be generated for a bi-gram character string lower than or equal to the division rank to achieve a reduction in the size of the compression code map and a reduction of retrieval noise.

The bit strings indicative of the presence of bi-gram character strings in the data file group Fs can be specified by concatenated codes to achieve the efficient size reduction of the compression code map. If the data file group Fs is not compressed, the character codes can directly be utilized instead of the compression codes to make the division process of the compression code map more efficient.

Since the division rank is determined depending on the target appearance rate, the extent of the number of appearances can easily be determined in terms of the appearance maps of the bi-gram character strings excluded from the division, within the total number of appearances of bi-gram character strings. The target appearance rate can operationally be input from an input apparatus to determine the division rank depending on a request from a user. Therefore, the determination can freely be made depending on the intent of the user such as "retrieval noise is acceptable if the target appearance rate is set to this extent", and the degree of freedom of the division of the compression code map can be increased.

The division rank may be determined simply depending on ranking in descending order of the number of appearances of bi-gram character strings, instead of the target appearance rate. In this case, the calculation of the division rank using the target appearance rate can be omitted and the division process of the compression code map can be accelerated.

If a data file is newly added to the data file group Fs, a series of the processes depicted in FIG. 30 can be executed for the data file group Fs after the addition to optimize the compression code map. For example, if the data file Fi is e-mail, since e-mail is stored each time e-mail is transmitted or received, the series of the processes depicted in FIG. 30 is executed for a stored e-mail group to which e-mail is newly added.

When compression codes are utilized, the $2^N$-branch nodeless Huffman tree is employed in this embodiment. Since the employment of the $2^N$-branch nodeless Huffman tree enables one-pass access to a compression code of each character unit, the generation of concatenated codes can be accelerated. Since the $2^N$-branch nodeless Huffman tree is used, even if an uncompressed retrieval character string is input, the retrieval character string can be compressed to a compression code string by one pass.

By extracting a concatenated code from this compression code string, an appearance map in a divided compression code map can directly be identified. Therefore, the corresponding appearance map can rapidly be extracted, and the compressed files fi including a compression code string of a bi-gram character string can be rapidly and accurately narrowed down from the compressed file group fs obtained by compressing the data file group Fs.

By performing the collation with the compression character string in the compressed state and expansion of the compressed files fi narrowed down as described above, the retrieval process can be realized at high speed with memory usage suppressed to the minimum.

Although an example of performing the generation and the retrieval of the $2^N$-branch nodeless Huffman tree and the compression code maps in the same computer has been described in the embodiment above, the generation and the retrieval may be performed by separate computers. In this case, a computer generating the $2^N$-branch nodeless Huffman tree and the compression code maps transmits the data file group Fs (or compressed file group fs), the $2^N$-branch nodeless Huffman tree, and the compression code maps to another computer. Another computer executes a retrieval process by using the transmitted data file group Fs (or compressed file group fs), the $2^N$-branch nodeless Huffman tree, and the compression code maps.

Each process described in the flowcharts may be implemented by executing a prepared program on a computer such as a personal computer and a workstation. The program is stored on a computer-readable medium such as a hard disk, a flexible disk, a CD-ROM, an MO, and a DVD, read out from the recording medium, and executed by the computer. The program may be distributed through a network such as the Internet. However, the computer-readable medium does not include a transitory medium such as a propagation signal.

According to one aspect of the present invention, retrieval noise generated by reducing map size can be suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An appearance-map generating method of generating a plurality of appearance maps stored in a memory of a computer, the appearance-map generating method comprising:
   extracting, by the computer, a plurality of bi-gram character strings from a plurality of files;
   determining, by the computer, the rank of each bi-gram character string according to the number of times that the bi-gram character string appears in the files;
   generating, by the computer and for each higher-order bi-gram character string having a rank higher than a given rank, a non-divided appearance map having a size of $2^k \times 2^k$ bits and indicating a file(s) that includes the higher-order bi-gram character string;
   generating, by the computer and for each lower-order bi-gram character string having a rank lower than or equal to the given rank, n×m divided appearance maps each of which has a size of $2^{k/n} \times 2^{k/m}$ bits and that correspond to n×m combinations of n codes and m codes, respectively; and
   storing, by the computer and into the memory, the non-divided appearance map of the size of $2^k \times 2^k$ bits and the n×m divided appearance maps each of which has the size of $2^{k/n} \times 2^{k/m}$ bits, wherein
   the n codes are obtained by dividing a code representing a first gram of the lower-order bi-gram character string into n parts, and
   the m codes are obtained by dividing a code representing a second gram of the lower-order bi-gram character string into m parts, where k, n, and m are natural numbers.

2. The appearance-map generating method according to claim 1, wherein
   the n is 2 and the m is 1, and
   the generating the n×m divided appearance maps includes:
      dividing the code representing the first gram of the lower-order bi-gram character string into a first-gram upper code and a first-gram lower code;
      generating a first divided appearance map corresponding to a concatenated code obtained by concatenating the first-gram upper code and the code representing the second gram of the lower-order bi-gram character string; and
      generating a second divided appearance map corresponding to a concatenated code obtained by concatenating the first-gram lower code and the code representing the second gram of the lower-order bi-gram character string.

3. The appearance-map generating method according to claim 1, wherein
   the n is 1 and the m is 2, and
   the generating the n×m divided appearance maps includes:

dividing the code representing the second gram of the lower-order bi-gram character string into a second-gram upper code and a second-gram lower code;
generating a first divided appearance map corresponding to a concatenated code obtained by concatenating the code representing the first gram of the lower-order bi-gram character string and the second-gram upper code; and
generating a second divided appearance map corresponding to a concatenated code obtained by concatenating the code representing the first gram of the lower-order bi-gram character string and the second-gram lower code.

4. The appearance-map generating method according to claim 1, wherein
the n is 2 and the m is 2, and
the generating the n×m divided appearance maps includes:
dividing the code representing the first gram of the lower-order bi-gram character string into a first-gram upper code and a first-gram lower code;
dividing the code representing the second gram of the lower-order bi-gram character string into a second-gram upper code and a second-gram lower code;
generating a first divided appearance map corresponding to a concatenated code obtained by concatenating the first-gram upper code and the second-gram upper code;
generating a second divided appearance map corresponding to a concatenated code obtained by concatenating the first-gram upper code and the second-gram lower code;
generating a third divided appearance map corresponding to a concatenated code obtained by concatenating the first-gram lower code and the second-gram upper code; and
generating a fourth divided appearance map corresponding to a concatenated code obtained by concatenating the first-gram lower code and the second-gram lower code.

5. An appearance-map generating apparatus that generates a plurality of appearance maps stored in a memory, the appearance-map generatinq apparatus comprising:
a computer that is configured to:
extract a plurality of bi-gram character strings from a plurality of files;
determine the rank of each bi-gram character string according to the number of times that the bi-gram character string appears in the files;
generate, for each higher-order bi-gram character string having a rank higher than a given rank, a non-divided appearance map having a size of $2^k \times 2^k$ bits and indicating a file(s) that includes the higher-order bi-gram character string;
generate, for each lower-order bi-gram character string having a rank lower than or equal to the given rank, n×m divided appearance maps each of which has a size of $2^{k/n} \times 2^{k/m}$ bits and that correspond to n×m combinations of n codes and m codes, respectively; and
store into the memory, the non-divided appearance map of the size of $2^k \times 2^k$ bits and the n×m divided appearance maps each of which has the size of $2^{k/n} 2^{k/m}$ bits,
wherein
the n codes are obtained by dividing a code representing a first gram of the lower-order bi-gram character string into n parts, and
the m codes are obtained by dividing a code representing a second gram of the lower-order bi-gram character string into m parts, where k, n, and m are natural numbers.

6. The appearance-map generating apparatus according to claim 5, wherein
the n is 2 and the m is 1, and
the computer is configured to generate the n×m divided appearance maps by:
dividing the code representing the first gram of the lower-order bi-gram character string into a first-gram upper code and a first-gram lower code;
generating a first divided appearance map corresponding to a concatenated code obtained by concatenating the first-gram upper code and the code representing the second gram of the lower-order bi-gram character string; and
generating a second divided appearance map corresponding to a concatenated code obtained by concatenating the first-gram lower code and the code representing the second gram of the lower-order bi-gram character string.

7. The appearance-map generating apparatus according to claim 5, wherein
the n is 1 and the m is 2, and
the computer is configured to generate the n×m divided appearance maps by:
dividing the code representing the second gram of the lower-order bi-gram character string into a second-gram upper code and a second-gram lower code;
generating a first divided appearance map corresponding to a concatenated code obtained by concatenating the code representing the first gram of the lower-order bi-gram character string and the second-gram upper code; and
generating a second divided appearance map corresponding to a concatenated code obtained by concatenating the code representing the first gram of the lower-order bi-gram character string and the second-gram lower code.

8. The appearance-map generating apparatus according to claim 5, wherein
the n is 2 and the m is 2, and
the computer is configured to generate the n×m divided appearance maps by:
dividing the code representing the first gram of the lower-order bi-gram character string into a first-gram upper code and a first-gram lower code;
dividing the code representing the second gram of the lower-order bi-gram character string into a second-gram upper code and a second-gram lower code;
generating a first divided appearance map corresponding to a concatenated code obtained by concatenating the first-gram upper code and the second-gram upper code;
generating a second divided appearance map corresponding to a concatenated code obtained by concatenating the first-gram upper code and the second-gram lower code;
generating a third divided appearance map corresponding to a concatenated code obtained by concatenating the first-gram lower code and the second-gram upper code; and
generating a fourth divided appearance map corresponding to a concatenated code obtained by concatenating the first-gram lower code and the second-gram lower code.

9. A non-transitory, computer-readable recording medium storing therein an appearance-map generating program for generating a plurality of appearance maps stored in a memory of a computer, wherein the appearance-map generating program causes the computer to execute:
  extracting a plurality of bi-gram character strings from a plurality of files;
  determining the rank of each bi-gram character string according to the number of times that the bi-gram character string appears in the files;
  generating, for each higher-order bi-gram character string having a rank higher than a given rank, a non-divided appearance map having a size of $2^k \times 2^k$ bits and indicating a file(s) that includes the higher-order bi-gram character string;
  generating, for each lower-order bi-gram character string having a rank lower than or equal to the given rank, n×m divided appearance maps each of which has a size of $2^{k/n} \times 2^{k/m}$ bits and that correspond to n×m combinations of n codes and m codes, respectively; and
  storing into the memory, the non-divided appearance map of the size of $2^k \times 2^k$ bits and the n×m divided appearance maps each of which has the size of $2^{k/n} \times 2^{k/m}$ bits, wherein
  the n codes are obtained by dividing a code representing a first gram of the lower-order bi-gram character string into n parts, and
  the m codes are obtained by dividing a code representing a second gram of the lower-order bi-gram character string into m parts, where k, n, and m are natural numbers.

10. The recording medium according to claim 9, wherein the n is 2 and the m is 1, and
the generating the n×m divided appearance maps includes:
  dividing the code representing the first gram of the lower-order bi-gram character string into a first-gram upper code and a first-gram lower code;
  generating a first divided appearance map corresponding to a concatenated code obtained by concatenating the first-gram upper code and the code representing the second gram of the lower-order bi-gram character string; and
  generating a second divided appearance map corresponding to a concatenated code obtained by concatenating the first-gram lower code and the code representing the second gram of the lower-order bi-gram character string.

11. The recording medium according to claim 9, wherein the n is 1 and the m is 2, and
the generating the n×m divided appearance maps includes:
  dividing the code representing the second gram of the lower-order bi-gram character string into a second-gram upper code and a second-gram lower code;
  generating a first divided appearance map corresponding to a concatenated code obtained by concatenating the code representing the first gram of the lower-order bi-gram character string and the second-gram upper code; and
  generating a second divided appearance map corresponding to a concatenated code obtained by concatenating the code representing the first gram of the lower-order bi-gram character string and the second-gram lower code.

12. The recording medium according to claim 9, wherein the n is 2 and the m is 2, and
the generating the n×m divided appearance maps includes:
  dividing the code representing the first gram of the lower-order bi-gram character string into a first-gram upper code and a first-gram lower code;
  dividing the code representing the second gram of the lower-order bi-gram character string into a second-gram upper code and a second-gram lower code;
  generating a first divided appearance map corresponding to a concatenated code obtained by concatenating the first-gram upper code and the second-gram upper code;
  generating a second divided appearance map corresponding to a concatenated code obtained by concatenating the first-gram upper code and the second-gram lower code;
  generating a third divided appearance map corresponding to a concatenated code obtained by concatenating the first-gram lower code and the second-gram upper code; and
  generating a fourth divided appearance map corresponding to a concatenated code obtained by concatenating the first-gram lower code and the second-gram lower code.

\* \* \* \* \*